(12) United States Patent
Kawakami et al.

(10) Patent No.: US 7,394,599 B2
(45) Date of Patent: Jul. 1, 2008

(54) ZOOM LENS AND PROJECTOR WITH ZOOM LENS

(75) Inventors: Etsuro Kawakami, Akishima (JP); Yasuyuki Tejima, Tokorozawa (JP)

(73) Assignee: Casio Computer Co. Ltd., Tokyo (JP)

( * ) Notice: Subject to any disclaimer, the term of this patent is extended or adjusted under 35 U.S.C. 154(b) by 0 days.

(21) Appl. No.: 11/796,702

(22) Filed: Apr. 27, 2007

(65) Prior Publication Data

US 2007/0273979 A1    Nov. 29, 2007

(30) Foreign Application Priority Data

May 24, 2006 (JP) ............................. 2006-143750
Jul. 24, 2006 (JP) ............................. 2006-201342

(51) Int. Cl.
G02B 15/14    (2006.01)

(52) U.S. Cl. ........................ 359/680; 359/686; 359/687

(58) Field of Classification Search ................. 359/680, 359/681, 682, 686, 687
See application file for complete search history.

(56) References Cited

U.S. PATENT DOCUMENTS 6,515,803 B2 *   2/2003   Hirose ........................ 359/682

FOREIGN PATENT DOCUMENTS

JP    2004-271668 A    9/2004

* cited by examiner

*Primary Examiner*—Scott J. Sugarman
(74) *Attorney, Agent, or Firm*—Frishauf, Holtz, Goodman & Chick, P.C.

(57) ABSTRACT

A zoom lens includes a first lens group having positive or negative refractive power, a second lens group having negative refractive power, a third lens group having positive refractive power, and a fourth lens group having positive refractive power. A variable power is set such that the first and fourth lens group are left fixed, the second lens group is made to move from a magnifying side to a contracting side over a range from a wide angle end to an intermediate area and is made to move on an optical axis from the contracting side to the magnifying side over a range from the intermediate area to a telephoto end, and the third lens group is made to move on the optical axis from the contracting side to the magnifying side over a range from the wide angle end to the telephoto end.

23 Claims, 30 Drawing Sheets

(EMBODIMENT 1)

FIG. 2
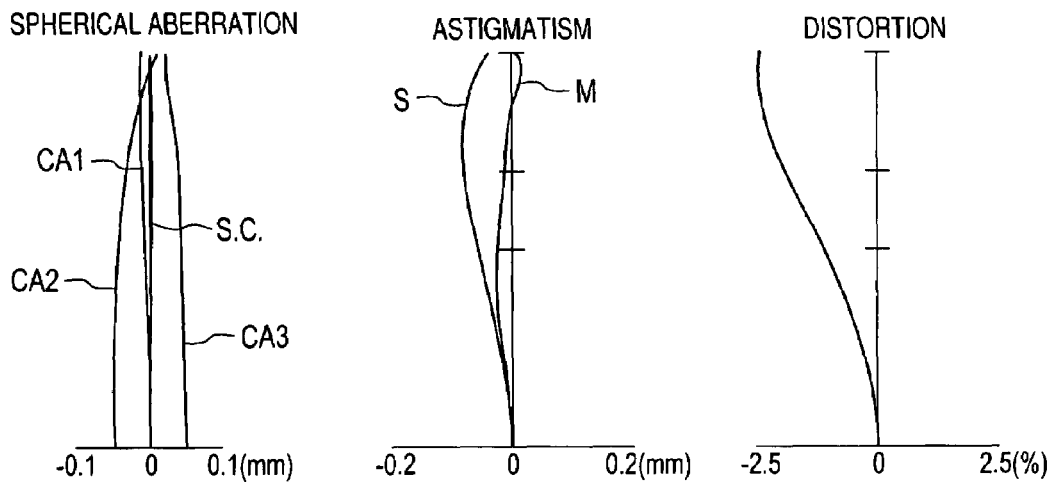
(EMBODIMENT 1: WIDE-ANGLE END)
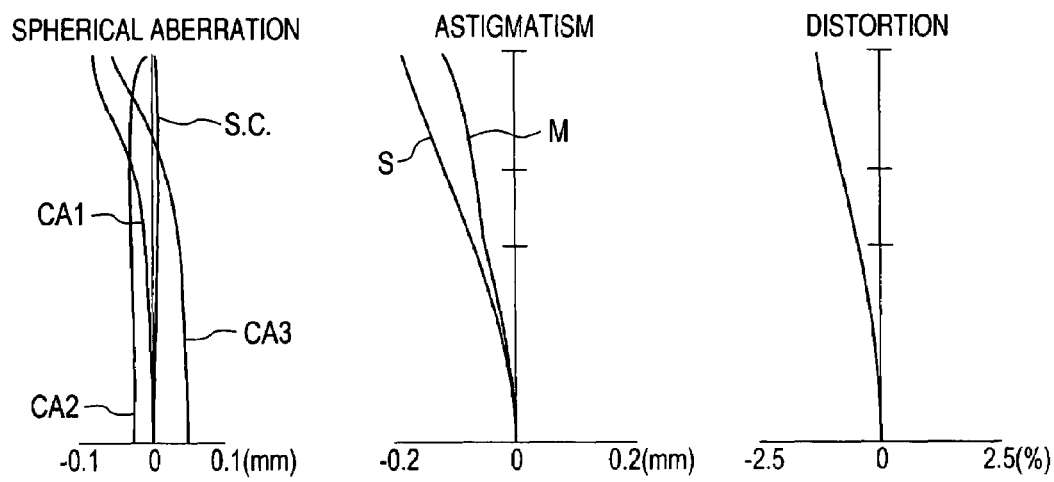
(EMBODIMENT 1: INTERMEDIATE AREA)
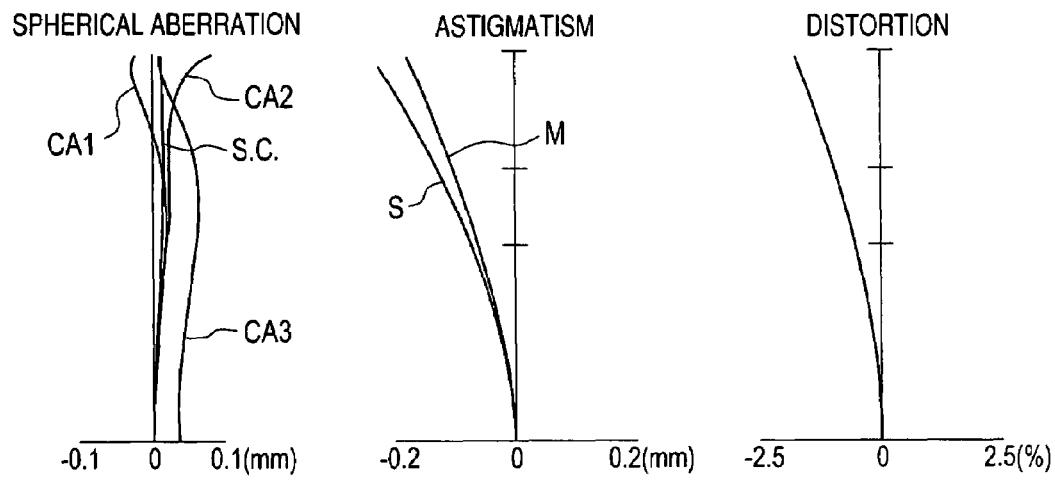
(EMBODIMENT 1: TELEPHOTO END)

(EMBODIMENT 2)

FIG. 4
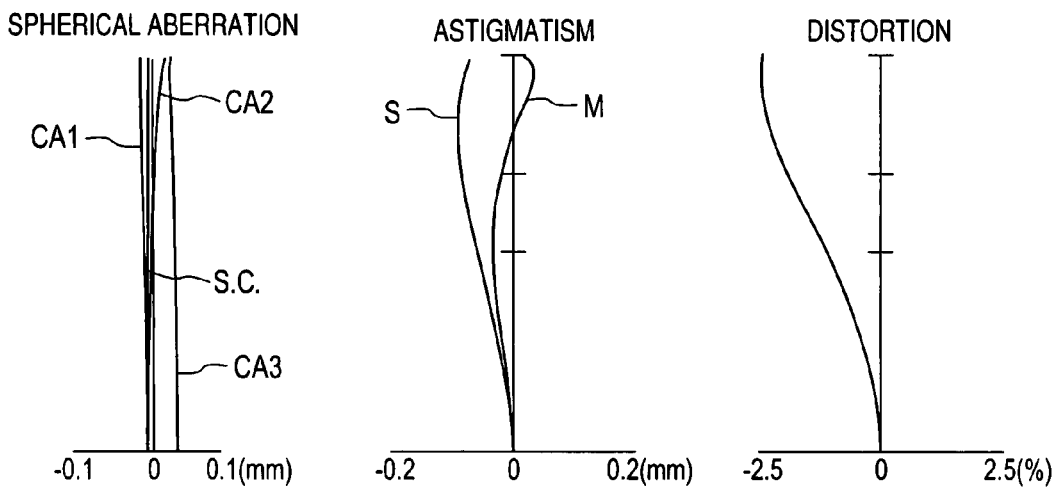
(EMBODIMENT 2: WIDE-ANGLE END)
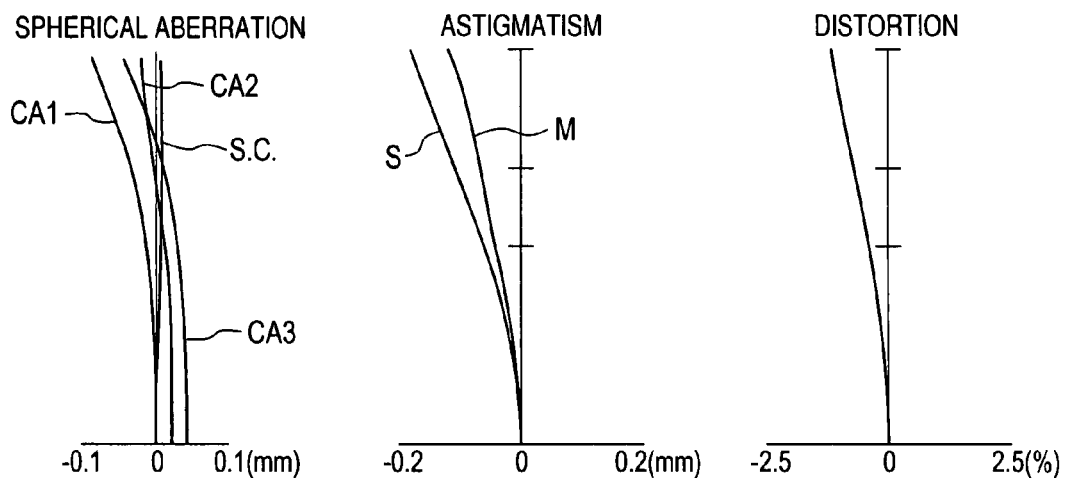
(EMBODIMENT 2: INTERMEDIATE AREA)
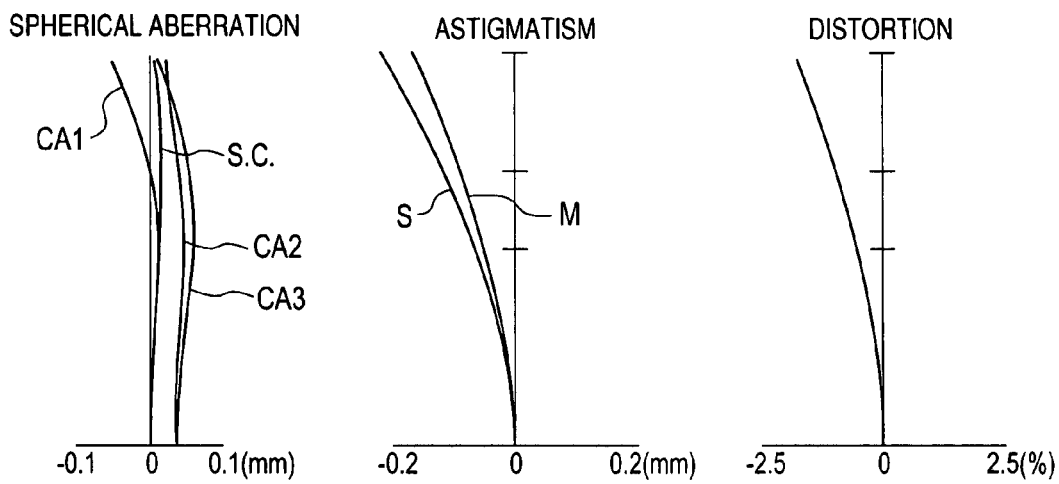
(EMBODIMENT 2: TELEPHOTO END)

FIG. 5 (EMBODIMENT 3)

FIG. 6
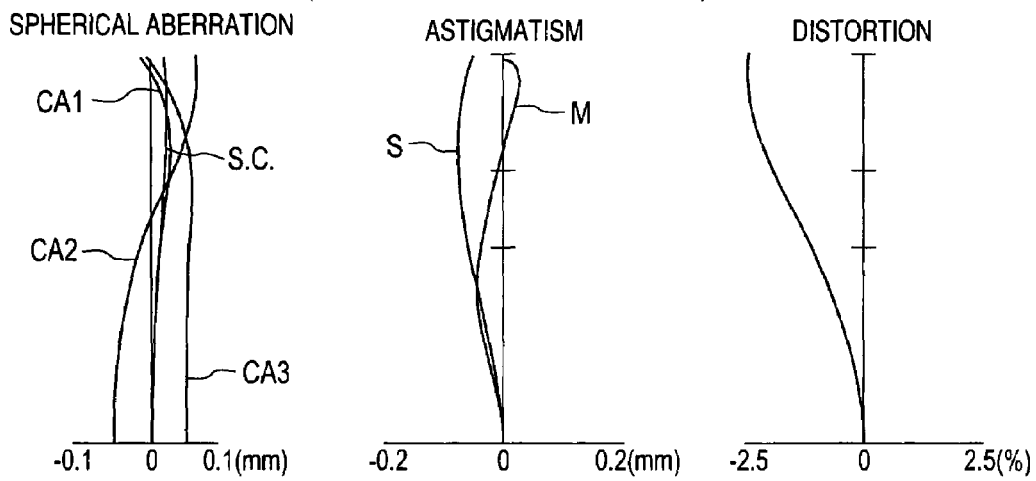
(EMBODIMENT 3: WIDE-ANGLE END)
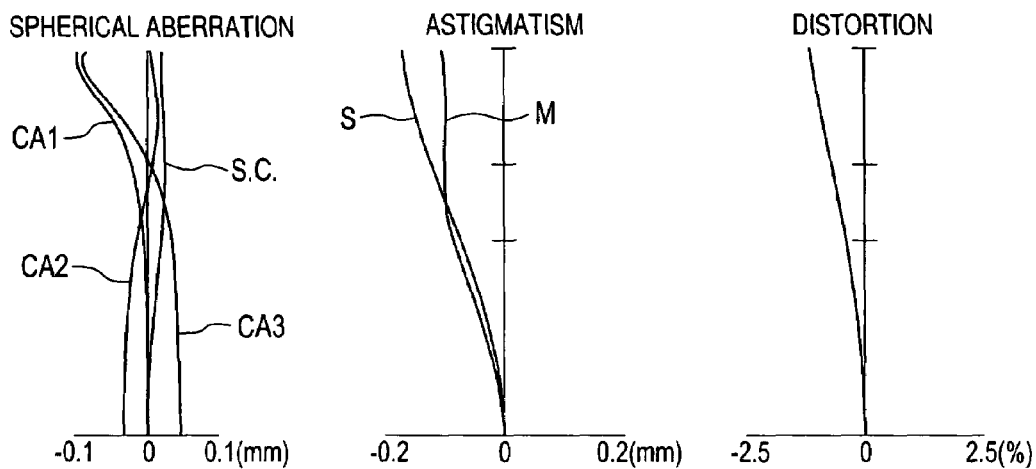
(EMBODIMENT 3: INTERMEDIATE AREA)
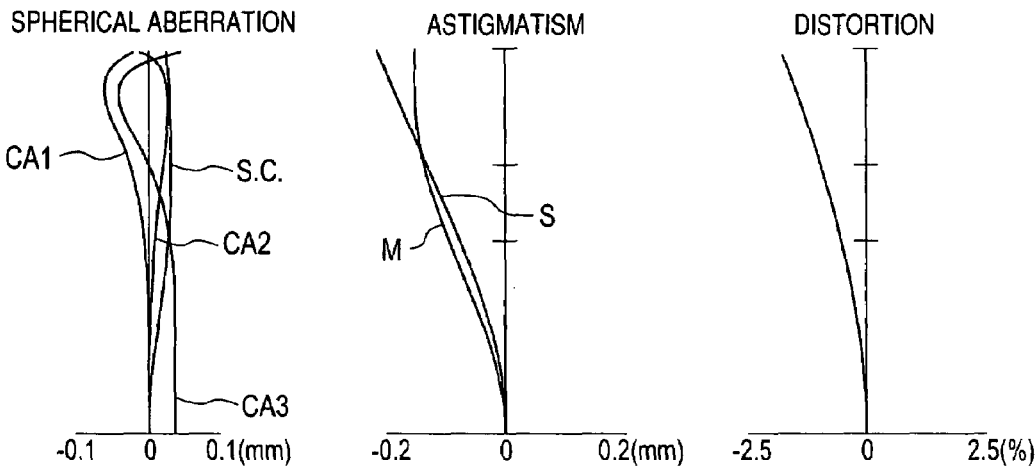
(EMBODIMENT 3: TELEPHOTO END)

FIG. 7 (EMBODIMENT 4)

FIG. 8
(EMBODIMENT 4: WIDE-ANGLE END)
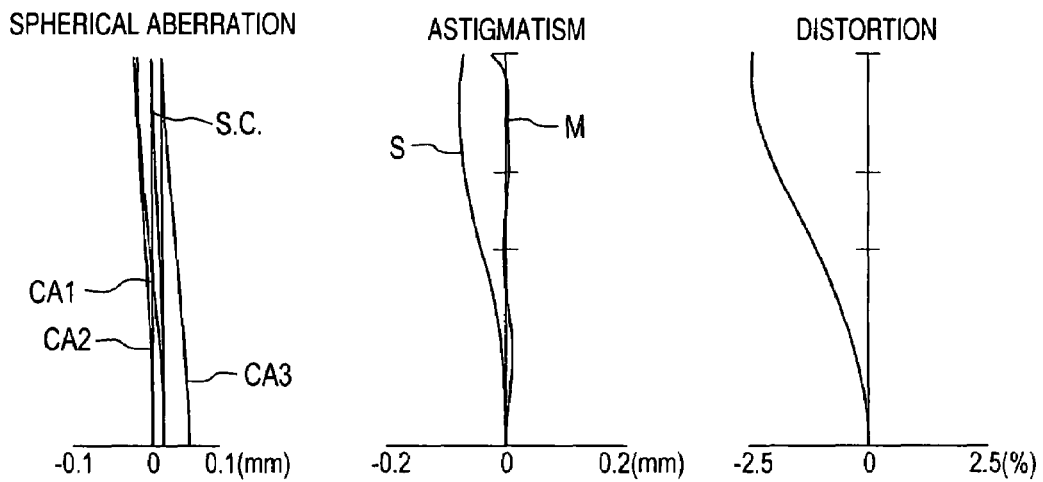
(EMBODIMENT 4: INTERMEDIATE AREA)
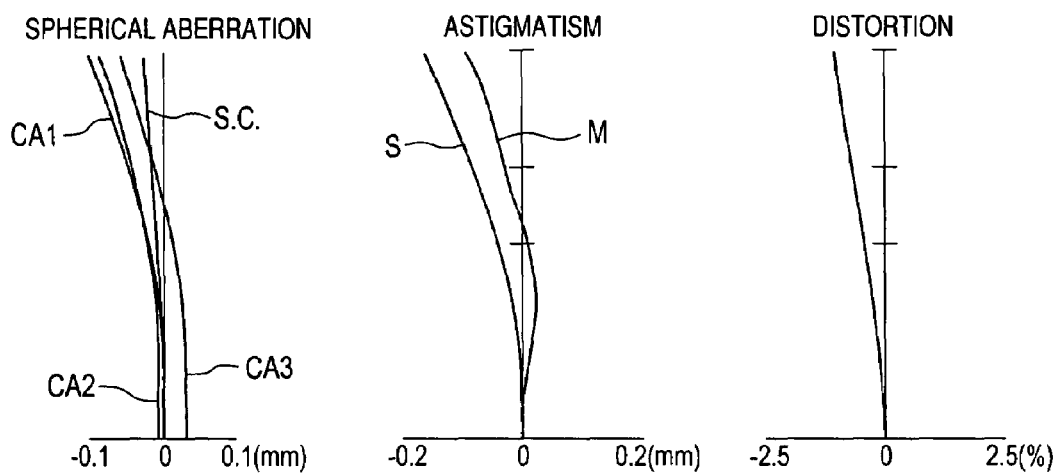
(EMBODIMENT 4: TELEPHOTO END)
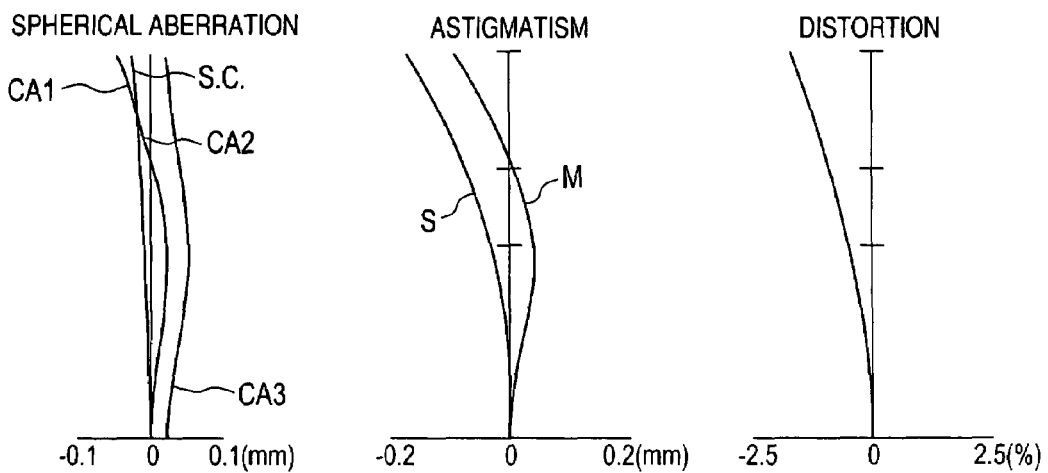

FIG. 9 (EMBODIMENT 5)

FIG. 10
(EMBODIMENT 5: WIDE-ANGLE END)
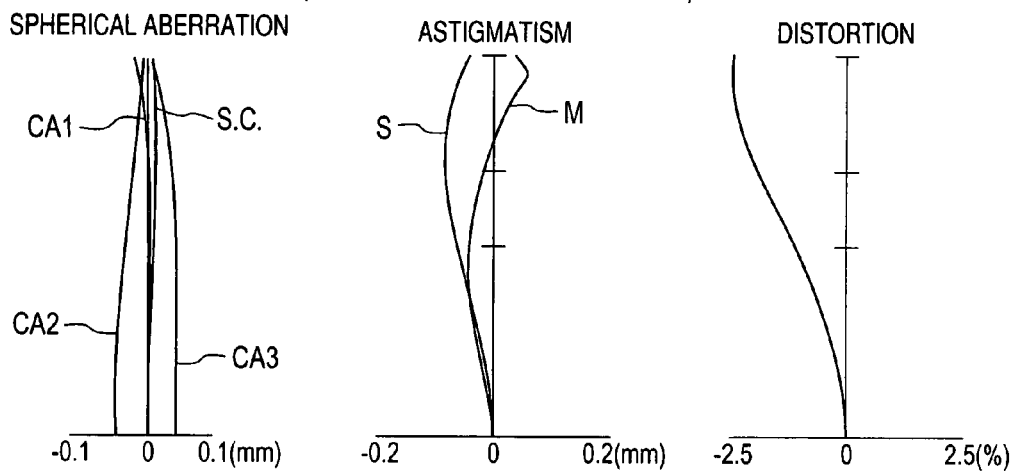
(EMBODIMENT 5: INTERMEDIATE AREA)
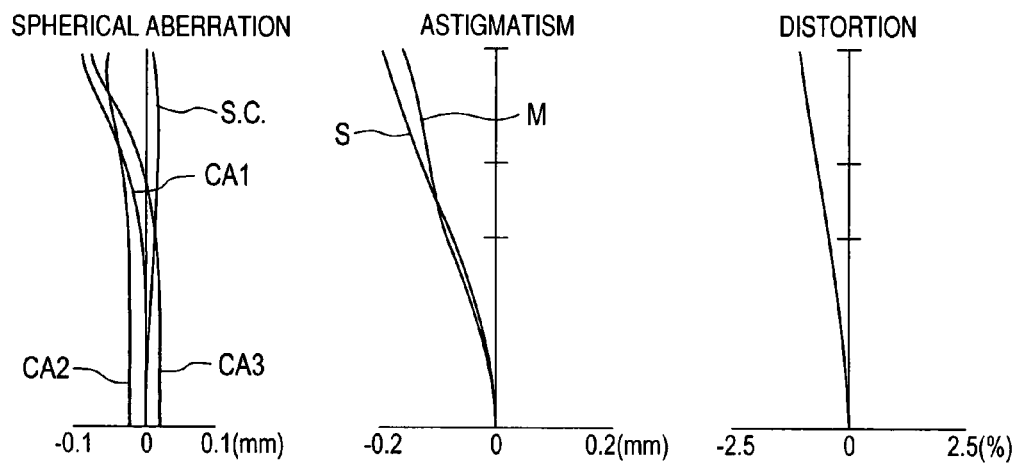
(EMBODIMENT 5: TELEPHOTO END)
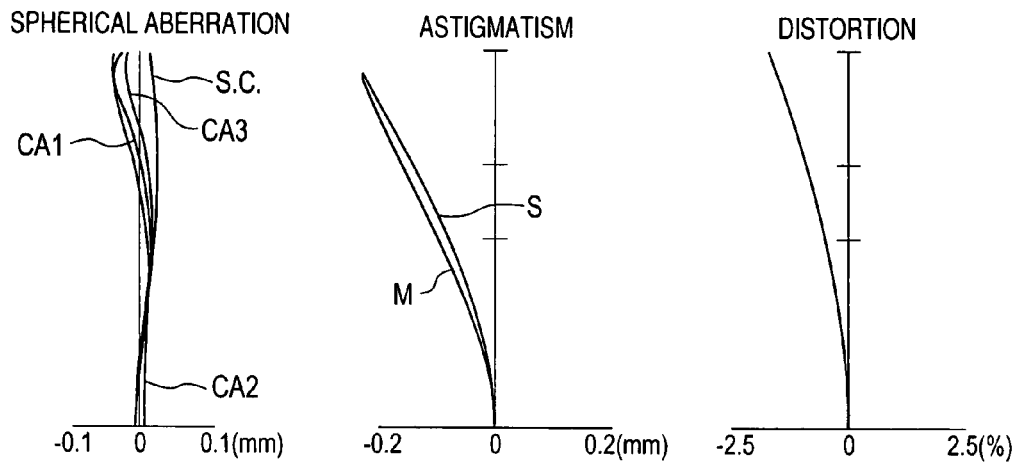

(EMBODIMENT 6)

FIG. 12
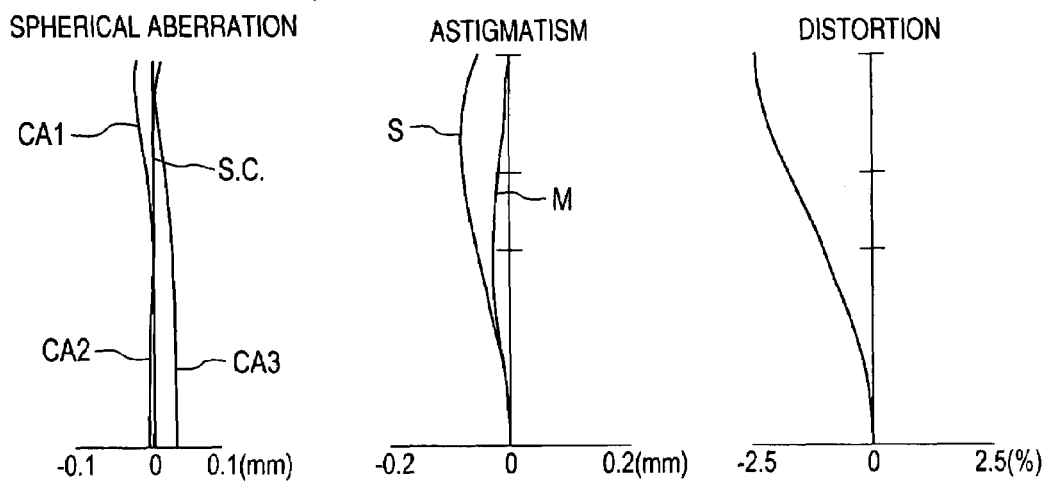
(EMBODIMENT 6: WIDE-ANGLE END)
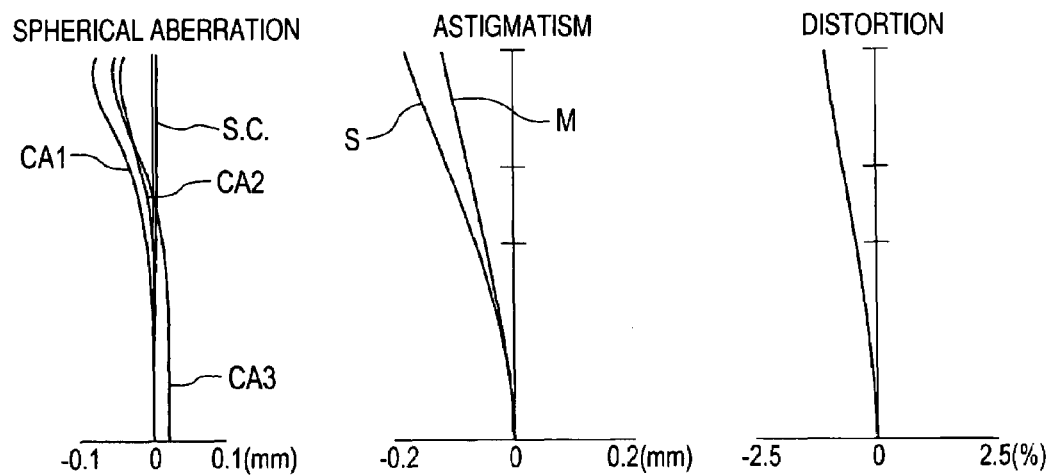
(EMBODIMENT 6: INTERMEDIATE AREA)
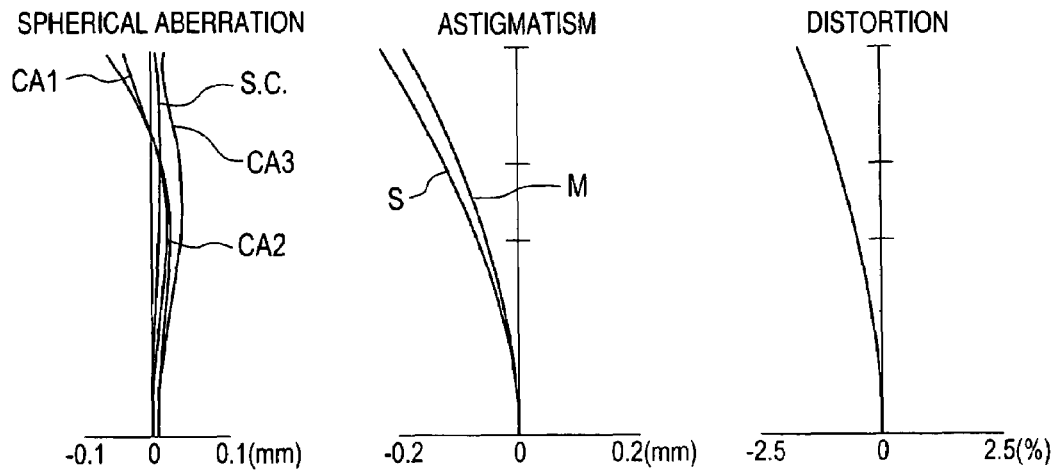
(EMBODIMENT 6: TELEPHOTO END)

(EMBODIMENT 7)

FIG. 14
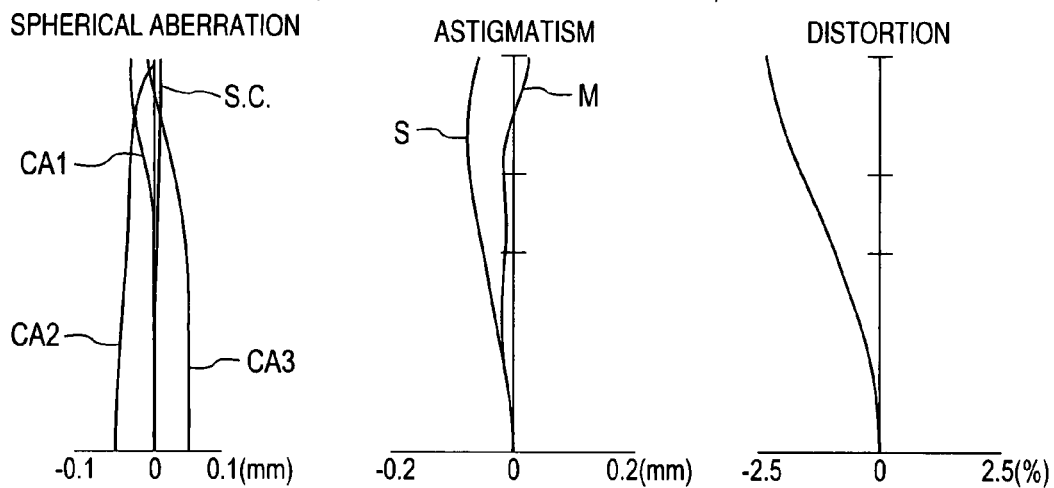
(EMBODIMENT 7: WIDE-ANGLE END)
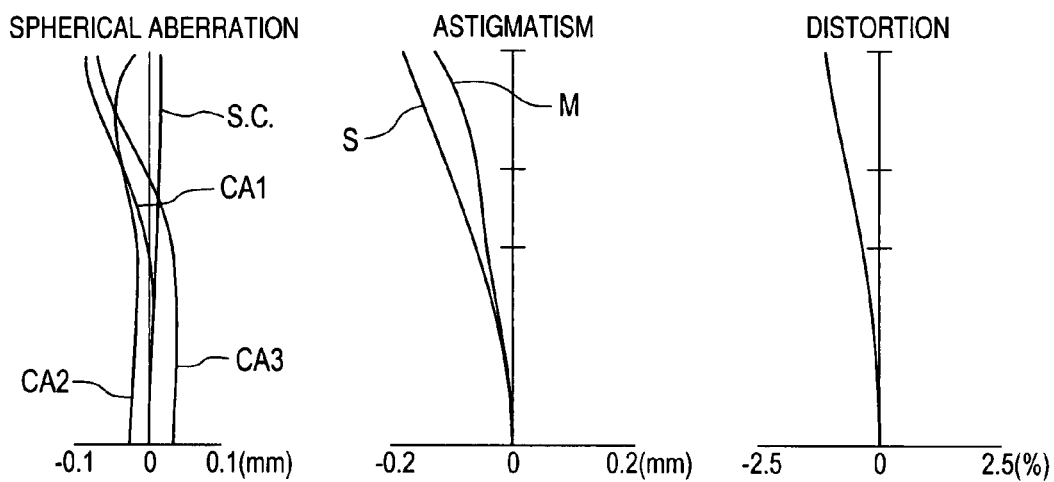
(EMBODIMENT 7: INTERMEDIATE AREA)
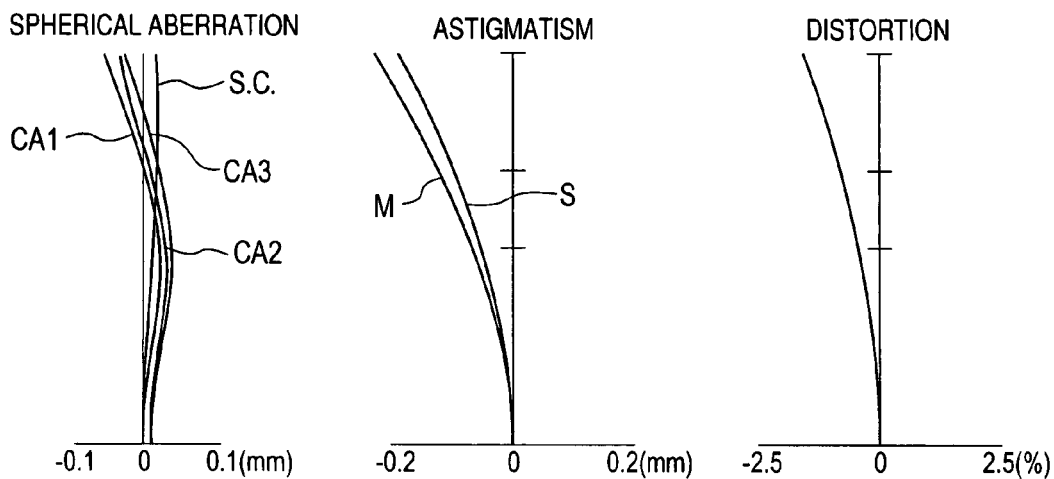
(EMBODIMENT 7: TELEPHOTO END)

FIG. 15 (EMBODIMENT 8)

FIG. 16
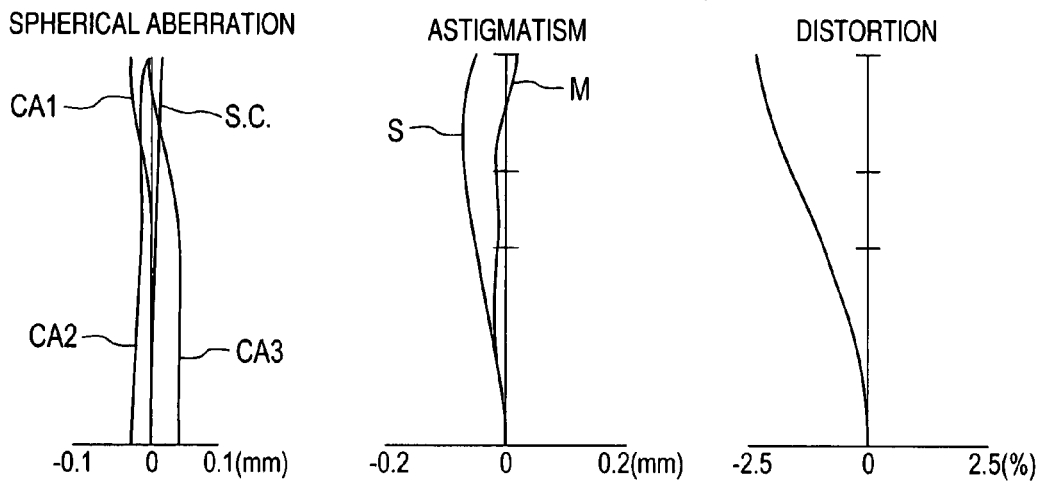
(EMBODIMENT 8: WIDE-ANGLE END)
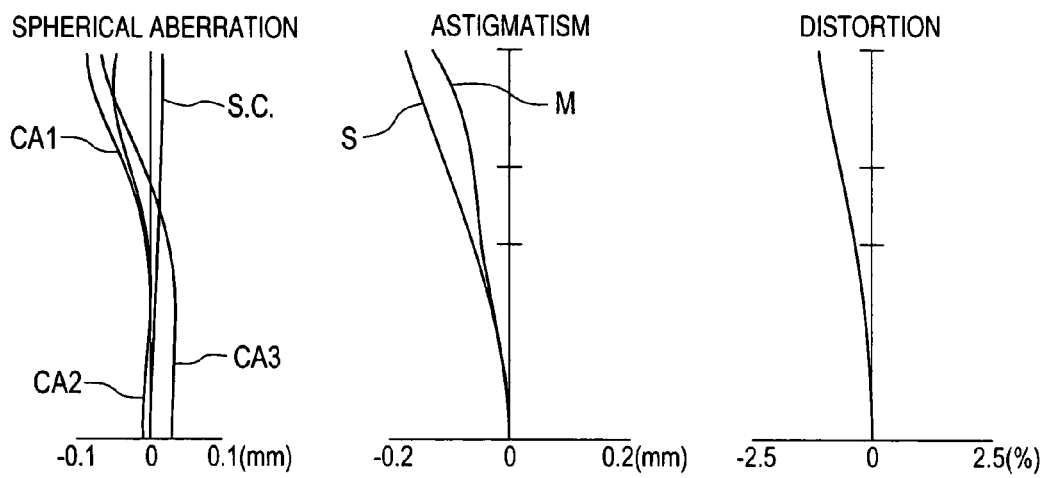
(EMBODIMENT 8: INTERMEDIATE AREA)
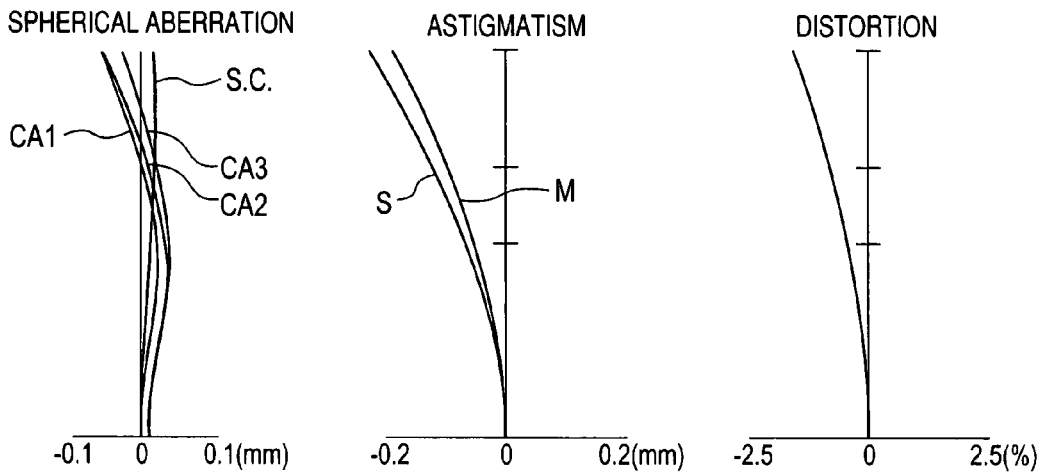
(EMBODIMENT 8: TELEPHOTO END)

FIG. 17 (EMBODIMENT 9)

FIG. 18
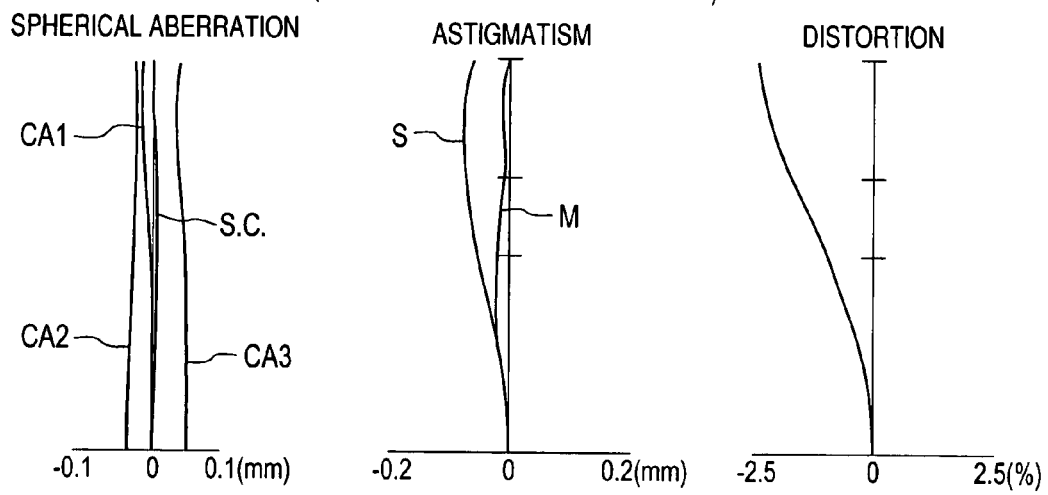
(EMBODIMENT 9: WIDE-ANGLE END)
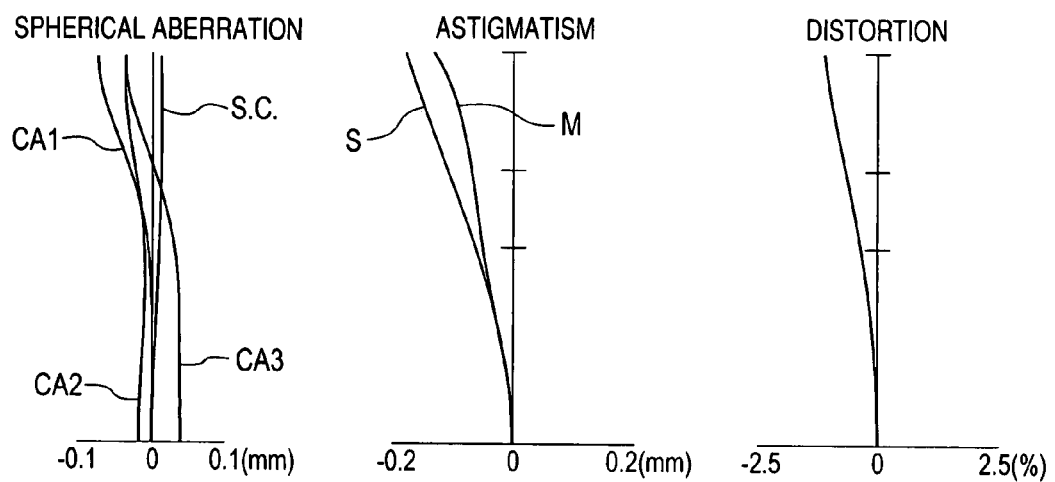
(EMBODIMENT 9: INTERMEDIATE AREA)
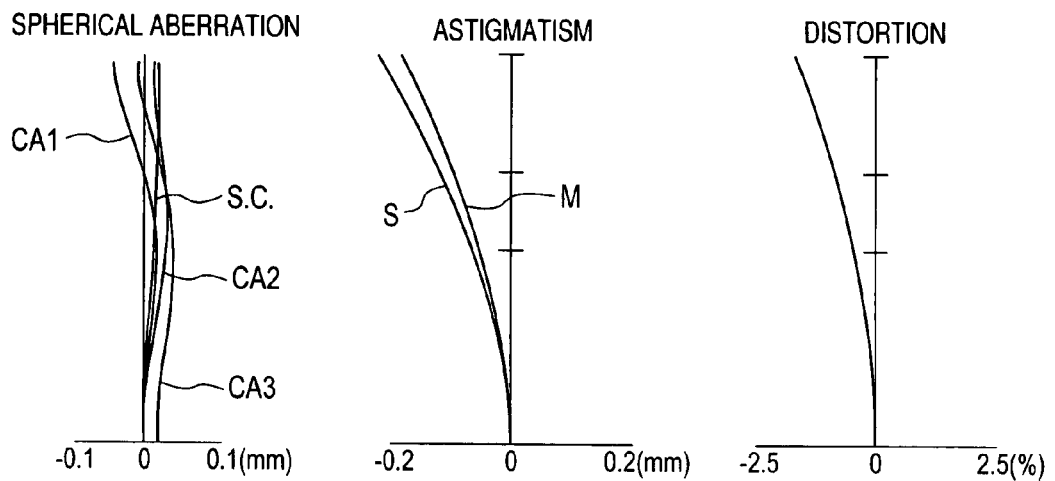
(EMBODIMENT 9: TELEPHOTO END)

FIG. 19 (EMBODIMENT 10)

FIG. 20
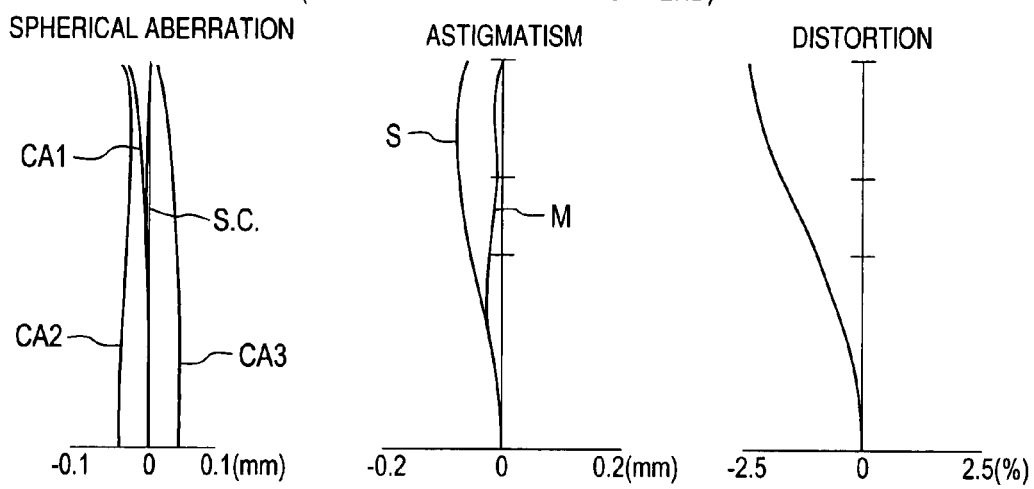
(EMBODIMENT 10: WIDE-ANGLE END)
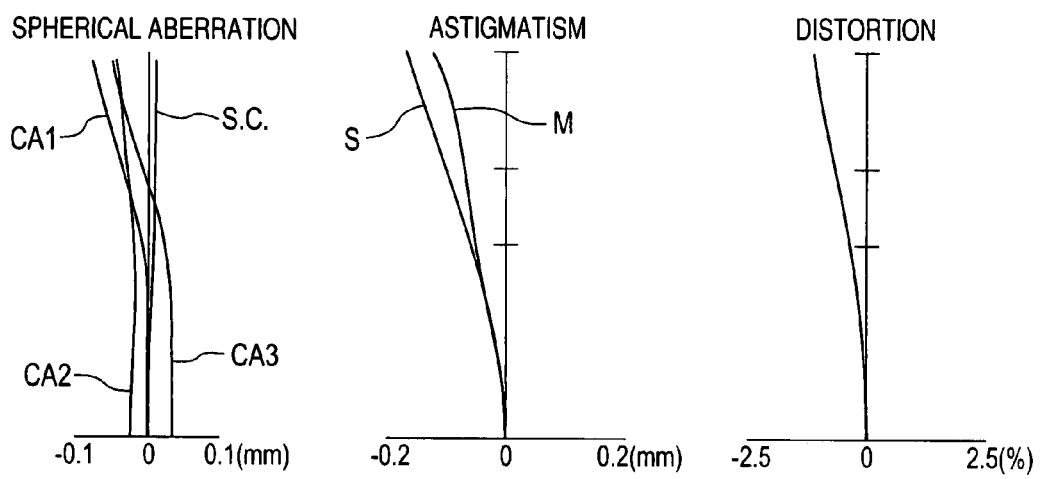
(EMBODIMENT 10: INTERMEDIATE AREA)
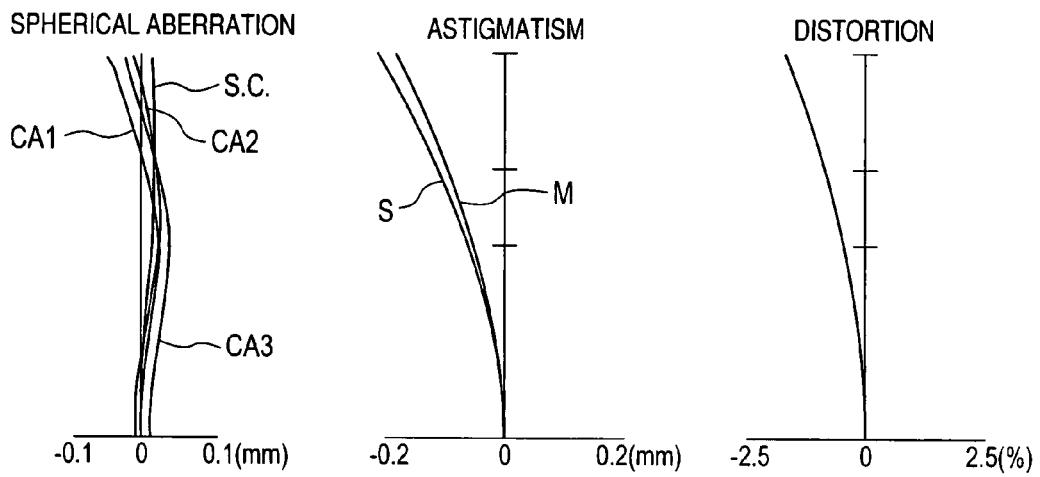
(EMBODIMENT 10: TELEPHOTO END)

FIG. 22
(EMBODIMENT 11: WIDE-ANGLE END)
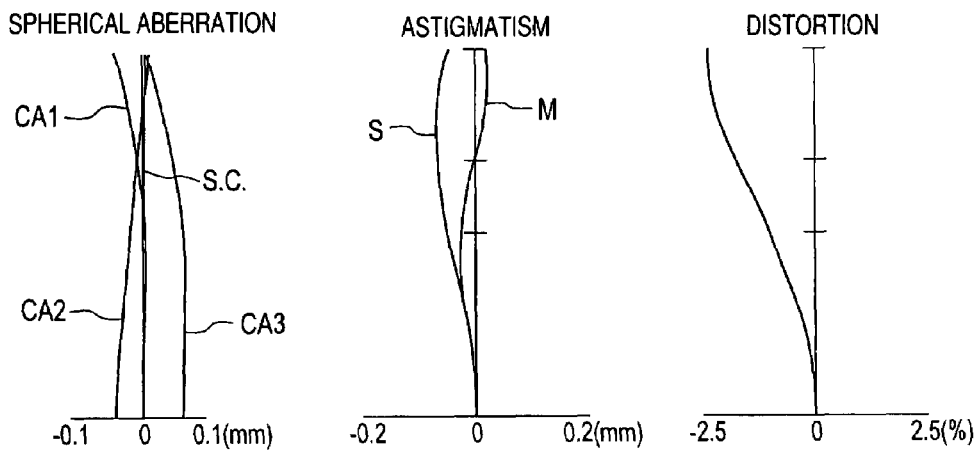
(EMBODIMENT 10: INTERMEDIATE AREA)
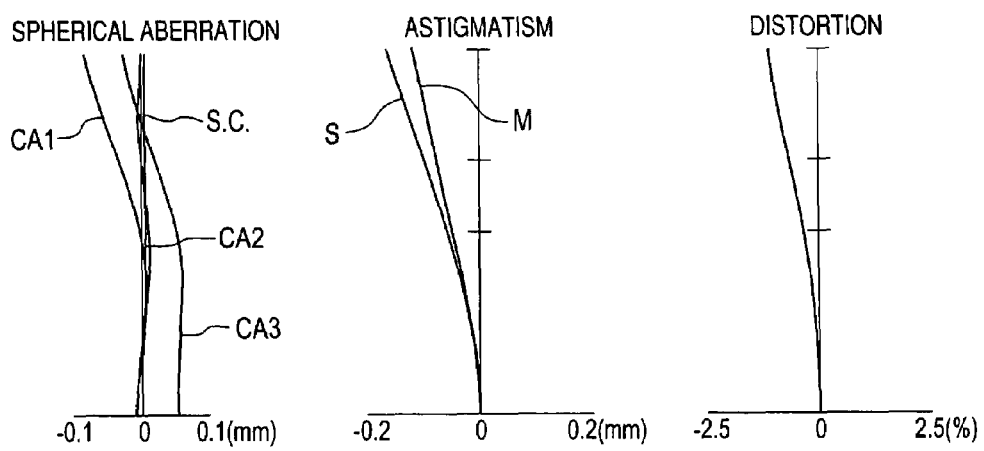
(EMBODIMENT 10: TELEPHOTO END)
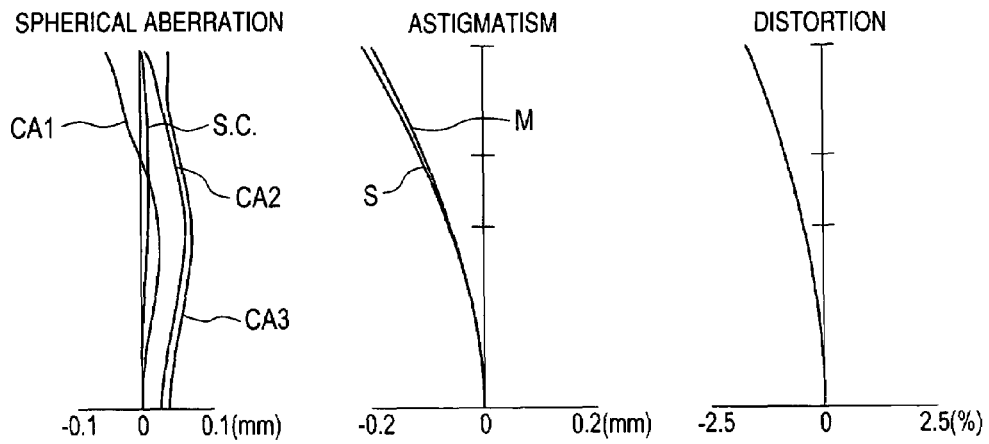

FIG. 24
(EMBODIMENT 12: WIDE-ANGLE END)
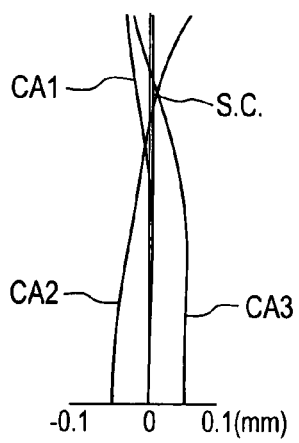
SPHERICAL ABERRATION
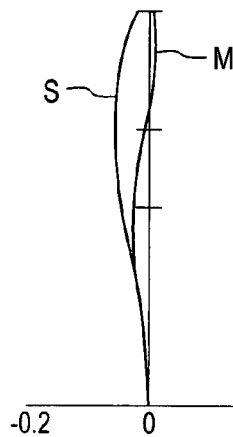
ASTIGMATISM
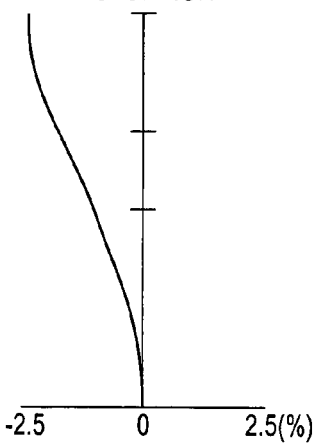
DISTORTION
(EMBODIMENT 12: INTERMEDIATE AREA)
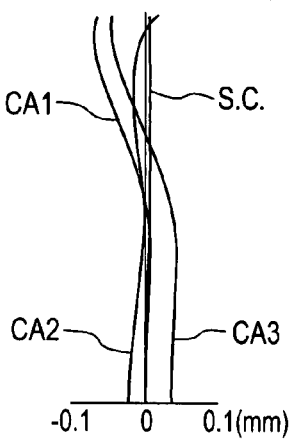
SPHERICAL ABERRATION
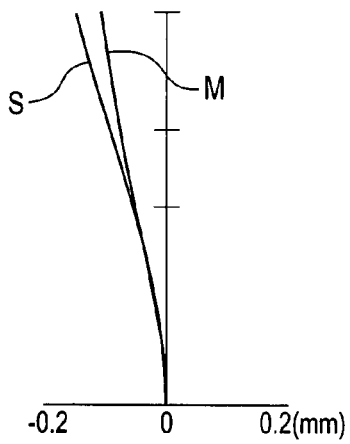
ASTIGMATISM
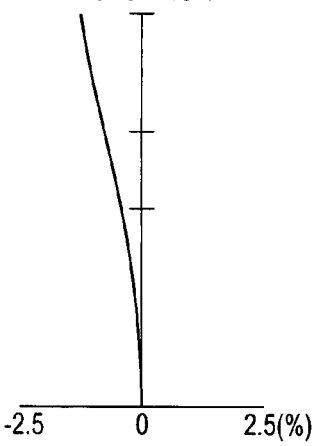
DISTORTION
(EMBODIMENT 12: TELEPHOTO END)
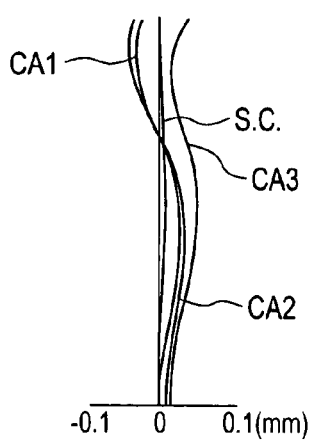
SPHERICAL ABERRATION
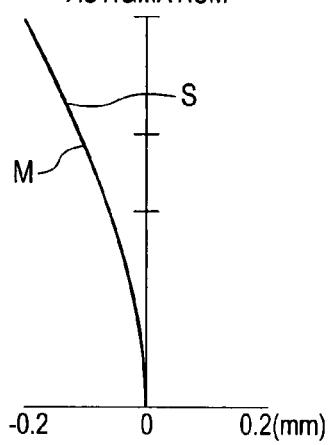
ASTIGMATISM
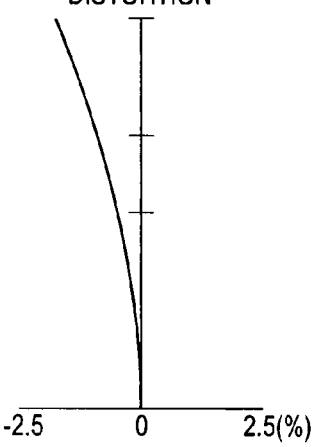
DISTORTION (EMBODIMENT 13)

FIG. 26
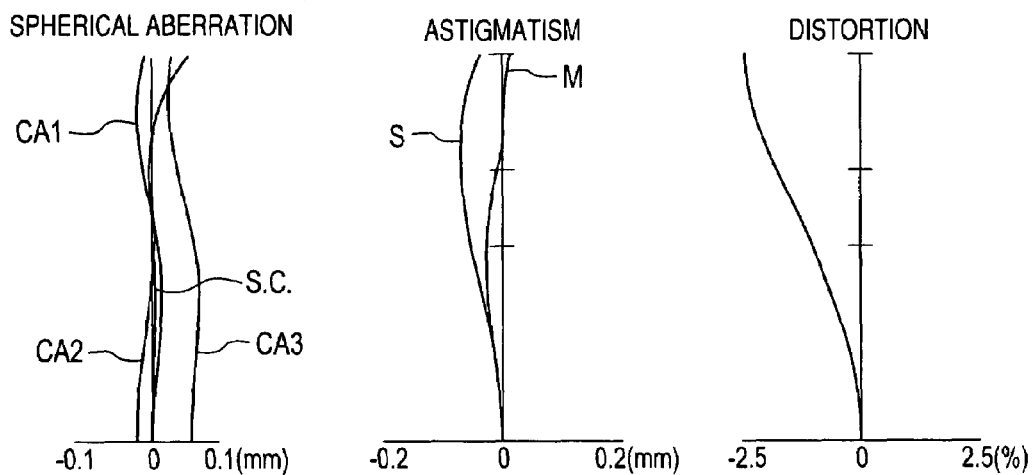
(EMBODIMENT 13: WIDE-ANGLE END)
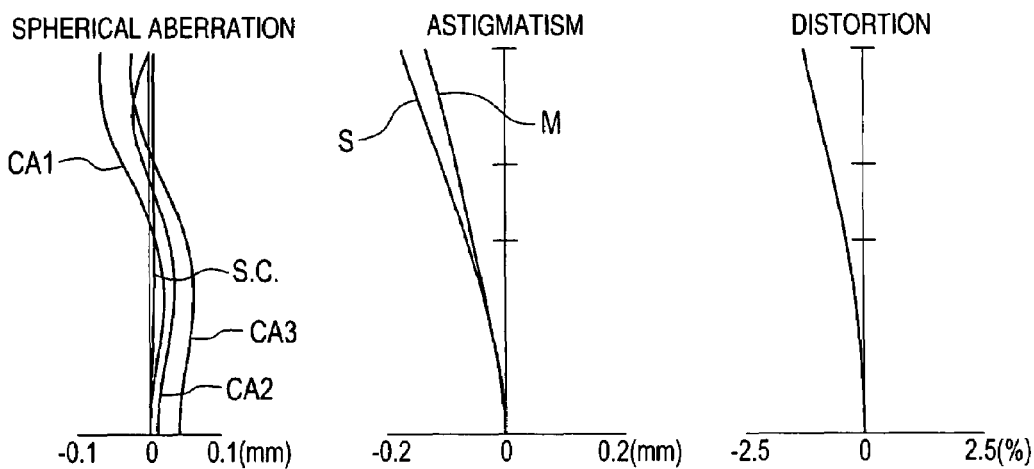
(EMBODIMENT 13: INTERMEDIATE AREA)
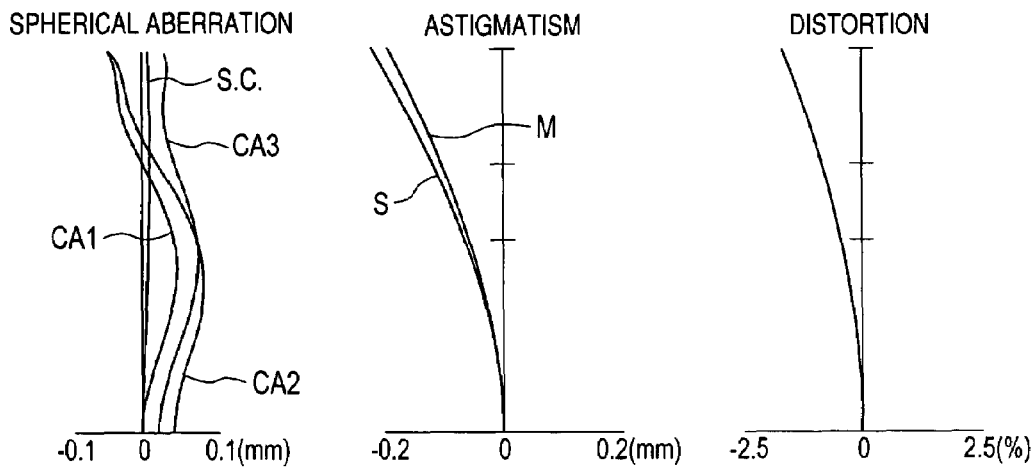
(EMBODIMENT 13: TELEPHOTO END)

(EMBODIMENT 14)

FIG. 28
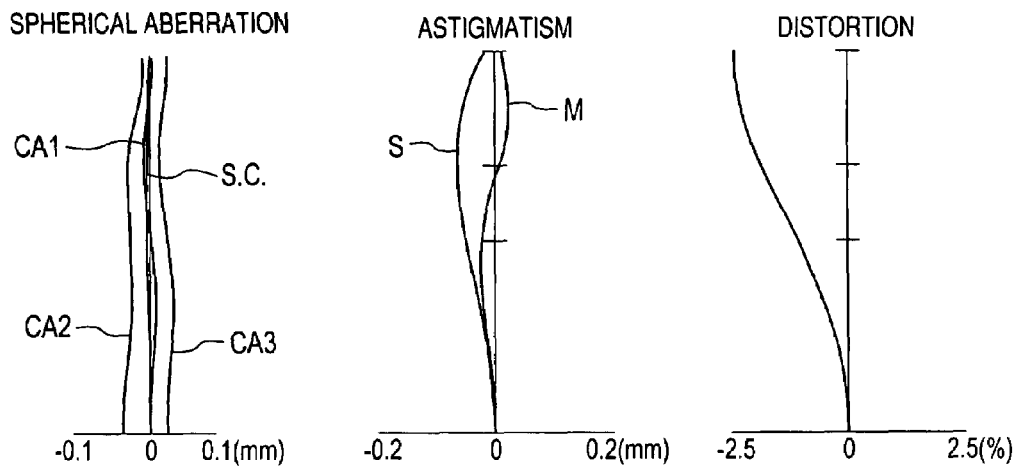
(EMBODIMENT 14: WIDE-ANGLE END)
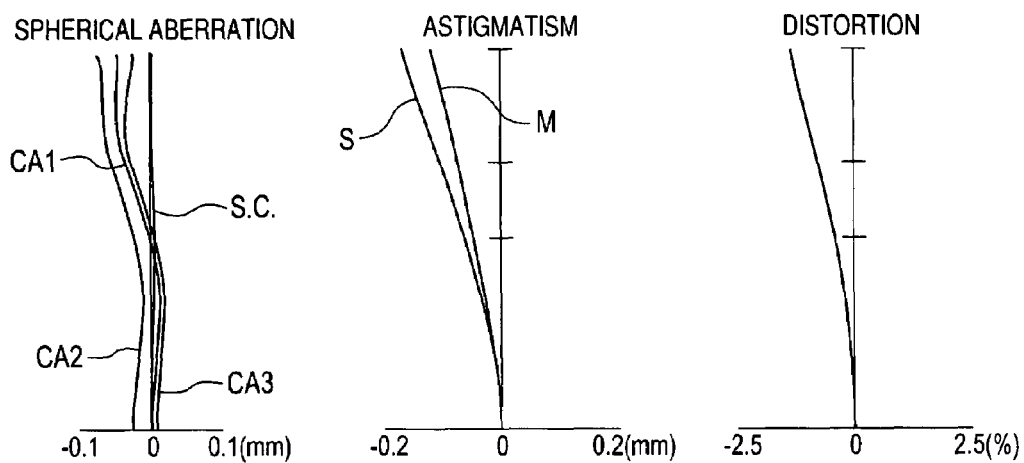
(EMBODIMENT 14: INTERMEDIATE AREA)
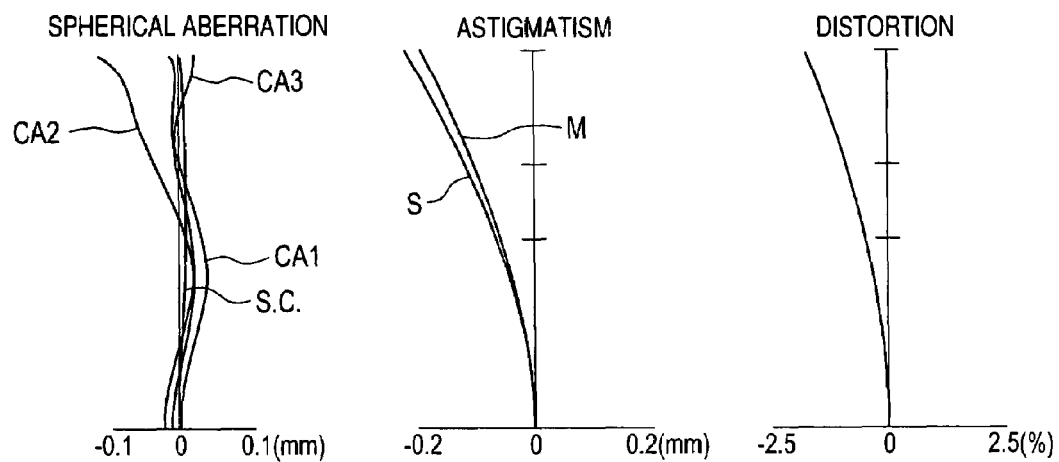
(EMBODIMENT 14: TELEPHOTO END)

FIG. 29 (EMBODIMENT 15)

FIG. 30
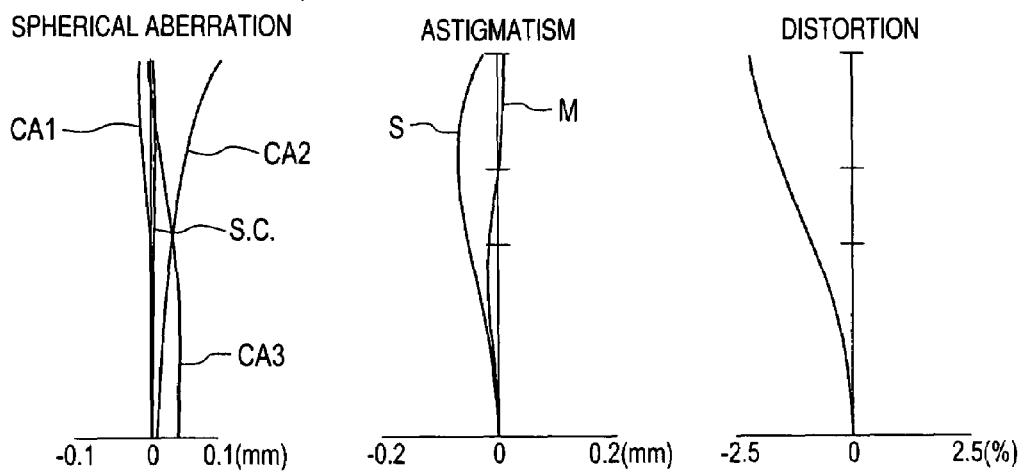
(EMBODIMENT 15: WIDE-ANGLE END)
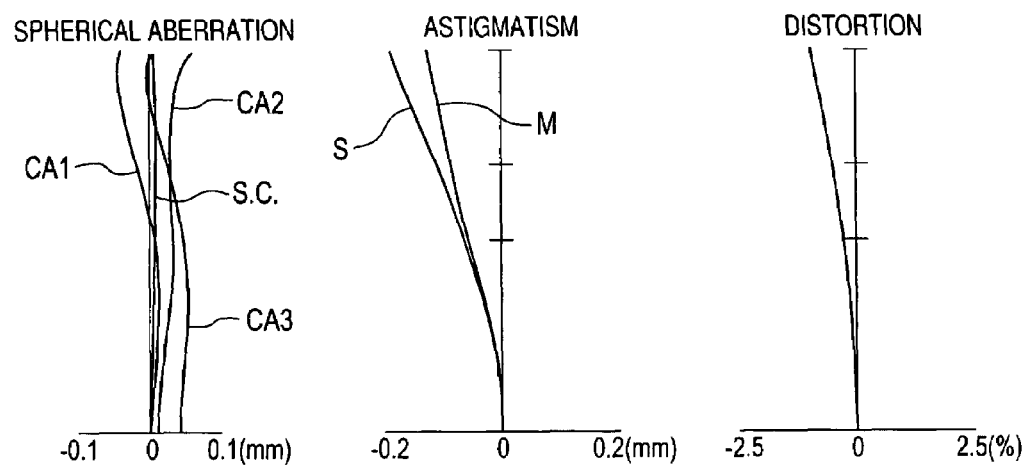
(EMBODIMENT 15: INTERMEDIATE AREA)
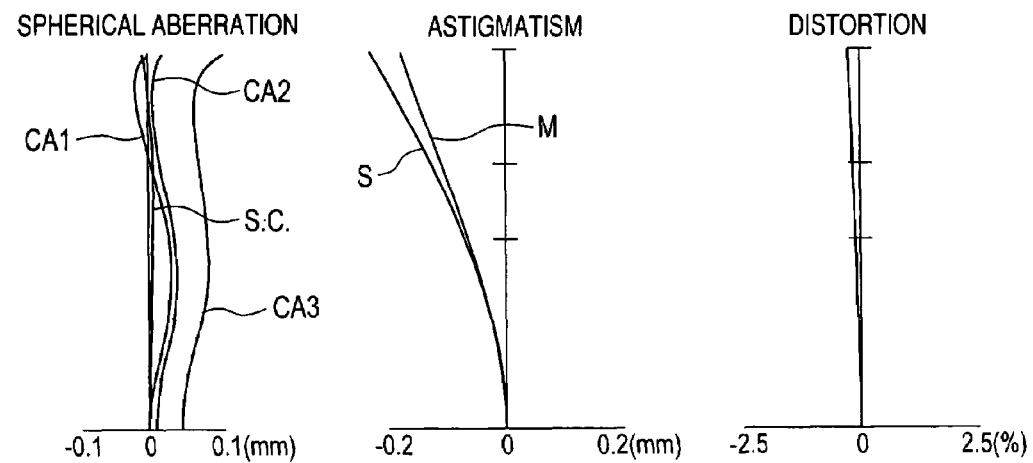
(EMBODIMENT 15: TELEPHOTO END)

ZOOM LENS AND PROJECTOR WITH ZOOM LENS

BACKGROUND OF THE INVENTION

The present invention relates to a compact zoom lens having a small lens aperture which projects an image from a light valve such as mainly a DMD (Digital Micromirror Device) which forms an image by changing reflecting directions of light on to a screen or the like in an enlarged fashion.

A projector unit which adopts a DMD as a light valve is regarded as advantageous over other methods in miniaturizing the projector unit. Currently, portable compact projector units have been broadly propagated, and among them, data projectors constitute a center of interest because of its handiness when presenting information. In projector units which should be portable, it is critical to reduce the thickness of a projector unit, and hence, it can be said that the reduction in thickness is a most critical factor in projector units which are carried together with a note-type personal computer in many cases. As an example of a means for solving this problem, for example, the Japanese Unexamined Patent Publication No. 2004-271668 discloses a design method for making a projection lens compact.

An aspect of the invention is to provide a projector unit which is thin enough to be carried conveniently and which can project an enlarged image with high image quality on to a large screen despite its limited space by realizing a compact zoom lens.

SUMMARY OF THE INVENTION

According to a preferred aspect of the invention, there is provided a zoom lens including a first lens group having a positive or negative refractive power as a whole, a second lens group having a negative refractive power as a whole, a third lens group having a positive refractive power as a whole, and a fourth lens group having a positive refractive power, wherein a variable power as a whole lens system of the zoom lens is established by configuring such that the first lens group and the fourth lens group are left fixed while a variable power is effected, the second lens group is made to move in a direction from a magnifying side to a contracting side over a range from a wide angle end to an intermediate area and, furthermore, move on an optical axis in such a manner as to move in a direction from the contracting side to the magnifying side over a range from the intermediate area to a telephoto end, and as this occurs, the third lens group is made to move on the optical axis in such a manner as to move in a direction from the contracting side to the magnifying side over a range from the wide angle end to the telephoto end, and wherein the following conditional expression (1) is satisfied with respect to a power set at the second lens group, the following conditional expression (2) is satisfied with respect to a power set at the third lens group, and the following conditional expression (3) is satisfied with respect to a positional relationship between the third lens group and the fourth lens group at the wide angle end;

$$-1.1 < f_w/f_{II} < -0.5 \quad (1)$$

$$0.35 < f_w/f_{III} < 0.55 \quad (2)$$

$$1.7 < d_{wIII}/f_w \quad (3)$$

where $f_w$: composite focal length of the whole lens system at the wide angle end (focused at a magnifying side object distance of 1700 mm from a lens surface of the first lens group which is situated closest to the magnifying side);

$f_{II}$: composite focal length of the second lens group;

$f_{III}$: composite focal length of the third lens group;

$d_{wIII}$: airspace between the third lens group and the fourth lens group at the wide angle end.

BRIEF DESCRIPTION OF THE DRAWINGS

FIG. 2 is a drawing showing aberrations of the zoom lens of the first embodiment.

FIG. 4 is a drawing showing aberrations of the zoom lens of the second embodiment.

FIG. 6 is a drawing showing aberrations of the zoom lens of the third embodiment.

FIG. 8 is a drawing showing aberrations of the zoom lens of the forth embodiment.

FIG. 10 is a drawing showing aberrations of the zoom lens of the fifth embodiment.

FIG. 12 is a drawing showing aberrations of the zoom lens of the sixth embodiment.

FIG. 14 is a drawing showing aberrations of the zoom lens of the seventh embodiment.

FIG. 16 is a drawing showing aberrations of the zoom lens of the eighth embodiment.

FIG. 18 is a drawing showing aberrations of the zoom lens of the ninth embodiment.

FIG. 20 is a drawing showing aberrations of the zoom lens of the tenth embodiment.

FIG. 22 is a drawing showing aberrations of the zoom lens of the eleventh embodiment.

FIG. 24 is a drawing showing aberrations of the zoom lens of the twelfth embodiment.

FIG. 26 is a drawing showing aberrations of the zoom lens of the thirteenth embodiment.

FIG. 28 is a drawing showing aberrations of the zoom lens of the fourteenth embodiment.

FIG. 30 is a drawing showing aberrations of the zoom lens of the fifteenth embodiment.

DESCRIPTION OF THE PREFERRED EMBODIMENTS

Figure 1:
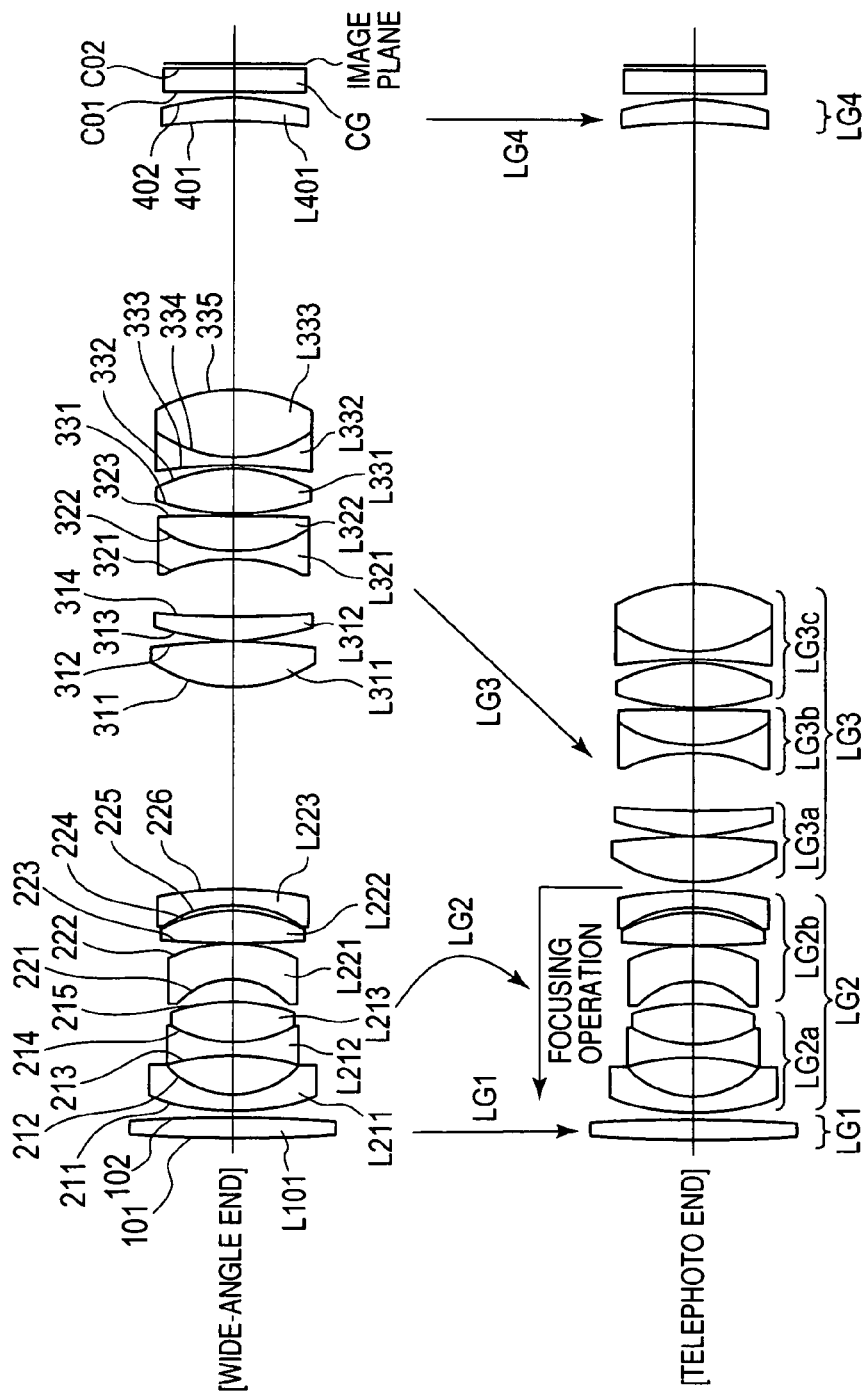
FIG. 1 is a drawing showing a lens configuration of a first embodiment of a zoom lens according to the invention.

Hereinafter, the present invention will be described based on specific numerical embodiments thereof. In $1^{st}$ embodiment to $15^{th}$ embodiment which will be described below, a zoom lens is made up of, in order from a magnifying side, a first lens component or group LG1 having a positive or negative refractive power as a whole, a second lens component or group LG2 having a negative refractive power as a whole, a third lens component or group LG3 having a positive refractive power as a whole, and a fourth lens component or group LG4 having a positive refractive power as a whole. The first lens group LG1 is made up by disposing only a single lens element having a positive refractive power (hereinafter, referred to as a positive lens element) or a lens element having a negative refractive power (hereinafter, referred to as a negative lens element) (the lens element being designated as L101, a magnifying side surface being designated as 101, and a contracting side surface being designated as 102). The second lens group LG2 is made up by disposing, in order from the magnifying side, a $2^{nd}$-a lens group LG2a and a $2^{nd}$-b lens group LG2b, and the $2^{nd}$-a lens group LG2a is made up by disposing, in order from the magnifying side, a meniscus negative lens (designated as L211 and having a magnifying side surface 211 and a contracting side surface 212) which is made convex to the magnifying side, a negative lens element (designated as L212 and having a magnifying side surface 213 and a contracting side surface 214) and a positive lens element (designated as L213 and having, when cemented, a magnifying side surface 214 and a contracting side surface 215), while the $2^{nd}$-b lens group LG2b, which follows the $2^{nd}$-a lens group LG2a, has a heavily concaved surface which is made concave towards the contracting side as a refracting surface which is situated closest to the magnifying side and a convex surface which is made convex towards the contracting side as a refracting surface which is situated closest to the contracting side and is made up by disposing one to three lens elements (designated in order from the magnifying side as L221, L222 . . . and having lens surfaces designated in order from the magnifying side as 221, 222 . . . ). In addition, the third lens group LG3 is made up by disposing, in order from the magnifying side a $3^{rd}$-a lens group LG3a, a $3^{rd}$-b lens group LG3b and a $3^{rd}$-c lens group LG3c. The $3^{rd}$-a lens group LG3a has a positive refractive power as a whole and is made up by disposing one to two positive lens elements (designated in order from the magnifying side as L311, L312 and having lens surfaces designated in order from the magnifying side as 311, 312, 313 and 314), the $3^{rd}$-b lens group LG3b has a negative refractive power as a whole and is made up of a single negative lens element or by disposing one negative lens element and one positive lens element (designated in order from the magnifying side as L321, L322 and having lens surfaces designated in order from the magnifying side as 321, 322, . . . ), and the $3^{rd}$-c lens group LG3c has a positive refractive power as a whole and is made up by disposing two positive lens elements and one negative lens element (designated in order from the magnifying side as L331, L332, . . . and having lens surfaces designated in order from the magnifying side as 331, 332, . . . ). In addition, the fourth lens group LG4 is made up by disposing a single positive lens element (designated as L401 and having a magnifying side surface designated as 401 and a contracting side surface designated as 402). Additionally, a cover glass CG (having a magnifying side surface C01 and a contracting side surface C02), which is a constituent part of a light valve such as a DMD (Digital Micromirror Device) is disposed in a slight airspace between the contracting side of the fourth lens group LG4 and a surface of the light valve. The $2^{nd}$-a lens group and the $2^{nd}$-b lens group which make up the second lens group LG2 are fixed to a second lens barrel, and the $3^{rd}$-a lens group LG3a, the $3^{rd}$-b lens group LG3b and the $3^{rd}$-c lens group LG3c which make up the third lens group LG3 are fixed to a third lens barrel. As variable power operations, the first lens group LG1 and the fourth lens group LG4 are fixed while a variable power is in effect, the second lens group LG2 is made to move in a direction from the magnifying side to the contracting side over a range from a wide angle end to an intermediate area and is made to move on an optical axis in such a manner as to move in a direction from the contracting side to the magnifying side over a range from the intermediate range to a telephoto end, and the third lens group LG3 is made to move on the optical axis as in such a manner as to move in a direction from the contracting side to the magnifying side over a range from the wide angle end to the telephoto end, whereby a variable power as a whole lens system of the zoom lens is effected.

As is known, the configuration of an aspherical surface which is used in each of the embodiments is defined by a curve plane obtained by rotating about the optical axis a curve given by the following aspherical expression when taking a Z axis in the optical direction and a Y axis in a direction which intersects the optical axis at right angles:

$$Z=(Y^2/r)/[1+\sqrt{\{1-(1+K)(Y/r)^2\}}]+A\cdot Y^4+B\cdot Y^6+C\cdot Y^8+D\cdot Y^{10}+$$

where, r: paraxial radius of curvature; K: cone constant; A, B, C, D . . . : higher order aspherical coefficients. Note that in representing the cone constant and higher order aspherical constant in tables, "E and a number following the E" represents a "power of 10." For example, "E−4" means $10^{-4}$, and a numerical value lying directly before this numeric value only has to be multiplied thereby.

Furthermore, the zoom lens of this embodiment includes a first lens group having a positive or negative refractive power as a whole, a second lens group having a negative refractive power as a whole, a third lens group having a positive refractive power as a whole, and a fourth lens group having a positive refractive power, wherein the following conditional expression (1) is satisfied with respect to a power set at the second lens group, the following conditional expression (2) is satisfied with respect to a power set at the third lens group, and the following conditional expression (3) is satisfied with respect to a positional relationship between the third lens group and the fourth lens group at the wide angle end;

$$-1.1 < f_w/f_{II} < -0.5 \quad (1)$$

$$0.35 < f_w/f_{III} < 0.55 \quad (2)$$

$$1.7 < d_{wIII}/f_w$$

where $f_w$: composite focal length of the whole lens system at the wide angle end (focused at a magnifying side object distance of 1700 mm from a lens surface of the first lens group which is situated closest to the magnifying side);

$f_{II}$: composite focal length of the second lens group;

$f_{III}$: composite focal length of the third lens group;

$d_{wIII}$: airspace between the third lens group and the fourth lens group at the wide angle end).

The conditional expression (1) represents a condition associated with an appropriate distribution of power to the second lens group which has the negative refractive power as a whole. This becomes a necessary condition for balancing a condition for properly correcting the size of the whole optical system and aberrations. In addition, a space where an optical system for illuminating the light valve such as the DMD is disposed needs to be secured in an airspace portion defined between the third lens group and the fourth lens group, and the condition constitutes an important restriction in securing the space. Because of this, in the event that a lower limit is surpassed, the negative resultant power possessed by the second lens group becomes large, and in conjunction with this, the positive power of the third lens group and the fourth lens group have to intensified, whereby balancing the aberrations becomes difficult and the performance is deteriorated. In addition, with a large numerical value, a large airspace has to be defined between the third lens group and the fourth lens group, whereby the size of the whole optical system becomes large, which contradicts to the object of the invention to miniaturize the zoom lens, or no airspace can be secured between the third lens group and the fourth lens group. The conditional expression (2) is associated with the third lens group having the strong positive power which governs the variable power of the whole lens system by moving along the optical direction. In the event that the positive power increases to exceed an upper limit, the moving distance of the third lens group in relation to variable power can be small, but the balance with the other lens groups is collapsed, whereby the performance is decreased. On the contrary, in the event that a lower limit is surpassed, it is advantageous with respect to aberration, but the moving distance is increased, and this will do the damage to the miniaturization of the zoom lens. In addition, the conditional expression (3) is a space condition of the third lens group and the fourth lens group at the wide angle end. This space needs to be secured for the space for the illumination system of the light valve. Consequently, in the event that a lower limit is surpassed, the space for the illumination system becomes insufficient, which makes difficult the design of a projector unit.

Furthermore, the first lens group is made up by disposing only a lens element having a positive refractive power (hereinafter, referred to as a positive lens element) or a lens element having a negative refractive power (hereinafter, referred to as a negative lens element), and the following conditional expression (4) is satisfied with respect to a power set at the first lens group:

$$|f_w/f_I| < 0.3 \quad (4)$$

where, $f_I$: composite focal length of the first lens group.

While the positive or negative power set at the first lens group as shown in conditional expression (4) is relatively small, the positive or negative power so set is such as to finally balance the resultant aberration of the second lens group bearing the primary power and the lens groups lying therebehind, and in the event that the first lens group has an excessive power which surpasses the power expressed by the conditional expression (4), aberrations are deteriorated due to the first lens group being made up of a single lens element.

Furthermore, the second lens group is made up by disposing, in order from the magnifying side, a $2^{nd}$-a lens group and a $2^{nd}$-b lens group, and the following conditional expression (5) is satisfied with respect to a power set at the $2^{nd}$-a lens group, the following conditional expression (6) is satisfied with respect to a power set at the $2^{nd}$-b lens group, and the following conditional expression (7) is satisfied with respect to a dimension of the second lens group on the optical axis:

$$-1.0 < f_w/f_{IIa} < -0.1 \quad (5)$$

$$-0.5 < f_w/f_{IIb} < 0.1 \quad (6)$$

$$1.0 < T_{II}/f_w < 2.2 \quad (7)$$

where, $f_{IIa}$: composite focal length of the $2^{nd}$-a lens group which makes up the second lens group;

$f_{IIb}$: composite focal length of the $2^{nd}$-b lens group which makes up the second lens group;

$T_{II}$: a distance on the optical axis between a magnifying side surface of a lens element of the second lens group which is disposed closest to the magnifying side and a contracting side surface of a lens element of the second lens group which is disposed closest to the contracting side.

The conditional expression (5) and the conditional expression (6) are such as to secure the space where to dispose the illumination system, that is, a portion corresponding to a back focus, which is normally long, between the third lens group and the fourth lens group under the contradicting conditions of the good performance and the miniaturization. Then, the second lens group must have a strong negative power to realize what has just been mentioned, and it is good to distribute such a negative power in a way expressed by the conditional expressions (5), (6). As the contents that are expressed by the respective conditional expressions, the conditional expression (5) relates to the negative power of the $2^{nd}$-a lens group. In order to extend the portion which corresponds to the back focus between the third lens group and the fourth lens group, it is effective to increase, in particular, the negative power of the $2^{nd}$-a lens group, and in the event that upper and lower limits are surpassed, the negative power of the $2^{nd}$-b lens group or the $2^{nd}$-a lens group becomes too large, and a good performance cannot be obtained. Similarly, the conditional expression (6) relates to the negative power of the $2^{nd}$-b lens group, and in general, it is advantageous that the negative power of the $2^{nd}$-b lens group is smaller than that of the $2^{nd}$-a lens group. In the event that upper and lower limits are surpassed, the negative power of the $2^{nd}$-b lens group or the $2^{nd}$-a lens group becomes too large, and a good performance cannot be obtained. The conditional expression (7), which follows the conditional expressions (5), (6), indicates an effective condition to decrease the aperture of, in particular, the lens lying in the vicinity of the front lens. A bundle of rays that has emerged from the second lens group is largely diffused due to the strong negative power of the second lens group, and consequently, the aperture of the lens can easily be increased. This is prevented by increasing the thickness of the second lens group in a way expressed by the conditional expression (7). On the other hand, in order to disperse the negative power of the second lens group, the number of lens elements needs to be increased, and hence, the second lens group inevitably needs to be long to some extent. In the event that a lower limit is surpassed, it becomes difficult to decrease the aperture, whereas in the event that an upper limit is surpassed, a dimension in the optical axis becomes too large, and it becomes difficult to satisfy the specification. In addition to this, in association with the increase in the number of lens elements, the weight of the second lens group is increased, and this does the damage to the idea of miniaturization.

Furthermore, the following conditional expression (8) is satisfied with respect to a configuration of a contracting side surface of a lens element of the $2^{nd}$-a lens group which is disposed closest to the magnifying side, the following conditional expression (9) is satisfied with respect to the characteristics of a refractive index of a glass material which is used for each lens element which makes up the $2^{nd}$-a lens group, the following conditional expression (10) is satisfied with respect to the dispersing characteristics of the glass material used for each lens element which makes up the $2^{nd}$-a lens group, and the following conditional expression (11) is satisfied with respect to a configuration of a lens element of the $2^{nd}$-b lens group which is disposed closets to the magnifying side:

$$0.85 < f_w/r_{IIa2} < 1.7 \quad (8)$$

$$1.65 < N_{IIa} \quad (9)$$

$$V_{IIap} - V_{IIaN} < -10 \quad (10)$$

$$-1.8 < f_w/r_{IIb1} < -0.85 \quad (11)$$

where, $r_{IIa2}$: radius of curvature of the contracting side surface of the lens element of the $2^{nd}$-a lens group which is disposed closest to the magnifying side;

$r_{IIb1}$: radius of curvature of the magnifying side surface of the lens element of the $2^{nd}$-b lens group which is disposed closest to the magnifying side;

$N_{IIa}$: mean value of the refractive index of each lens element which makes up the $2^{nd}$-a lens group relative to the d line;

$V_{IIap}$: mean value of Abbe number of each positive lens element which makes up the $2^{nd}$-a lens group;

$V_{IIaN}$: mean value of Abbe number of each negative lens element which makes up the $2^{nd}$-a lens group.

The conditional expression (8) relates to the configuration of the contracting side of the lens element of the $2^{nd}$-a lens group which is disposed closest to the magnifying side and defines a configuration which is made generally concentric relative to a bundle of rays on the magnifying side and which basically suppresses the generation of aberrations while allowing the relevant lens group to have the strong power. Consequently, in the event that an upper limit is surpassed, spherical aberration and coma are corrected excessively, whereas in the event that a lower limit is surpassed, those aberrations are corrected insufficiently. The conditional expression (9) relates particularly to the characteristics of the refractive index of the $2^{nd}$-a lens group which has the strong negative power. In order to reduce the strength of curvature which results from the acquisition of the strong negative power, the $2^{nd}$-a lens group must have a high refractive index, and in the event that a lower limit is surpassed in the conditional expression, the spherical aberration and coma aberration become too large because the curvature of the surface becomes too large, and the Petzval sum also becomes too small, thereby making it impossible to obtain a good performance. The conditional expression (10) is an achromatism condition which constitutes the base of the second lens group and is also a condition for maintaining a good chromatic aberration correction. The conditional expression represents the balance of the dispersion characteristics of the glass material which is used for the $2^{nd}$-a lens group which is responsible for the large negative power in the second lens group which has the strong negative power, and it is important to suppress the basic chromatic aberration generated in the interior of the lens group to a small level by balancing the dispersion characteristics. By selecting a glass material for these lens elements under the condition expressed by the conditional expression (10), a proper power distribution can be realized, thereby making it possible to correct the chromatic aberration properly. In the event that an upper limit is surpassed, the power of each lens element becomes too large due to the correction of chromatic aberration, and therefore, the aberrations are deteriorated. The conditional expression (11) is such as to affect the spherical aberration and coma aberration in the second lens group and the effective aperture of the lens element which makes up the first lens group (that is, the aperture of the front lens element). The specification of the zoom lens of this embodiment requires that the angle of view at the wide angle end be wide while the aperture of the front lens element is designed small. Normally, these two conditions are conditions which contract to each other. In order to decrease the aperture of the front lens element while attaining satisfied corrections of the respective aberrations, a bundle of rays which correspond to an image point where an image height becomes large need to be passed through the first lens group at a position where the height of a light ray becomes low. It is the lens element of the $2^{nd}$-b lens group which is disposed closest to the magnifying side that realizes what has just been mentioned in a remarkable way within the second lens group. Although the power given to this lens element is relatively small, the lens element attains its purpose by taking the meniscus configuration in which the lens element is made convex largely on the contracting side thereof. On the other hand, a good balance has to be maintained between realizing the small aperture of the front lens element and the correction of spherical aberration and coma aberration, and in the event that a lower limit is surpassed, that is, in the event that the radius of curvature becomes too small, the degree of freedom in correction of spherical aberration and coma aberration becomes insufficient, and in the event that an upper limit is surpassed, the aperture of the front lens element needs to be increased in order to maintain the good balance, thereby making it impossible to attain the object of miniaturization of the zoom lens.

Furthermore, at least a magnifying side surface of the lens element of the $2^{nd}$-a lens group which is disposed closest to the magnifying side is aspheric, and the following conditional expression (12) is satisfied with respect to a power to be set and the following conditional expression (13) is satisfied with respect to a configuration of a magnifying side surface of a lens element of the $2^{nd}$-a lens group which is disposed second closest to the magnifying side:

$$-1.0 < f_w/f_{IIa1} < -0.5 \quad (12)$$

$$-0.8 < f_w/r_{IIa3} < -0.1 \quad (13)$$

where, $f_{IIa1}$: focal length of the lens element making up the $2^{nd}$-a lens group which is disposed closest to the magnifying side;

$r_{IIa3}$: radius of curvature of the lens element making up the $2^{nd}$-a lens group which is disposed second closest to the magnifying side.

The conditional expression (12) relates to the power set to the lens element making up the $2^{nd}$-a lens group which is disposed closest to the magnifying side and affects off-axis aberrations largely. In the event that an upper limit is surpassed, the negative power becomes too small, and a sufficient measure cannot be taken to correct the off-axial aberrations, whereas in the event that a lower limit is surpassed, the negative power becomes too large, and the aberrations including chromatic aberration are deteriorated. The conditional expression (13), which follows the conditional expression (12), relates to the configuration of the magnifying side surface of the lens element making up the $2^{nd}$-a lens group which is disposed second closest to the magnifying side and constitutes, together with the conditional expressions (8), (12), a condition for maintaining the balance of off-axis aberrations from the first lens group to the $2^{nd}$-a lens group. In the even that an upper limit is surpassed, the radius of curvature of the relevant surface becomes small, whereas in the event that a lower limit is surpassed, the radius of curvature becomes large. In either of the cases, it becomes difficult to correct chromatic aberration of magnification which is an off-axis aberration and distortion.

Furthermore, the third lens group is made up by disposing, in order from the magnifying side, a $3^{rd}$-a lens group, a $3^{rd}$-b lens group and a $3^{rd}$-c lens group, and the following conditional expression (14), conditional expression (15) and conditional expression (16) are satisfied with respect to powers set at the $3^{rd}$-a lens group, $3^{rd}$-b lens group and $3^{rd}$-c lens group, respectively, and the following conditional expression (17) is satisfied with respect to the characteristics of refractive index of a glass material used for each lens element which makes up the third lens group:

$$0.32 < f_w/f_{IIIa} < 0.8 \tag{14}$$

$$-0.8 < f_w/f_{IIIb} < -0.25 \tag{15}$$

$$0.2 < f_w/f_{IIIc} < 0.6 \tag{16}$$

$$N_{IIIp} < 1.65 \tag{17}$$

where, $f_{IIIa}$: composite focal length of the $3^{rd}$-a lens group which makes up the third lens group;

$f_{IIIb}$: composite focal length of the $3^{rd}$-b lens group which makes up the third lens group;

$f_{IIIc}$: composite focal length of the $3^{rd}$-c lens group which makes up the third lens group;

$N_{IIIp}$: mean value of refractive index of each lens element which makes up the third lens group relative to the line d.

The conditional expression (14) relates to the $3^{rd}$-a lens group which is disposed on the magnifying side of the third lens group and which has a strong positive power, and this $3^{rd}$-a lens group is made up of one or two positive lens elements. This conditional expression represents a condition for giving a large positive power so as to make a bundle of rays which are diffused from the second lens group to the third lens group converge and correcting aberrations properly. In the event that an upper limit is surpassed, the positive power becomes too large, whereas in the event that a lower limit is surpassed, on the contrary, the positive power for convergence of the bundle of rays becomes insufficient. In either of the cases, the spherical aberration and chromatic aberration are largely affected. The conditional expression (15) relates to the power of the negative $3^{rd}$-b lens group, and disposing this negative power in combination with the positive powers of the positive $3^{rd}$-a and $3^{rd}$-c lens groups is critical to basically suppress aberrations such as chromatic aberration and field curvature to a low level. In the event that an upper limit is surpassed, since the group power of the positive $3^{rd}$-a and $3^{rd}$-c lens groups becomes small due to the correction of chromatic aberration, it is not possible to decrease the Petzval sum. In the event that a lower limit is surpassed, on the contrary, since a combination of strong positive power and negative power results, higher order spherical aberration and coma aberration become too large. In addition, the conditional expression (16) specifies the power of the $3^{rd}$-c lens group. By distributing the positive power of the third lens group as expressed by the conditional expressions (14), (16), a good performance can be obtained. In the event that an upper limit is surpassed, the power of the $3^{rd}$-c lens group becomes too large, whereas in the event that a lower limit is surpassed, the power of the $3^{rd}$-a lens group becomes too large, and in either of the cases, a good performance cannot be obtained. On the other hand, the conditional expression (17) relates to the refractive index of the positive lens element of the constituent elements and represents a condition which is necessary in correcting field curvature. To realize the miniaturization of the zoom lens, the negative second lens group has the strong power, whereby the Petzval sum tends to become too small. By suppressing the refractive index of the positive lens element which makes up the third lens group to a low level by the conditional expression (17), a correction is performed while maintaining a good balance. Consequently, in the event that an upper limit is surpassed, the field curvature is corrected excessively.

Furthermore, the following conditional expression (18) is satisfied with respect to a configuration of a magnifying side surface of a lens element of the $3^{rd}$-a lens group which is disposed closest to the magnifying side, and the following conditional expression (19) is satisfied with respect to the dispersion characteristics of a glass material which is used for each lens element which makes up the $3^{rd}$-a lens element:

$$0.35 < f_w/r_{IIIa1} < 0.9 \tag{18}$$

$$50 < V_{IIIa} \tag{19}$$

where, $r_{IIIa1}$: radius of curvature of the magnifying side surface of the lens element of the $3^{rd}$-a lens group which is disposed closest to the magnifying side;

$V_{IIIa}$: mean value of Abbe number of each lens element which makes up the $3^{rd}$-a lens group.

The conditional expression (18) is a conditional expression for correcting spherical aberration with good balance. Namely, as to the configuration of the magnifying side surface of the lens element of the $3^{rd}$-a lens group which is disposed closest to the magnifying side, a configuration is given which has a strong positive power to make a bundle of diffused rays which emerge from the second lens group converge, and as a result of this, a larger under spherical aberration is generated. In contract with this, as will be described later on, a large over spherical aberration is generated on the magnifying side surface of the lens element of the $3^{rd}$-b lens group which is disposed closest to the magnifying side, whereby well-balanced relative constructions result. Consequently, in the event that an upper limit of the conditional expression (18) is surpassed, the under spherical aberration becomes large, whereas in the event that a lower limit is surpassed, the over spherical aberration becomes large. The conditional expression (19) represents a condition for correcting chromatic aberration. As has been described above, since the $3^{rd}$-a lens group has the strong positive power, it largely affects chromatic aberration. Consequently, as is expressed by the conditional expression (19), it is inevitable to use a material which has a large Abbe number (small dispersion). In the event that a lower limit is surpassed, the chromatic aberration relative to a short wavelength in the $3^{rd}$-a lens group becomes large towards the under side, and it becomes impossible to correct the chromatic aberration.

Furthermore, the following conditional expression (20) is satisfied with respect to a configuration of a magnifying side surface of a lens element of the $3^{rd}$-b lens group which is disposed closest to the magnifying side:

$$-0.8 < f_w / r_{IIIb1} < -0.25 \quad (20)$$

where, $r_{IIIb1}$: radius of curvature of the magnifying side surface of the lens element of the $3^{rd}$-b lens group which is disposed closest to the magnifying side.

The conditional expression (20) is a conditional expression which corrects spherical aberration with good balance together with the conditional expression (18) as has been described previously. Relative constructions like those that have been described above result, and in the event that a lower limit is surpassed in the conditional expression (20) is surpassed, the over spherical aberration becomes large, whereas in the event that an upper limit is surpassed, the under spherical aberration becomes large.

Furthermore, the following expression (21) is satisfied with respect to a configuration of a contracting side surface of a lens element of the $3^{rd}$-c lens element which is disposed closest to a contracting side, and the following conditional expression (22) is satisfied with respect to the dispersion characteristics of a glass material which is used for each lens element which makes up the $3^{rd}$-c lens group:

$$-0.75 < f_w / r_{IIIc5} < -0.2 \quad (21)$$

$$10 < V_{IIIcP} - V_{IIIcN} \quad (22)$$

where, $r_{IIIc5}$: radius of curvature of the contracting side surface of the lens element of the $3^{rd}$-c lens group which is disposed closest to the contracting side;

$V_{IIIcP}$: mean value of Abbe number of each positive lens element which makes up the $3^{rd}$-c lens group;

$V_{IIIcN}$: mean value of Abbe number of each negative lens element which makes up the $3^{rd}$-c lens group.

The conditional expression (21) is a conditional expression for correcting the spherical aberration over the whole lens system in an elaborate fashion. The correction performed in a way expressed by the conditional expression is such as to correct the residual spherical aberration which remains uncorrected by the configurations of the magnifying side surface of the lens element of the $3^{rd}$-a lens group which is disposed closest to the magnifying side and the magnifying side surface of the lens element of the $3^{rd}$-b lens group which is disposed closest to the magnifying side which surfaces are dominant in correction of spherical aberration. In the event that an upper limit is surpassed, an insufficient correction results, and on the contrary, in the event that a lower limit is surpassed, an excessive correction results. The conditional expression (22) is a condition for correcting color in the $3^{rd}$-c lens group. In order to correct monochromatic aberration, it is necessary that the power of each lens element does not become too large, and to make this happen, it is a necessary condition that the positive lens element and negative lens element have to have Abbe numbers which satisfy the conditional expression (22). In the event that a lower limit is surpassed, it becomes difficult to correct chromatic aberration.

Furthermore, the $3^{rd}$-c lens group includes a partial system constituent element which is made up of at least two lens elements, one negative lens element and one positive lens element which are cemented together, and the following conditional expression (23) is satisfied with respect to a refractive index of a glass material used for each of the lenses which are cemented together, and the following conditional expression (24) is satisfied similarly with respect to the dispersion characteristics of the glass material used for each of the lens elements which are cemented together:

$$0.25 < N_{IIIcCN} - N_{IIIcCP} \quad (23)$$

$$20 < V_{IIIcCP} - V_{IIIcCN} \quad (24)$$

where, $N_{IIIcCP}$: mean value of the refractive index of the positive lens element of the $3^{rd}$-c lens group which is disposed in the cemented partial system thereof relative to the line d;

$N_{IIIcCN}$: mean value of the refractive index of the negative lens element of the $3^{rd}$-c lens group which is disposed in the cemented partial system thereof relative to the line d;

$V_{IIIcCP}$: mean value of Abbe number of the positive lens element of the $3^{rd}$-c lens group which is disposed in the cemented partial system thereof;

$V_{IIIcCN}$: mean value of Abbe number of the negative lens element of the $3^{rd}$-c lens group which is disposed in the cemented partial system thereof.

As for methods of disposing the cemented partial system of the $3^{rd}$-c lens group, in the case of a single positive lens element being disposed separately, there are a method for disposing the positive lens element on the magnifying side and a method for disposing the same lens element on the contracting side. In either of the cases, there is provided a difference in refractive index to the cemented lens elements, so as to expect an effect of the correction of field curvature while maintaining the correction capability of spherical aberration at the cemented surface. In the event that a lower limit is surpassed in the conditional expression (23), field curvature is corrected excessively, while spherical aberration is corrected insufficiently. In addition, the conditional expression (24) is a conditional expression relating to the correction of chromatic aberration in the whole lens system, and in the event that a lower limit is surpassed, in particular, the chromatic aberration of magnification is increased.

Furthermore, the fourth lens group is made up by disposing a positive lens element, and the following conditional expression (25) is satisfied with respect to a power set at the fourth lens group:

$$f_w / f_{IV} < 0.3 \quad (25)$$

where, $f_{IV}$: composite focal length of the fourth lens group.

In order to focus a bundle of rays from the DMD on to the surface of the screen with good efficiency, a primary ray angle of the bundle of rays between the fourth lens group and the DMD must be set in such a manner to match the characteristics of the illuminating optical system. In many cases, the primary ray angle is set to be substantially telecentric. In order to secure the telecentric characteristics in this space, the focal point of the fourth lens group needs to be positioned in the vicinity of a pupil which corresponds to a bundle of rays on the contracting side of the third lens group, and it becomes possible to attain the object by giving a power to the fourth lens group within a range defined by the conditional expression (25). Consequently, even in the event that an upper limit is surpassed or a lower limit is surpassed, matching between the pupil and the bundle of rays cannot be attained, whereby a quantity of light is decreased on the perimeter of the lens element or the aberrations are deteriorated.

In addition, as is shown in Embodiments 1 to 5 below, when assuming that the single first lens which is made to make up the first lens group is a positive lens element, the numerical ranges defined by the conditional expressions (1), (2) and (3) may be further defined by the following conditional expressions (26), (27) and (28), respectively:

$$-0.9 < f_w/f_{II} < -0.55 \quad (26)$$

$$0.4 < f_w/f_{III} < 0.5 \quad (27)$$

$$2.0 < d_{wIII}/f_w < 2.2 \quad (28)$$

In this way, by restricting the power distributions of the second lens group and the third lens group, the size and aberrations of the whole optical system can be corrected properly.

In addition, by restricting the airspace between the third lens group and the fourth lens group, the size of the whole optical system can be decreased properly.

Then, the power of the first lens group which is made to be a positive refractive power is made to preferably satisfy the following conditional expression (29) which falls within the range of the conditional expression (4):

$$f_w/f_I < 0.2 \quad (29)$$

Furthermore, when assuming the first lens group is made up of the single first lens having the positive refractive power, as for the second lens group, three lens elements of the $2^{nd}$-a lens group are made to constitute a second lens element, a third lens element, and a fourth lens element of the whole zoom lens, respectively, and three lens elements of the $2^{nd}$-b lens group are made to constitute a fifth lens element, a sixth lens element and a seventh lens element of the whole zoom lens, respectively, and the power of a composite focal length $f_{II}$ of the whole second lens group which is made up of these six lens elements satisfies the following conditional expression (30). In addition, when assuming that $r_{IIa2}$ which is the radius of curvature of the contracting side surface of the second lens element which constitutes the second lens element of the whole zoom lens is $r_4$, $r_{IIa3}$ which is the radius of curvature of the magnifying side surface of the third lens element which constitutes the second lens element of the second lens group from the magnifying side thereof and constitutes the third lens element of the whole zoom lens is $r_5$, the following conditional expressions (31) and (32) are satisfied with respect to configurations of the contracting side surface of the second lens and the magnifying side surface of the third lens, respectively. When assuming that as for the second lens element, the third lens element and the fourth lens element of the $2^{nd}$-a lens group, Abbe numbers of the second lens element and the third lens element, which are the negative lens elements, are ν2 and ν3, respectively and an Abbe number of the fourth lens, which is the positive lens element, is ν4, the following conditional expression (33) is satisfied with respect to the dispersion characteristics of a glass material used for each of the lens element which makes up the $2^{nd}$-a lens group, and when assuming that $r_{IIb1}$ which is the radius of curvature of a contracting side surface of the fifth lens element which lies closest to the magnifying side in the $2^{nd}$-b lens group and constitutes the fifth lens element of the whole zoom lens is $r_8$, and $r_{IIb5}$ which is the radius of curvature of a magnifying side surface of the seventh lens element which lies closest to the contracting side in the $2^{nd}$-b lens group and constitutes the seventh lens element of the whole zoom lens is $r_{12}$, the following conditional expression (34) is satisfied with respect to a relative characteristic of concaved configurations of the magnifying side surfaces of the fifth and seventh lens lements:

$$-1.0 < f_w/f_2 < -0.6 \quad (30)$$

$$1.0 < f_w/r_4 < 1.4 \quad (31)$$

$$-0.75 < f_w/r_5 < -0.25 \quad (32)$$

$$10.0 < (\nu_2 + \nu_3)/2 - \nu_4 \quad (33)$$

$$1.3 < r_{12}/r_8 < 1.9 \quad (34)$$

The conditional expression (30) represents a restriction on the second lens element which is disposed closest to the magnifying side in the second lens group and which affects largely off-axis aberrations, and in the event that an upper limit is surpassed, the negative power becomes too small, and no sufficient measure can be taken to correct off-axis aberrations. On the contrary, in the event that a lower limit is surpassed, the negative power becomes too large, and aberrations including chromatic aberration are deteriorated. The conditional expression (31) is such as to restrict further the range of the conditional expression (8), and since $r_4$ is $r_{IIa2}$, the conditional expression (34) can also be expressed as:

$$1.0 < f_w/r_{IIa2} < 1.4$$

The conditional expression (32) is such as to restrict further the range of the conditional expression (7), and since $r_5$ is $r_{IIa3}$, the conditional expression (34) can also be expressed as:

$$-0.75 < f_w/r_{IIa3} < -0.25$$

Furthermore, the conditional expression (33) is such as to specify the dispersion rates of the second lens element, the third lens element and the fourth lens element which make up the $2^{nd}$-a lens group and represents a difference in the mean value of Abbe number of the negative lens elements and the Abbe number of the positive lens element of the $2^{nd}$-a lens group, expressing the same condition as that expressed by the conditional expression (10), although what is expressed by the conditional expression (33) is different from the expression of the conditional expression (10). In addition, the conditional expression (34) is such as to properly correct spherical aberration and coma aberration in the second lens group. Although a bundle of diffused rays, which are so diffused due, in particular, to the strong negative power of the second lens element of the second lens group, enter the fifth lens element, the sixth lens element and the seventh lens element which make up the $2^{nd}$-b lens group, by maintaining the configurations of the magnifying side surface of the fifth lens and the magnifying side surface of the seventh lens element in the ways expressed by the respective conditional expressions, the bundle of diffused rays are transmitted to the third lens group without generating spherical aberration and coma aberration excessively. Consequently, in the event that an upper limit is surpassed, the eccentricity of the magnifying side surface of the fifth lens element which has a strong curvature relative to the bundle of diffused rays is collapsed, and coma flare at a peripheral portion of the lens element is increased. In the event that a lower limit is surpassed, although it is advantageous in coma aberration, the spherical aberration on the magnifying side surface of the seventh lens element is corrected excessively, and the balance of spherical aberration as a lens element with a large aperture is collapsed.

In this way, also by establishing the conditions of the second lens group in such a manner as to match the first lens group, a compact zoom lens can be realized.

Embodiment 1

A numerical example for Embodiment 1 of a zoom lens of the invention is shown in Table 1. In addition, FIG. 1 is a drawing showing a lens configuration of Embodiment 1 and FIG. 2 shows drawings illustrating aberrations thereof. In the table and drawings, f denotes a focal length of the whole zoom lens system, $F_{no}$ an F number, and $2\omega$ a total angle of view of the zoom lens. In addition r denotes radius of curvature, d lens thickness or space between lens elements, $n_d$ a refractive index relative to the line d, and $\nu_d$ Abbe number of the line d (where, numerical values in the table which change by virtue of focusing operation are numerical values which result when an object distance from a surface 101 is 1700 mm in a focused state). CA1, CA2, CA3 in the spherical aberration drawings in the drawings showing aberrations are aberration curves in wavelengths of CA1=550.0 nm, CA2=435.8 nm and CA3=640.0 nm, respectively. In addition, S. C. is a sine condition. In aspherical aberration drawings, S denotes sagital and M denotes meridional. In addition, throughout the tables, unless described specifically, a wavelength used in calculating various values is CA1=550. nm.

TABLE 1

|  | Wide angle end | Intermediate area | Telephoto end |
|---|---|---|---|
| f | 15.91 | 23.90 | 30.85 |
| $F_{no}$ | 2.29 | 2.70 | 3.11 |
| $2\omega$ | 66.05 | 46.31 | 36.82 |
| Hereinafter, airspaces which change by variable power ||||
| D2 | 1.04 | 5.01 | 1.05 |
| D13 | 25.75 | 9.34 | 1.07 |
| D25 | 34.00 | 46.43 | 58.67 |

| Serial numbers | Surface numbers | r | d | $n_d$ | $\nu_d$ |
|---|---|---|---|---|---|
| 1 | 101 | 195.796 | 2.50 | 1.51680 | 64.20 |
| 2 | 102 | −297.598 | [D2] | — | — |
| 3 | 211 | 82.228 | 2.00 | 1.80470 | 40.95 |
| 4 | 212 | 14.600 | 4.91 | — | — |
| 5 | 213 | −46.694 | 1.80 | 1.80420 | 46.49 |
| 6 | 214 | 22.716 | 5.15 | 1.69895 | 30.05 |
| 7 | 215 | −31.102 | 2.71 | — | — |
| 8 | 221 | −13.082 | 4.48 | 1.80420 | 46.49 |
| 9 | 222 | −29.546 | 0.20 | — | — |
| 10 | 223 | 162.756 | 4.11 | 1.74330 | 49.23 |
| 11 | 224 | −25.900 | 0.72 | — | — |
| 12 | 225 | −21.175 | 2.00 | 1.51823 | 58.96 |
| 13 | 226 | −67.454 | [D13] | — | — |
| 14 | 311 | 25.745 | 5.70 | 1.49700 | 81.61 |
| 15 | 312 | −93.495 | 0.20 | — | — |
| 16 | 313 | 40.174 | 3.03 | 1.49700 | 81.61 |
| 17 | 314 | 135.625 | 7.31 | — | — |
| 18 | 321 | −29.388 | 1.00 | 1.80420 | 46.49 |
| 19 | 322 | 23.426 | 4.61 | 1.60602 | 57.44 |
| 20 | 323 | −117.124 | 0.20 | — | — |
| 21 | 331 | 42.562 | 5.76 | 1.58913 | 61.25 |
| 22 | 332 | −28.377 | 0.20 | — | — |
| 23 | 333 | −104.552 | 1.20 | 1.80420 | 46.49 |
| 24 | 334 | 21.855 | 8.50 | 1.48749 | 70.45 |
| 25 | 335 | −27.426 | [D25] | — | — |
| 26 | 401 | −100.000 | 3.00 | 1.77250 | 49.62 |
| 27 | 402 | −44.000 | 0.63 | — | — |
| 28 | C01 | ∞ | 3.00 | 1.48745 | 64.84 |
| 29 | C02 | ∞ | — | — | — |

Aspherical coefficient

| 211th surface || 323rd surface ||
|---|---|---|---|
| K = | −1.06452E+02 | K = | −3.53725E+01 |
| A = | 6.15109E−05 | A = | 2.63925E−05 |
| B = | −2.48455E−07 | B = | 1.93794E−08 |
| C = | 1.98935E−09 | C = | −7.54587E−11 |

TABLE 1-continued

| D = | −9.76306E−12 |
| E = | 2.66560E−14 |

Embodiment 2

Figure 3:
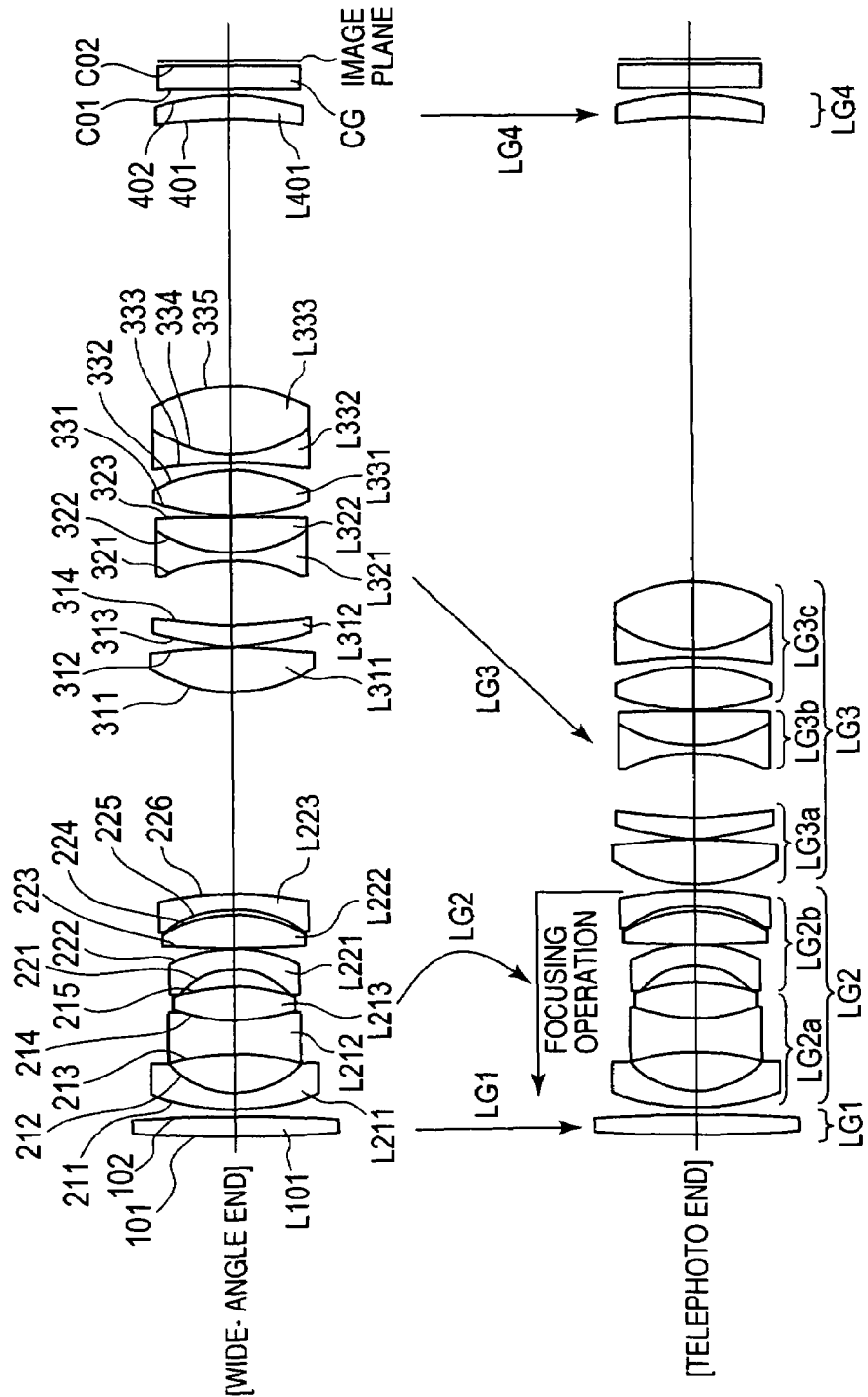
FIG. 3 is a drawing showing a lens configuration of a second embodiment of a zoom lens according to the invention.

A numerical example for Embodiment 2 of a zoom lens of the invention is shown in Table 2. In addition, FIG. 3 is a drawing showing a lens configuration of Embodiment 2 and FIG. 4 shows drawings illustrating aberrations thereof.

TABLE 2

|  | Wide angle end | Intermediate area | Telephoto end |
|---|---|---|---|
| f | 15.90 | 23.89 | 30.85 |
| $F_{no}$ | 2.29 | 2.68 | 3.09 |
| $2\omega$ | 66.08 | 46.27 | 36.82 |
| Hereinafter, airspaces which change by variable power ||||
| D2 | 1.03 | 5.06 | 1.04 |
| D13 | 25.79 | 9.41 | 1.07 |
| D25 | 34.00 | 46.37 | 58.73 |

| Serial numbers | Surface numbers | r | d | $n_d$ | $\nu_d$ |
|---|---|---|---|---|---|
| 1 | 101 | 180.552 | 2.50 | 1.51680 | 64.20 |
| 2 | 102 | −274.865 | [D2] | — | — |
| 3 | 211 | 96.322 | 2.00 | 1.74330 | 49.33 |
| 4 | 212 | 14.175 | 5.46 | — | — |
| 5 | 213 | −34.467 | 3.93 | 1.80420 | 46.49 |
| 6 | 214 | 35.359 | 4.27 | 1.68893 | 31.16 |
| 7 | 215 | −32.193 | 2.17 | — | — |
| 8 | 221 | −13.144 | 2.64 | 1.72916 | 54.66 |
| 9 | 222 | −24.544 | 0.20 | — | — |
| 10 | 223 | 139.174 | 4.00 | 1.71700 | 47.99 |
| 11 | 224 | −28.178 | 0.69 | — | — |
| 12 | 225 | −22.137 | 2.00 | 1.71300 | 53.93 |
| 13 | 226 | −43.085 | [D13] | — | — |
| 14 | 311 | 27.897 | 5.42 | 1.49700 | 81.61 |
| 15 | 312 | −83.253 | 0.20 | — | — |
| 16 | 313 | 35.835 | 2.73 | 1.48749 | 70.45 |
| 17 | 314 | 89.125 | 8.18 | — | — |
| 18 | 321 | −28.974 | 1.00 | 1.83400 | 37.35 |
| 19 | 322 | 23.145 | 4.63 | 1.60602 | 57.44 |
| 20 | 323 | −132.559 | 0.21 | — | — |
| 21 | 331 | 47.686 | 5.38 | 1.74950 | 35.04 |
| 22 | 332 | −32.093 | 1.01 | — | — |
| 23 | 333 | −137.752 | 1.20 | 1.83400 | 37.35 |
| 24 | 334 | 21.780 | 8.46 | 1.48749 | 70.45 |
| 25 | 335 | −27.807 | [D25] | — | — |
| 26 | 401 | −100.000 | 3.00 | 1.77250 | 49.62 |
| 27 | 402 | −44.000 | 0.63 | — | — |
| 28 | C01 | ∞ | 3.00 | 1.48745 | 64.84 |
| 29 | C02 | ∞ | — | — | — |

Aspherical coefficient

| 211th surface || 323rd surface ||
|---|---|---|---|
| K = | −1.35779E+02 | K = | −2.92739E+01 |
| A = | 5.91115E−05 | A = | 2.37252E−05 |
| B = | −2.04333E−07 | B = | 5.23166E−09 |
| C = | 1.52117E−09 | C = | −6.51162E−11 |
| D = | −7.14489E−12 | | |
| E = | 2.12959E−14 | | |

Embodiment 3

Figure 5:
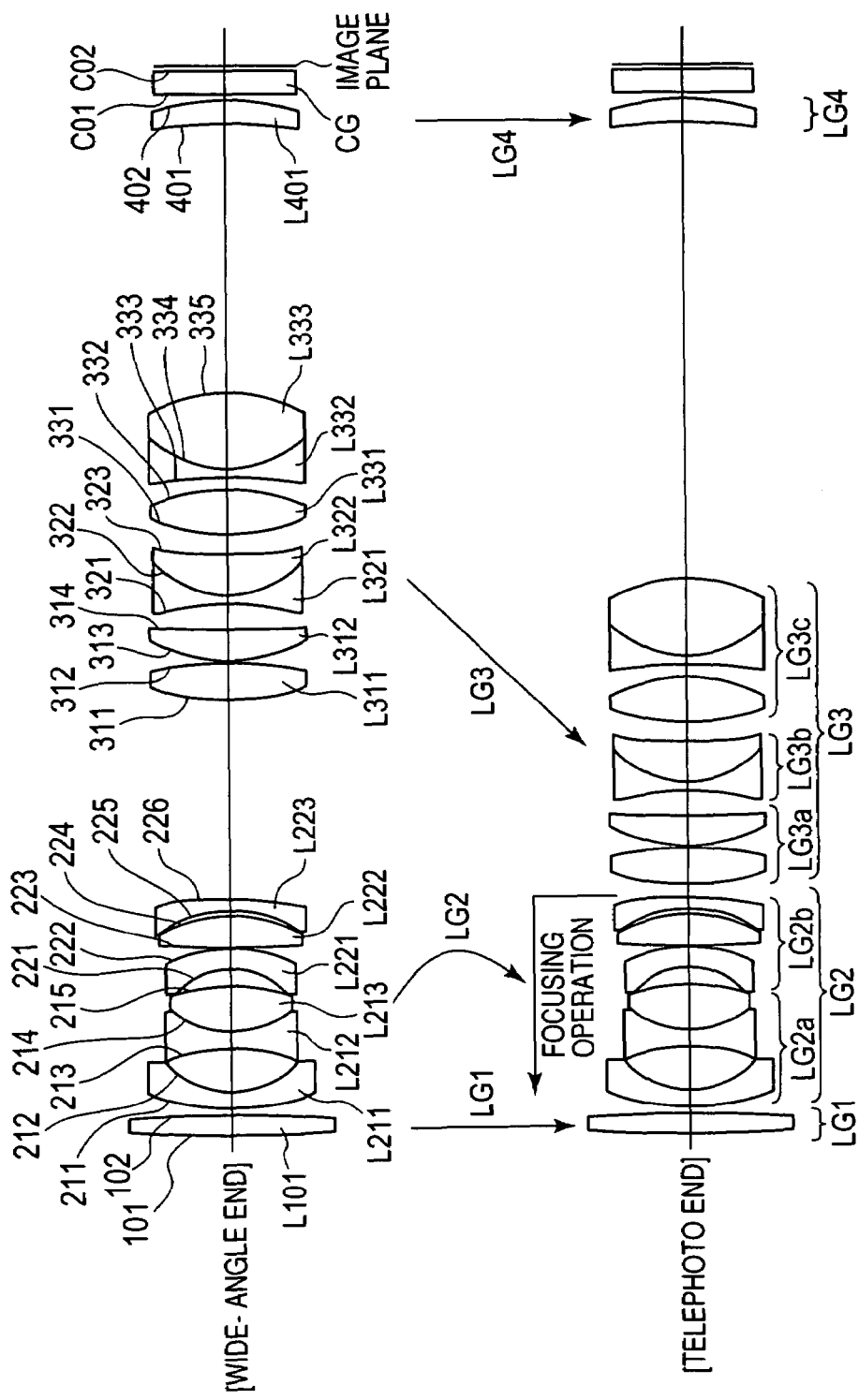
FIG. 5 is a drawing showing a lens configuration of a third embodiment of a zoom lens according to the invention.

A numerical example for Embodiment 3 of a zoom lens of the invention is shown in Table 3. In addition, FIG. 5 is a drawing showing a lens configuration of Embodiment 3 and FIG. 6 shows drawings illustrating aberrations thereof.

TABLE 3

|  | Wide angle end | Intermediate area | Telephoto end |
|---|---|---|---|
| f | 15.91 | 23.90 | 30.85 |
| $F_{no}$ | 2.29 | 2.68 | 3.08 |
| 2ω | 66.06 | 46.19 | 36.79 |
| Hereinafter, airspaces which change by variable power ||||
| D2 | 1.13 | 5.07 | 1.04 |
| D13 | 25.55 | 9.31 | 1.07 |
| D25 | 34.00 | 46.32 | 58.58 |

| Serial numbers | Surface numbers | r | d | $n_d$ | $v_d$ |
|---|---|---|---|---|---|
| 1 | 101 | 232.431 | 2.50 | 1.51680 | 64.20 |
| 2 | 102 | −200.840 | [D2] | — | — |
| 3 | 211 | 87.738 | 2.00 | 1.74330 | 49.33 |
| 4 | 212 | 13.565 | 5.50 | — | — |
| 5 | 213 | −31.648 | 2.00 | 1.80420 | 46.49 |
| 6 | 214 | 15.063 | 5.68 | 1.80610 | 33.27 |
| 7 | 215 | −39.456 | 2.36 | — | — |
| 8 | 221 | −12.873 | 2.65 | 1.71300 | 53.93 |
| 9 | 222 | −23.580 | 0.20 | — | — |
| 10 | 223 | 241.770 | 3.72 | 1.80610 | 40.73 |
| 11 | 224 | −30.378 | 0.70 | — | — |
| 12 | 225 | −23.363 | 1.80 | 1.71736 | 29.50 |
| 13 | 226 | −45.270 | [D13] | — | — |
| 14 | 311 | 37.327 | 4.90 | 1.49700 | 81.61 |
| 15 | 312 | −62.800 | 0.20 | — | — |
| 16 | 313 | 26.544 | 4.08 | 1.49700 | 81.61 |
| 17 | 314 | 949.899 | 3.01 | — | — |
| 18 | 321 | −50.568 | 1.00 | 1.77250 | 49.65 |
| 19 | 322 | 14.590 | 5.53 | 1.51742 | 52.16 |
| 20 | 323 | 73.098 | 2.27 | — | — |
| 21 | 331 | 31.776 | 5.60 | 1.69350 | 53.20 |
| 22 | 332 | −42.607 | 1.50 | — | — |
| 23 | 333 | −160.191 | 1.35 | 1.83500 | 42.98 |
| 24 | 334 | 17.544 | 10.00 | 1.48749 | 70.45 |
| 25 | 335 | −24.693 | [D25] | — | — |
| 26 | 401 | −100.000 | 3.00 | 1.77250 | 49.62 |
| 27 | 402 | −44.000 | 0.63 | — | — |
| 28 | C01 | ∞ | 3.00 | 1.48745 | 64.84 |
| 29 | C02 | ∞ | — | — | — |

Aspherical coefficient

| | 211th surface | | 332th surface |
|---|---|---|---|
| K = | −8.59147E+01 | K = | 0.0000E+00 |
| A = | 5.94999E−05 | A = | 9.66274E−06 |
| B = | −2.11612E−07 | B = | −4.61666E−08 |
| C = | 1.80474E−09 | C = | −3.29126E−11 |
| D = | −9.42222E−12 | | |
| E = | 2.91574E−14 | | |

Embodiment 4

Figure 7:
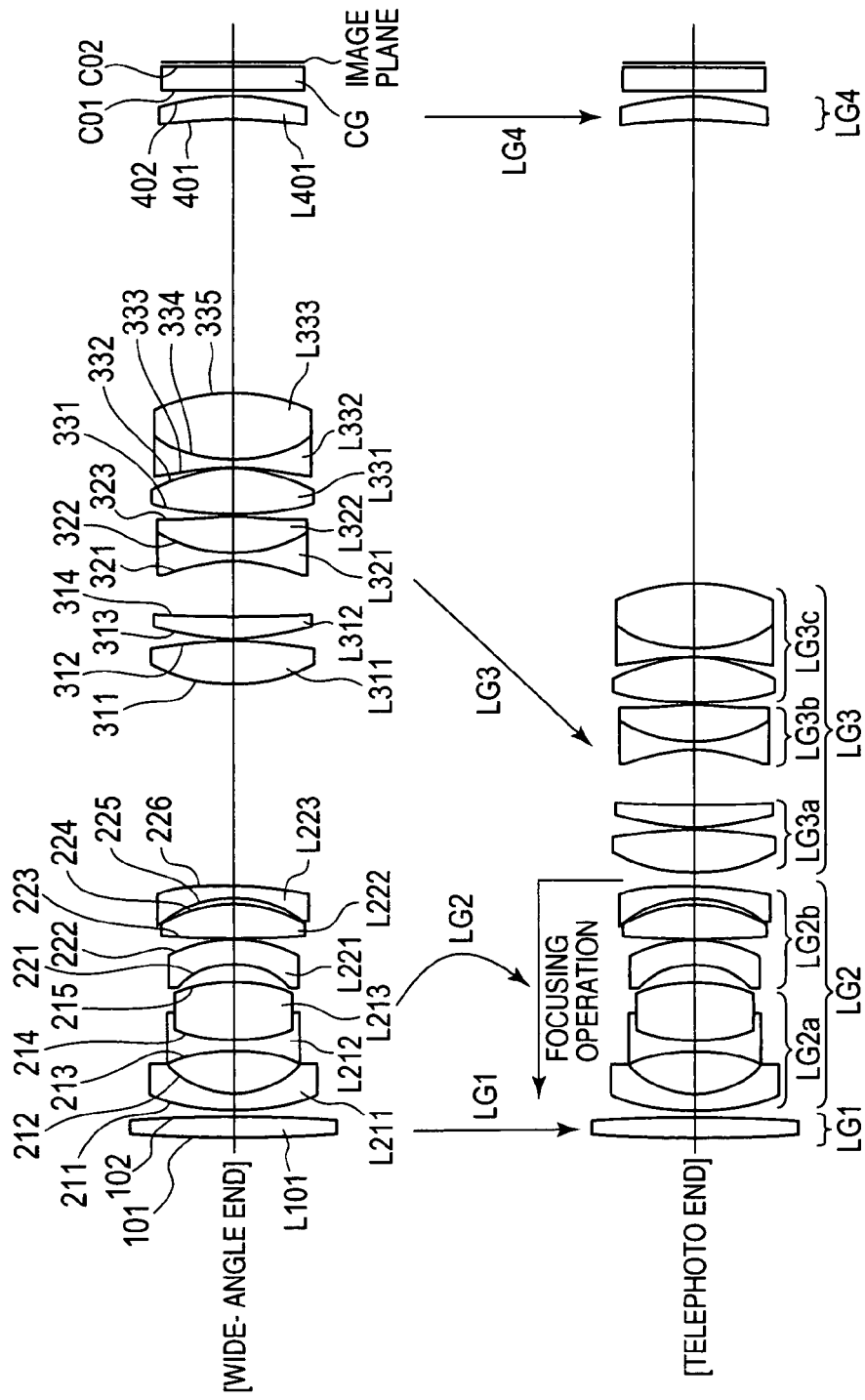
FIG. 7 is a drawing showing a lens configuration of a forth embodiment of a zoom lens according to the invention.

A numerical example for Embodiment 4 of a zoom lens of the invention is shown in Table 4. In addition, FIG. 7 is a drawing showing a lens configuration of Embodiment 4 and FIG. 8 shows drawings illustrating aberrations thereof.

TABLE 4

|  | Wide angle end | Intermediate area | Telephoto end |
|---|---|---|---|
| f | 15.91 | 23.91 | 30.83 |
| $F_{no}$ | 2.29 | 2.68 | 3.10 |
| 2ω | 6.06 | 46.18 | 36.83 |
| Hereinafter, airspaces which change by variable power ||||
| D2 | 1.00 | 5.14 | 1.40 |
| D13 | 25.38 | 9.38 | 1.10 |
| D25 | 34.00 | 45.85 | 57.88 |

TABLE 4-continued

| Serial numbers | Surface numbers | r | d | $n_d$ | $v_d$ |
|---|---|---|---|---|---|
| 1 | 101 | 129.310 | 2.76 | 1.48749 | 70.45 |
| 2 | 102 | −264.000 | [D2] | — | — |
| 3 | 211 | 68.966 | 2.00 | 1.80470 | 40.95 |
| 4 | 212 | 14.488 | 5.10 | — | — |
| 5 | 213 | −32.150 | 1.53 | 1.83500 | 42.98 |
| 6 | 214 | 32.150 | 7.49 | 1.75520 | 27.52 |
| 7 | 215 | −32.150 | 2.14 | — | — |
| 8 | 221 | −13.385 | 3.00 | 1.72000 | 50.34 |
| 9 | 222 | −27.390 | 0.20 | — | — |
| 10 | 223 | 140.000 | 4.14 | 1.67790 | 55.52 |
| 11 | 224 | −28.152 | 0.79 | — | — |
| 12 | 225 | −21.330 | 1.95 | 1.49700 | 81.61 |
| 13 | 226 | −55.000 | [D13] | — | — |
| 14 | 311 | 26.920 | 5.68 | 1.49700 | 81.61 |
| 15 | 312 | −76.560 | 0.24 | — | — |
| 16 | 313 | 38.800 | 2.68 | 1.49700 | 81.61 |
| 17 | 314 | 103.100 | 7.21 | — | — |
| 18 | 321 | −27.050 | 1.00 | 1.79950 | 42.34 |
| 19 | 322 | 27.050 | 4.56 | 1.60602 | 57.44 |
| 20 | 323 | −82.636 | 0.20 | — | — |
| 21 | 331 | 50.500 | 5.76 | 1.67003 | 47.20 |
| 22 | 332 | −27.200 | 0.20 | — | — |
| 23 | 333 | −91.550 | 1.20 | 1.83500 | 42.98 |
| 24 | 334 | 21.537 | 8.06 | 1.48749 | 70.45 |
| 25 | 335 | −28.640 | [D25] | — | — |
| 26 | 401 | −100.000 | 3.00 | 1.77250 | 49.62 |
| 27 | 402 | −44.000 | 0.63 | — | — |
| 28 | C01 | ∞ | 3.00 | 1.48745 | 64.84 |
| 29 | C02 | ∞ | — | — | — |

Aspherical coefficient

| | 211th surface | | 323th surface |
|---|---|---|---|
| K = | −1.21542E+02 | K = | −4.18280E+01 |
| A = | 7.69843E−05 | A = | 1.96789E−05 |
| B = | −4.46311E−07 | B = | 3.97458E−08 |
| C = | 3.71972E−09 | C = | −1.00206E−10 |
| D = | −1.83563E−11 | | |
| E = | 4.76628E−14 | | |

Embodiment 5

Figure 9:
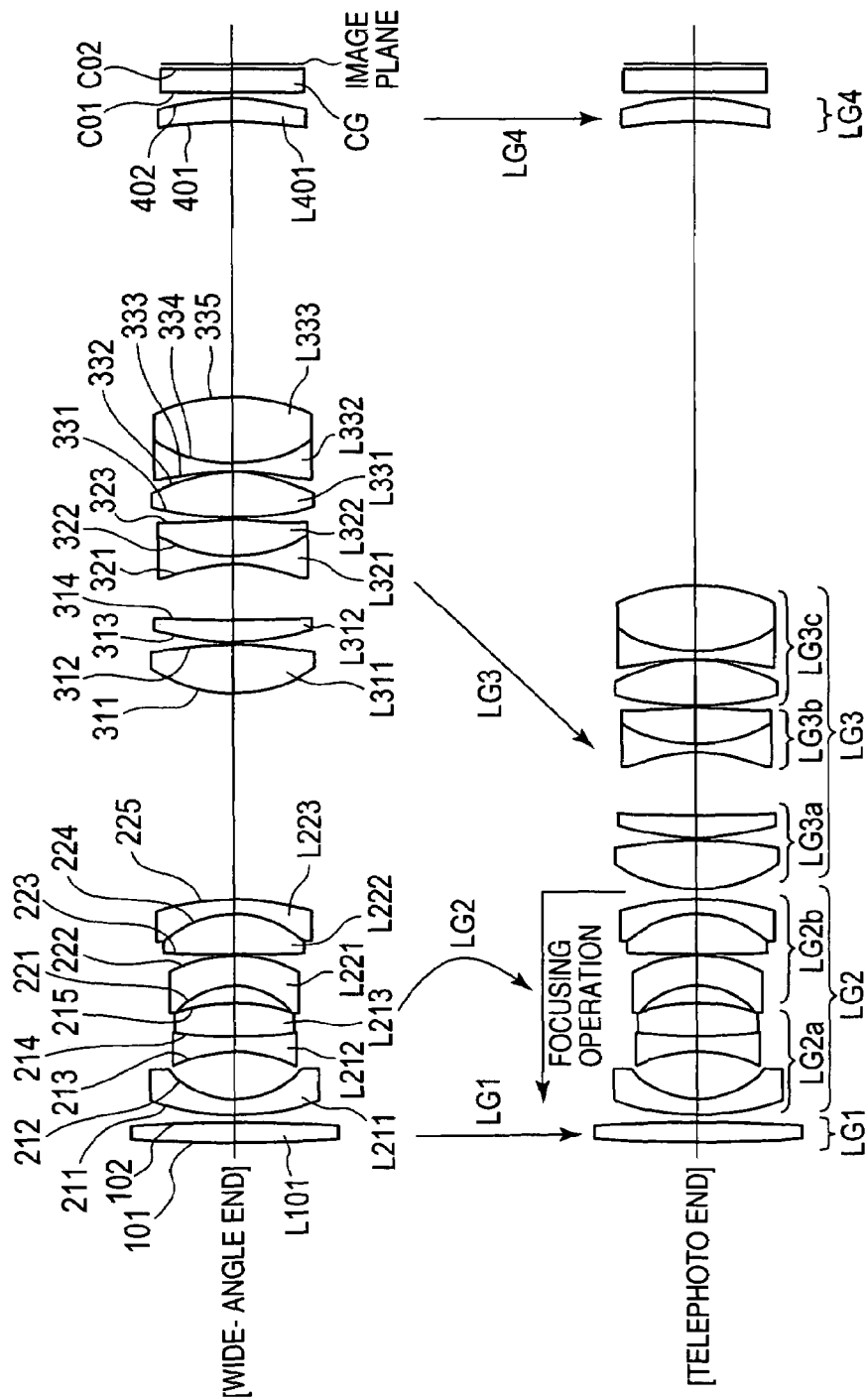
FIG. 9 is a drawing showing a lens configuration of a fifth embodiment of a zoom lens according to the invention.

A numerical example for Embodiment 5 of a zoom lens of the invention is shown in Table 5. In addition, FIG. 9 is a drawing showing a lens configuration of Embodiment 5 and FIG. 10 shows drawings illustrating aberrations thereof.

TABLE 5

|  | Wide angle end | Intermediate area | Telephoto end |
|---|---|---|---|
| f | 15.91 | 23.90 | 30.85 |
| $F_{no}$ | 2.29 | 2.70 | 3.11 |
| 2ω | 66.06 | 46.25 | 36.81 |
| Hereinafter, airspaces which change by variable power ||||
| D2 | 1.04 | 5.07 | 1.04 |
| D12 | 25.84 | 9.41 | 1.07 |
| D24 | 34.00 | 46.41 | 58.78 |

| Serial numbers | Surface numbers | r | d | $n_d$ | $v_d$ |
|---|---|---|---|---|---|
| 1 | 101 | 186.942 | 2.50 | 1.51680 | 64.20 |
| 2 | 102 | −260.150 | [D2] | — | — |
| 3 | 211 | 74.340 | 2.05 | 1.80610 | 40.73 |
| 4 | 212 | 13.713 | 6.28 | — | — |
| 5 | 213 | −25.573 | 1.80 | 1.58913 | 61.25 |
| 6 | 214 | 60.291 | 4.15 | 1.75520 | 27.52 |
| 7 | 215 | −35.037 | 2.20 | — | — |
| 8 | 221 | −12.763 | 3.80 | 1.80610 | 33.27 |
| 9 | 222 | −23.458 | 0.20 | — | — |
| 10 | 223 | 174.427 | 5.18 | 1.70154 | 41.15 |

TABLE 5-continued

| | | | | | |
|---|---|---|---|---|---|
| 11 | 224 | −17.641 | 1.80 | 1.80420 | 46.49 |
| 12 | 225 | −56.152 | [D12] | — | — |
| 13 | 311 | 25.047 | 5.91 | 1.49700 | 81.61 |
| 14 | 312 | −84.177 | 0.20 | — | — |
| 15 | 313 | 38.621 | 2.50 | 1.49700 | 81.61 |
| 16 | 314 | 72.814 | 7.50 | — | — |
| 17 | 321 | −29.912 | 1.01 | 1.77250 | 49.65 |
| 18 | 322 | 24.376 | 4.55 | 1.60602 | 57.44 |
| 19 | 323 | −99.864 | 0.20 | — | — |
| 20 | 331 | 36.053 | 6.22 | 1.48749 | 70.45 |
| 21 | 332 | −26.799 | 0.20 | — | — |
| 22 | 333 | −104.655 | 1.20 | 1.78590 | 43.93 |
| 23 | 334 | 21.559 | 8.23 | 1.48749 | 70.45 |
| 24 | 335 | −27.531 | [D24] | — | — |
| 25 | 401 | −100.000 | 3.00 | 1.77250 | 49.62 |
| 26 | 402 | −44.000 | 0.63 | — | — |
| 27 | C01 | ∞ | 3.00 | 1.48745 | 64.84 |
| 28 | C02 | ∞ | — | — | — |

Aspherical coefficient

| 211th surface | | 323rd surface | |
|---|---|---|---|
| K = | −7.96562E+01 | K = | −5.24383E+01 |
| A = | 6.48558E−05 | A = | 2.49838E−05 |
| B = | −2.60113E−07 | B = | 3.99391E−08 |
| C = | 2.19632E−09 | C = | −6.17801E−11 |
| D = | −1.14247E−11 | | |
| E = | 3.39302E−14 | | |

Embodiment 6

Figure 11:
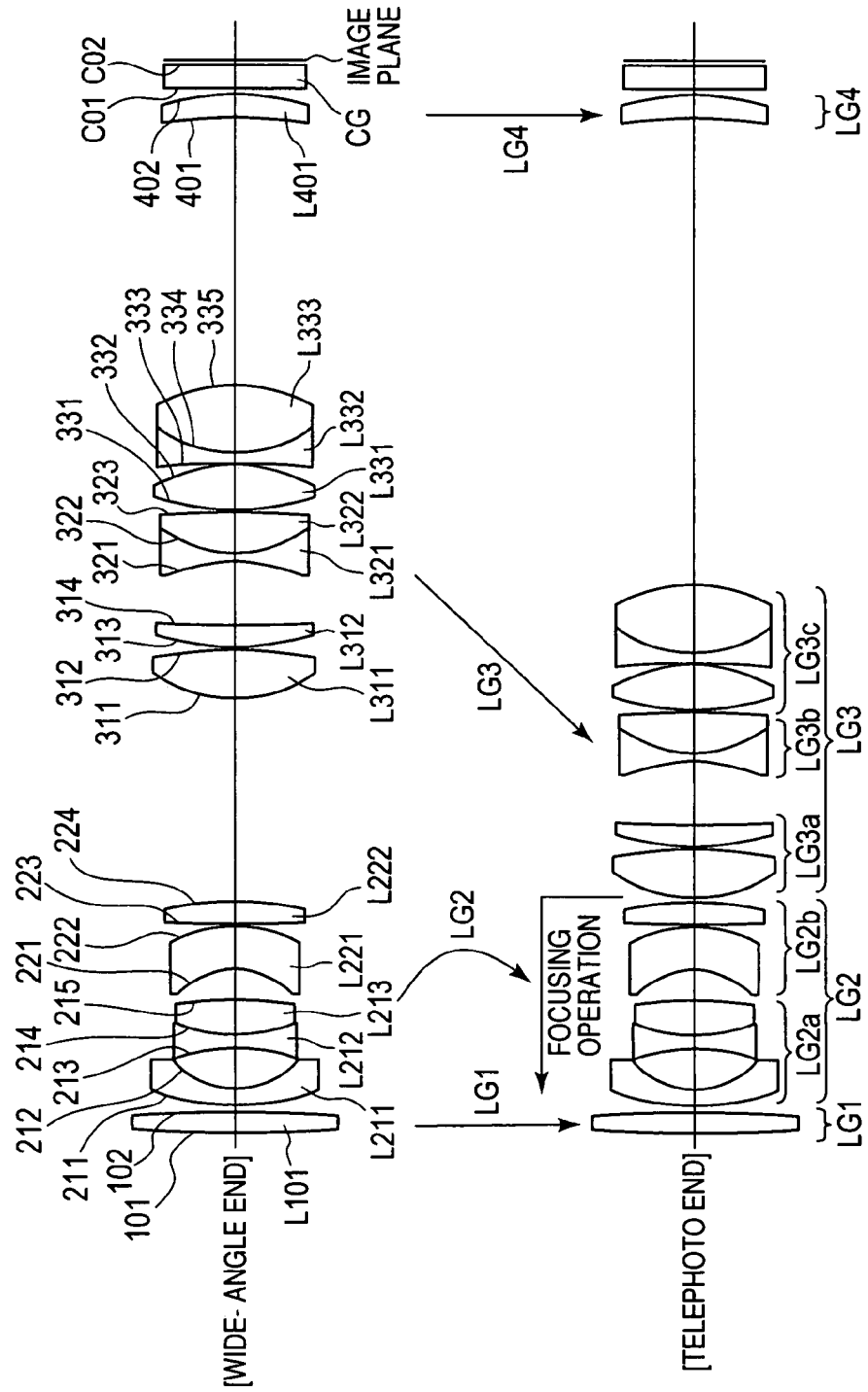
FIG. 11 is a drawing showing a lens configuration of a sixth embodiment of a zoom lens according to the invention.

A numerical example for Embodiment 6 of a zoom lens of the invention is shown in Table 6. In addition, FIG. 11 is a drawing showing a lens configuration of Embodiment 6 and FIG. 12 shows drawings illustrating aberrations thereof.

TABLE 6

| | Wide angle end | Intermediate area | Telephoto end |
|---|---|---|---|
| f | 15.92 | 23.93 | 30.86 |
| $F_{no}$ | 2.29 | 2.69 | 3.21 |
| 2ω | 66.03 | 46.24 | 36.82 |
| Hereinafter, airspaces which change by variable power | | | |
| D2 | 1.04 | 5.08 | 1.04 |
| D11 | 26.26 | 9.45 | 1.07 |
| D23 | 34.00 | 46.77 | 59.18 |

| Serial numbers | Surface numbers | r | d | $n_d$ | $\nu_d$ |
|---|---|---|---|---|---|
| 1 | 101 | 218.798 | 2.50 | 1.51680 | 64.20 |
| 2 | 102 | −282.219 | [D2] | — | — |
| 3 | 211 | 65.976 | 2.00 | 1.80610 | 40.73 |
| 4 | 212 | 13.044 | 5.02 | — | — |
| 5 | 213 | −81.652 | 1.80 | 1.80420 | 46.50 |
| 6 | 214 | 22.846 | 4.41 | 1.78472 | 25.72 |
| 7 | 215 | −62.583 | 3.86 | — | — |
| 8 | 221 | −13.373 | 5.75 | 1.80420 | 46.50 |
| 9 | 222 | −27.903 | 0.20 | — | — |
| 10 | 223 | 278.953 | 2.88 | 1.69680 | 55.46 |
| 11 | 224 | −55.288 | [D11] | — | — |
| 12 | 311 | 27.448 | 5.38 | 1.49700 | 81.61 |
| 13 | 312 | −115.703 | 0.20 | — | — |
| 14 | 313 | 37.901 | 3.20 | 1.49700 | 81.61 |
| 15 | 314 | 149.816 | 8.22 | — | — |
| 16 | 321 | −32.155 | 1.00 | 1.80610 | 40.73 |
| 17 | 322 | 19.651 | 5.07 | 1.58313 | 59.46 |
| 18 | 323 | −125.719 | 0.20 | — | — |
| 19 | 331 | 34.596 | 6.04 | 1.56732 | 42.85 |
| 20 | 332 | −29.451 | 0.20 | — | — |
| 21 | 333 | −136.481 | 1.20 | 1.78590 | 43.93 |
| 22 | 334 | 20.450 | 8.66 | 1.48749 | 70.45 |
| 23 | 335 | −28.966 | [D23] | — | — |

TABLE 6-continued

| | | | | | |
|---|---|---|---|---|---|
| 24 | 401 | −100.000 | 3.00 | 1.77250 | 49.62 |
| 25 | 402 | −44.000 | 0.63 | — | — |
| 26 | C01 | ∞ | 3.00 | 1.48745 | 64.84 |
| 27 | C02 | ∞ | — | — | — |

Aspherical coefficient

| 211th surface | | 323rd surface | |
|---|---|---|---|
| K = | −2.71043E+01 | K = | −8.65906E+00 |
| A = | 4.69771E−05 | A = | 2.51617E−05 |
| B = | −1.08317E−07 | B = | 1.06701E−08 |
| C = | 5.78642E−10 | C = | −3.55343E−11 |
| D = | −1.69413E−12 | | |
| E = | 3.57324E−15 | | |

Embodiment 7

Figure 13:
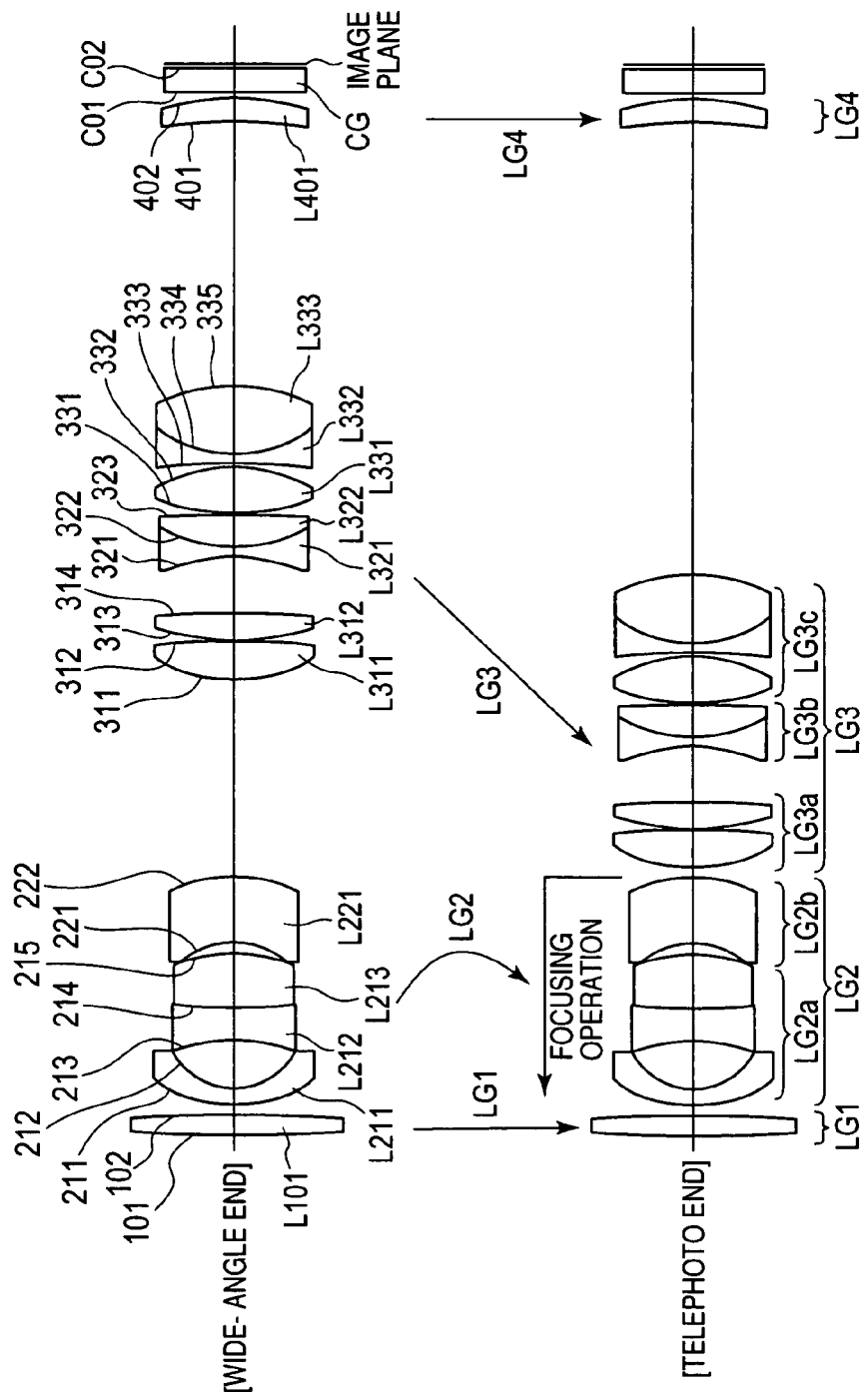
FIG. 13 is a drawing showing a lens configuration of a seventh embodiment of a zoom lens according to the invention.

A numerical example for Embodiment 7 of a zoom lens of the invention is shown in Table 7. In addition, FIG. 13 is a drawing showing a lens configuration of Embodiment 7 and FIG. 14 shows drawings illustrating aberrations thereof.

TABLE 7

| | Wide angle end | Intermediate area | Telephoto end |
|---|---|---|---|
| f | 15.91 | 23.91 | 30.85 |
| $F_{no}$ | 2.29 | 2.69 | 3.40 |
| 2ω | 66.06 | 46.22 | 36.77 |
| Hereinafter, airspaces which change by variable power | | | |
| D2 | 1.04 | 4.95 | 1.04 |
| D9 | 25.40 | 9.19 | 1.07 |
| D21 | 34.00 | 46.30 | 58.32 |

| Serial numbers | Surface numbers | r | d | $n_d$ | $\nu_d$ |
|---|---|---|---|---|---|
| 1 | 101 | 172.425 | 2.50 | 1.51680 | 64.20 |
| 2 | 102 | −400.000 | [D2] | — | — |
| 3 | 211 | 30.356 | 2.00 | 1.80420 | 46.49 |
| 4 | 212 | 11.614 | 6.22 | — | — |
| 5 | 213 | −29.103 | 4.01 | 1.71700 | 47.99 |
| 6 | 214 | 90.272 | 7.16 | 1.84666 | 23.78 |
| 7 | 215 | −25.517 | 1.30 | — | — |
| 8 | 221 | −14.375 | 8.41 | 1.80486 | 24.74 |
| 9 | 222 | −29.753 | [D9] | — | — |
| 10 | 311 | 27.399 | 4.92 | 1.49700 | 81.61 |
| 11 | 312 | −208.679 | 0.20 | — | — |
| 12 | 313 | 44.904 | 3.43 | 1.49700 | 81.61 |
| 13 | 314 | −399.439 | 7.21 | — | — |
| 14 | 321 | −32.961 | 1.00 | 1.80420 | 46.49 |
| 15 | 322 | 26.732 | 4.06 | 1.57135 | 52.95 |
| 16 | 323 | −175.346 | 0.20 | — | — |
| 17 | 331 | 37.737 | 6.06 | 1.48749 | 70.45 |
| 18 | 332 | −27.030 | 0.20 | — | — |
| 19 | 333 | −399.943 | 1.20 | 1.80420 | 46.49 |
| 20 | 334 | 22.482 | 8.67 | 1.48749 | 70.45 |
| 21 | 335 | −29.720 | [D21] | — | — |
| 22 | 401 | −100.000 | 3.00 | 1.77250 | 49.62 |
| 23 | 402 | −44.000 | 0.63 | — | — |
| 24 | C01 | ∞ | 3.00 | 1.48745 | 64.84 |
| 25 | C02 | ∞ | — | — | — |

Aspherical coefficient

| 211th surface | | 222th surface | | 323rd surface | |
|---|---|---|---|---|---|
| K = | −4.49852E+00 | K = | 0.00000E+00 | K = | 1.10025E+02 |
| A = | 4.55610E−05 | A = | −7.62091E−06 | A = | 3.28995E−05 |
| B = | −5.90755E−08 | B = | −1.49971E−08 | B = | 1.57008E−08 |
| C = | 9.86610E−10 | C = | 3.40757E−11 | C = | −1.83013E−11 |
| D = | −6.47252E−12 | D = | −2.43114E−13 | | |
| E = | 2.53858E−14 | | | | |

Embodiment 8

Figure 15:
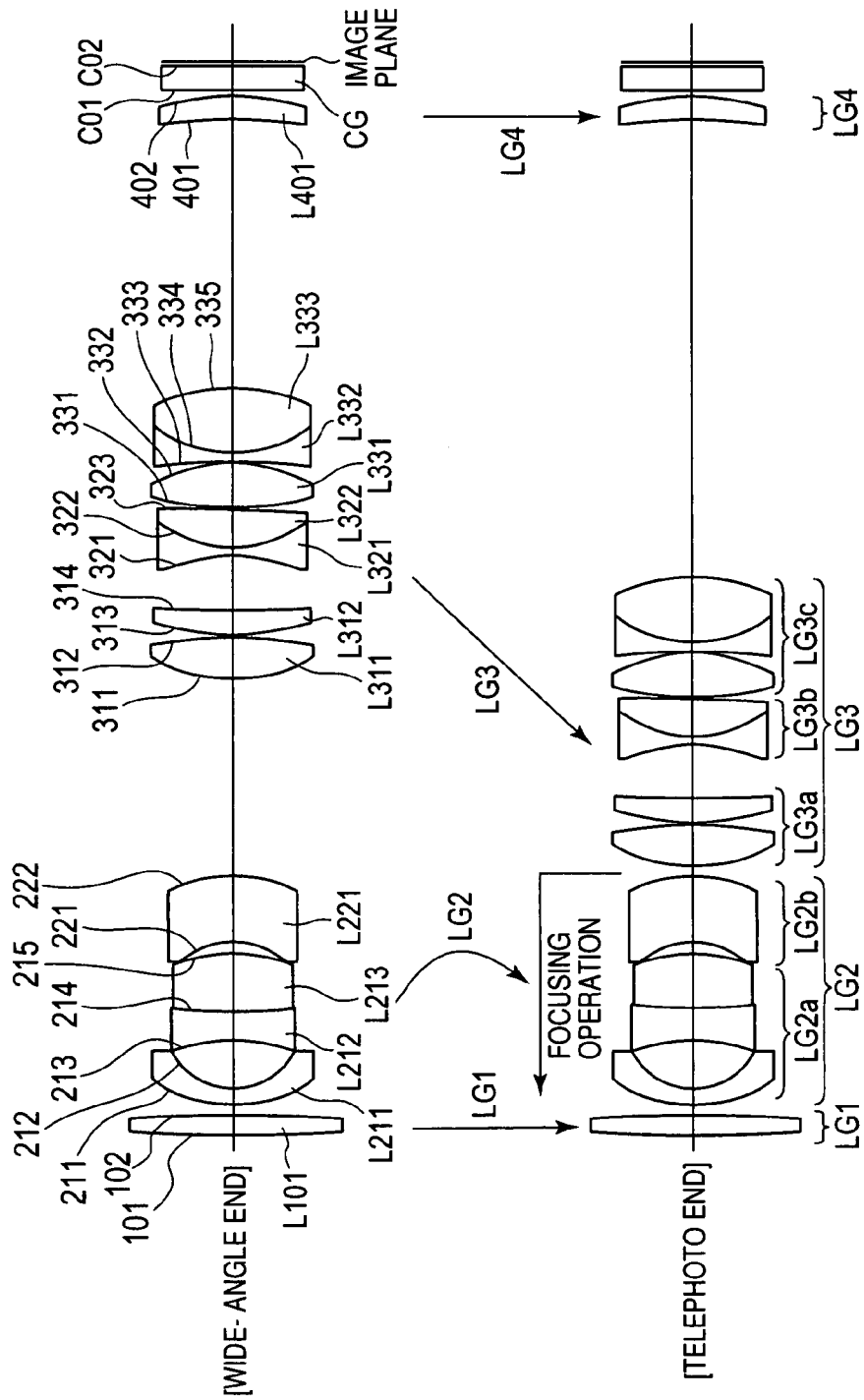
FIG. 15 is a drawing showing a lens configuration of a eighth embodiment of a zoom lens according to the invention.

A numerical example for Embodiment 8 of a zoom lens of the invention is shown in Table 8. In addition, FIG. 15 is a drawing showing a lens configuration of Embodiment 8 and FIG. 16 shows drawings illustrating aberrations thereof.

TABLE 8

|  | Wide angle end | Intermediate area | Telephoto end |
|---|---|---|---|
| f | 15.91 | 23.90 | 30.85 |
| $F_{no}$ | 2.29 | 2.69 | 3.40 |
| 2ω | 66.02 | 46.24 | 36.77 |
| Hereinafter, airspaces which change by variable power | | | |
| D2 | 1.04 | 4.92 | 1.04 |
| D9 | 25.23 | 9.14 | 1.07 |
| D21 | 34.00 | 46.21 | 58.15 |

| Serial numbers | Surface numbers | r | d | $n_d$ | $\nu_d$ |
|---|---|---|---|---|---|
| 1 | 101 | 170.580 | 2.51 | 1.51680 | 64.20 |
| 2 | 102 | −400.000 | [D2] | — | — |
| 3 | 211 | 31.479 | 2.00 | 1.80420 | 46.49 |
| 4 | 212 | 11.799 | 6.24 | — | — |
| 5 | 213 | −30.112 | 3.61 | 1.69680 | 55.48 |
| 6 | 214 | 98.368 | 7.50 | 1.84666 | 23.78 |
| 7 | 215 | −26.202 | 1.36 | — | — |
| 8 | 221 | −14.622 | 8.80 | 1.80486 | 24.74 |
| 9 | 222 | −31.010 | [D9] | — | — |
| 10 | 311 | 26.775 | 5.31 | 1.49700 | 81.61 |
| 11 | 312 | −102.377 | 0.20 | — | — |
| 12 | 313 | 38.205 | 3.10 | 1.49700 | 81.61 |
| 13 | 314 | 142.853 | 6.89 | — | — |
| 14 | 321 | −33.476 | 1.00 | 1.80610 | 40.73 |
| 15 | 322 | 22.364 | 4.54 | 1.57135 | 52.95 |
| 16 | 323 | −173.046 | 0.20 | — | — |
| 17 | 331 | 37.644 | 5.79 | 1.56732 | 42.84 |
| 18 | 332 | −30.030 | 0.21 | — | — |
| 19 | 333 | −179.990 | 1.21 | 1.80610 | 40.73 |
| 20 | 334 | 22.257 | 8.28 | 1.48749 | 70.45 |
| 21 | 335 | −28.691 | [D21] | — | — |
| 22 | 401 | −100.000 | 3.00 | 1.77250 | 49.62 |
| 23 | 402 | −44.000 | 0.63 | — | — |
| 24 | C01 | ∞ | 3.00 | 1.48745 | 64.84 |
| 25 | C02 | ∞ | — | — | — |

| Aspherical coefficient | | | | | |
|---|---|---|---|---|---|
| 211th surface | | 222th surface | | 323rd surface | |
| K = | −5.81492E+00 | K = | 0.00000E+00 | K = | 1.12793E+02 |
| A = | 4.79363E−05 | A = | −7.29898E−06 | A = | 3.14361E−05 |
| B = | −7.55225E−08 | B = | −1.30531E−08 | B = | 1.37294E−08 |
| C = | 9.21022E−10 | C = | 2.69415E−11 | C = | −1.46667E−11 |
| D = | −5.40044E−12 | D = | −1.97182E−13 | | |
| E = | 1.97402E−14 | | | | |

Embodiment 9

Figure 17:
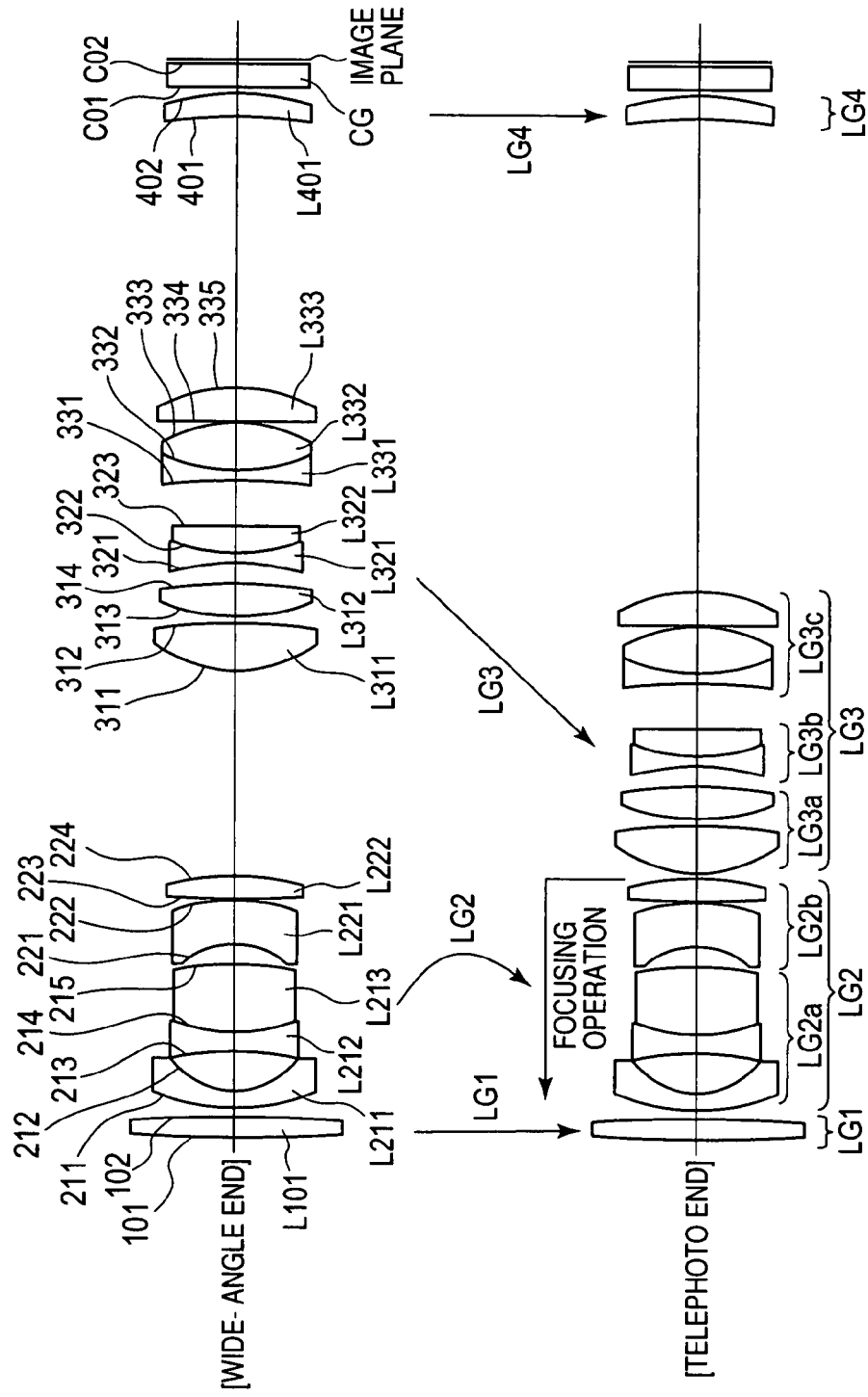
FIG. 17 is a drawing showing a lens configuration of a ninth embodiment of a zoom lens according to the invention.

A numerical example for Embodiment 9 of a zoom lens of the invention is shown in Table 9. In addition, FIG. 17 is a drawing showing a lens configuration of Embodiment 9 and FIG. 18 shows drawings illustrating aberrations thereof.

TABLE 9

|  | Wide angle end | Intermediate area | Telephoto end |
|---|---|---|---|
| f | 15.92 | 23.94 | 30.85 |
| $F_{no}$ | 2.29 | 2.80 | 3.31 |
| 2ω | 66.03 | 46.17 | 36.82 |
| Hereinafter, airspaces which change by variable power | | | |
| D2 | 1.04 | 5.05 | 1.05 |
| D11 | 26.03 | 9.40 | 1.07 |
| D23 | 34.00 | 46.61 | 58.95 |

| Serial numbers | Surface numbers | r | d | $n_d$ | $\nu_d$ |
|---|---|---|---|---|---|
| 1 | 101 | 226.593 | 2.55 | 1.48749 | 70.45 |
| 2 | 102 | −211.280 | [D2] | — | — |
| 3 | 211 | 51.147 | 2.00 | 1.80610 | 40.73 |
| 4 | 212 | 13.298 | 5.17 | — | — |
| 5 | 213 | −50.472 | 2.31 | 1.77250 | 49.65 |
| 6 | 214 | 32.189 | 8.53 | 1.80518 | 25.46 |
| 7 | 215 | −56.316 | 2.54 | — | — |
| 8 | 221 | −14.688 | 5.53 | 1.77250 | 49.65 |
| 9 | 222 | −33.957 | 0.20 | — | — |
| 10 | 223 | 347.087 | 2.73 | 1.69680 | 55.48 |
| 11 | 224 | −58.189 | [D11] | — | — |
| 12 | 311 | 22.820 | 6.03 | 1.48749 | 70.45 |
| 13 | 312 | −113.138 | 0.97 | — | — |
| 14 | 313 | 37.475 | 4.03 | 1.49700 | 81.61 |
| 15 | 314 | −105.204 | 2.71 | — | — |
| 16 | 321 | −41.182 | 1.20 | 1.78590 | 43.93 |
| 17 | 322 | 29.601 | 3.54 | 1.51633 | 64.06 |
| 18 | 323 | −133.897 | 5.60 | — | — |
| 19 | 331 | −89.498 | 1.20 | 1.80420 | 46.49 |
| 20 | 332 | 29.828 | 5.98 | 1.48749 | 70.45 |
| 21 | 333 | −29.634 | 0.20 | — | — |
| 22 | 334 | −1146.189 | 4.32 | 1.49700 | 81.61 |
| 23 | 335 | −29.596 | [D23] | — | — |
| 24 | 401 | −100.000 | 3.00 | 1.77250 | 49.62 |
| 25 | 402 | −44.000 | 0.63 | — | — |
| 26 | C01 | ∞ | 3.00 | 1.48745 | 64.84 |
| 27 | C02 | ∞ | — | — | — |

| Aspherical coefficient | | | |
|---|---|---|---|
| 211th surface | | 323rd surface | |
| K = | −1.40134E+01 | K = | −3.23592E+01 |
| A = | 4.06071E−05 | A = | 3.59131E−05 |
| B = | −8.21033E−08 | B = | 1.42490E−08 |
| C = | 4.92241E−10 | C = | 5.85171E−11 |
| D = | −1.61981E−12 | | |
| E = | 3.55796E−15 | | |

Embodiment 10

Figure 19:
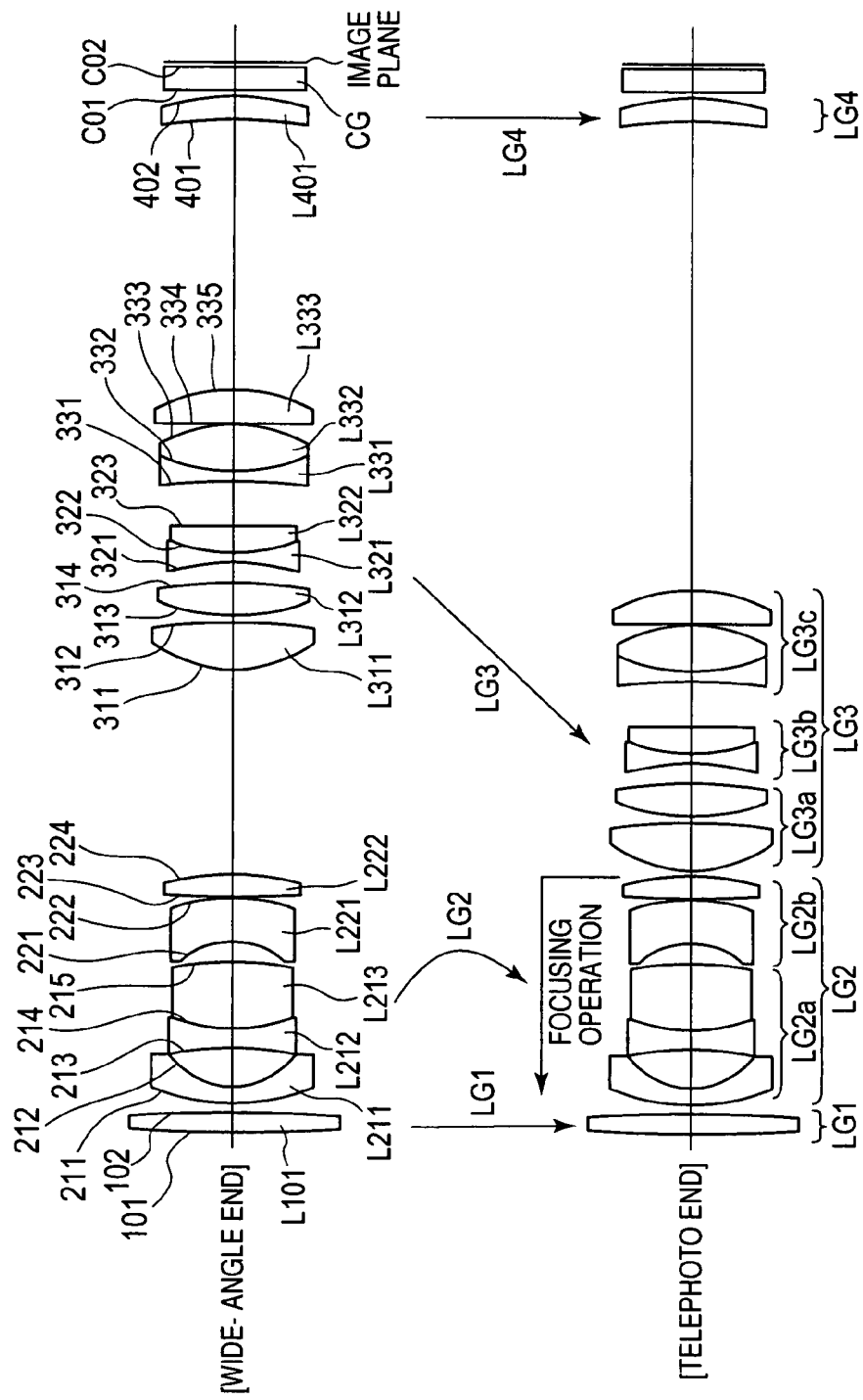
FIG. 19 is a drawing showing a lens configuration of a tenth embodiment of a zoom lens according to the invention.

A numerical example for Embodiment 10 of a zoom lens of the invention is shown in Table 10. In addition, FIG. 19 is a drawing showing a lens configuration of Embodiment 10 and FIG. 20 shows drawings illustrating aberrations thereof.

TABLE 10

|  | Wide angle end | Intermediate area | Telephoto end |
|---|---|---|---|
| f | 15.92 | 23.93 | 30.86 |
| $F_{no}$ | 2.29 | 2.81 | 3.32 |
| 2ω | 66.03 | 46.21 | 36.83 |
| Hereinafter, airspaces which change by variable power | | | |
| D2 | 1.56 | 5.25 | 1.04 |
| D11 | 25.59 | 9.24 | 1.07 |
| D23 | 34.00 | 46.66 | 59.05 |

| Serial numbers | Surface numbers | r | d | $n_d$ | $\nu_d$ |
|---|---|---|---|---|---|
| 1 | 101 | 258.620 | 2.50 | 1.51680 | 64.20 |
| 2 | 102 | −214.755 | [D2] | — | — |
| 3 | 211 | 51.144 | 2.00 | 1.80610 | 40.73 |
| 4 | 212 | 13.108 | 5.35 | — | — |
| 5 | 213 | −43.586 | 2.49 | 1.77250 | 49.65 |
| 6 | 214 | 42.950 | 8.61 | 1.80518 | 25.46 |
| 7 | 215 | −46.865 | 2.16 | — | — |
| 8 | 221 | −15.010 | 4.93 | 1.80420 | 46.49 |
| 9 | 222 | −35.395 | 0.20 | — | — |

TABLE 10-continued

| | | | | | |
|---|---|---|---|---|---|
| 10 | 223 | 324.928 | 2.83 | 1.67003 | 47.19 |
| 11 | 224 | −51.898 | [D11] | — | — |
| 12 | 311 | 22.058 | 6.20 | 1.49700 | 81.61 |
| 13 | 312 | −106.095 | 0.20 | — | — |
| 14 | 313 | 45.630 | 3.57 | 1.48749 | 70.45 |
| 15 | 314 | −163.520 | 3.43 | — | — |
| 16 | 321 | −41.800 | 1.20 | 1.80420 | 46.49 |
| 17 | 322 | 43.335 | 3.09 | 1.51633 | 64.06 |
| 18 | 323 | −111.475 | 5.76 | — | — |
| 19 | 331 | −118.589 | 1.20 | 1.80610 | 40.73 |
| 20 | 332 | 28.912 | 6.12 | 1.48749 | 70.45 |
| 21 | 333 | −29.096 | 0.20 | — | — |
| 22 | 334 | −250.500 | 4.08 | 1.49700 | 81.61 |
| 23 | 335 | −29.878 | [D23] | — | — |
| 24 | 401 | −100.000 | 3.00 | 1.77250 | 49.62 |
| 25 | 402 | −44.000 | 0.63 | — | — |
| 26 | C01 | ∞ | 3.00 | 1.48745 | 64.84 |
| 27 | C02 | ∞ | — | — | — |

Aspherical coefficient

| 211th surface | | 323rd surface | |
|---|---|---|---|
| K = | −1.30414E+01 | K = | −5.03170E+01 |
| A = | 4.07372E−05 | A = | 3.76578E−05 |
| B = | −8.49576E−08 | B = | 2.84924E−08 |
| C = | 5.34789E−10 | C = | 8.07136E−11 |
| D = | −1.83531E−12 | | |
| E = | 3.90020E−15 | | |

Embodiment 11

Figure 21:
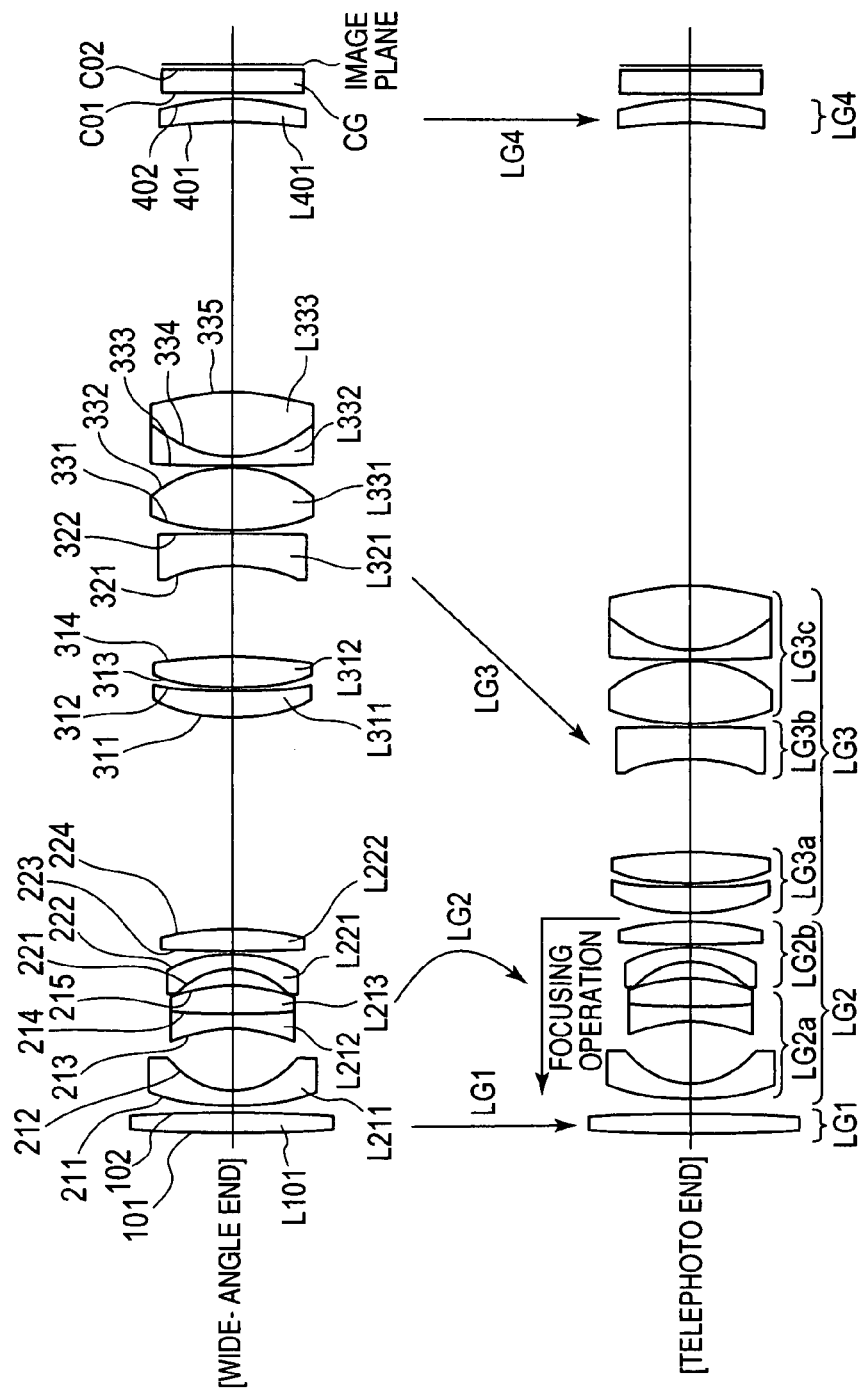
FIG. 21 is a drawing showing a lens configuration of a eleventh embodiment of a zoom lens according to the invention.

A numerical example for Embodiment 11 of a zoom lens of invention is shown in Table 11. In addition, FIG. 21 is a drawing showing a lens configuration of Embodiment 11 and FIG. 22 shows drawings illustrating aberrations thereof.

TABLE 11

| | Wide angle end | Intermediate area | Telephoto end |
|---|---|---|---|
| f | 15.92 | 23.92 | 30.86 |
| $F_{no}$ | 2.29 | 2.80 | 3.30 |
| 2ω | 66.04 | 46.24 | 36.81 |
| Hereinafter, airspaces which change by variable power | | | |
| D2 | 1.04 | 5.45 | 1.73 |
| D11 | 26.50 | 9.55 | 1.08 |
| D22 | 34.00 | 46.54 | 58.74 |

| Serial numbers | Surface numbers | r | d | $n_d$ | $\nu_d$ |
|---|---|---|---|---|---|
| 1 | 101 | 202.104 | 2.50 | 1.48749 | 70.45 |
| 2 | 102 | −273.494 | [D2] | — | — |
| 3 | 211 | 87.044 | 2.00 | 1.80610 | 40.73 |
| 4 | 212 | 13.244 | 7.90 | — | — |
| 5 | 213 | −25.697 | 1.80 | 1.67790 | 55.52 |
| 6 | 214 | 137.990 | 3.66 | 1.75520 | 27.53 |
| 7 | 215 | −29.317 | 2.00 | — | — |
| 8 | 221 | −13.830 | 2.00 | 1.80420 | 46.49 |
| 9 | 222 | −25.027 | 0.20 | — | — |
| 10 | 223 | 500.000 | 3.12 | 1.78590 | 43.93 |
| 11 | 224 | −48.769 | [D11] | — | — |
| 12 | 311 | 31.838 | 3.37 | 1.48749 | 70.45 |
| 13 | 312 | 85.130 | 0.43 | — | — |
| 14 | 313 | 43.359 | 4.09 | 1.49700 | 81.61 |
| 15 | 314 | −85.268 | 11.54 | — | — |
| 16 | 321 | −25.503 | 4.16 | 1.80610 | 40.73 |
| 17 | 322 | −106.920 | 0.26 | — | — |
| 18 | 331 | 39.848 | 8.10 | 1.48749 | 70.45 |
| 19 | 332 | −23.035 | 0.20 | — | — |
| 20 | 333 | 240.431 | 1.20 | 1.79950 | 42.35 |
| 21 | 334 | 19.372 | 8.09 | 1.48749 | 70.45 |
| 22 | 335 | −42.767 | [D22] | — | — |
| 23 | 401 | −100.000 | 3.00 | 1.77250 | 49.62 |
| 24 | 402 | −44.000 | 0.63 | — | — |
| 25 | C01 | ∞ | 3.00 | 1.48745 | 64.84 |
| 26 | C02 | ∞ | — | — | — |

Aspherical coefficient

| 211th surface | | 322th surface | |
|---|---|---|---|
| K = | −3.36336E+01 | K = | −6.66720E+01 |
| A = | 4.41690E−05 | A = | 1.62859E−05 |
| B = | −8.78910E−08 | B = | 3.28247E−08 |
| C = | 3.37096E−10 | C = | −1.41765E−12 |
| D = | −2.22272E−13 | | |
| E = | 1.20284E−16 | | |

Embodiment 12

Figure 23:
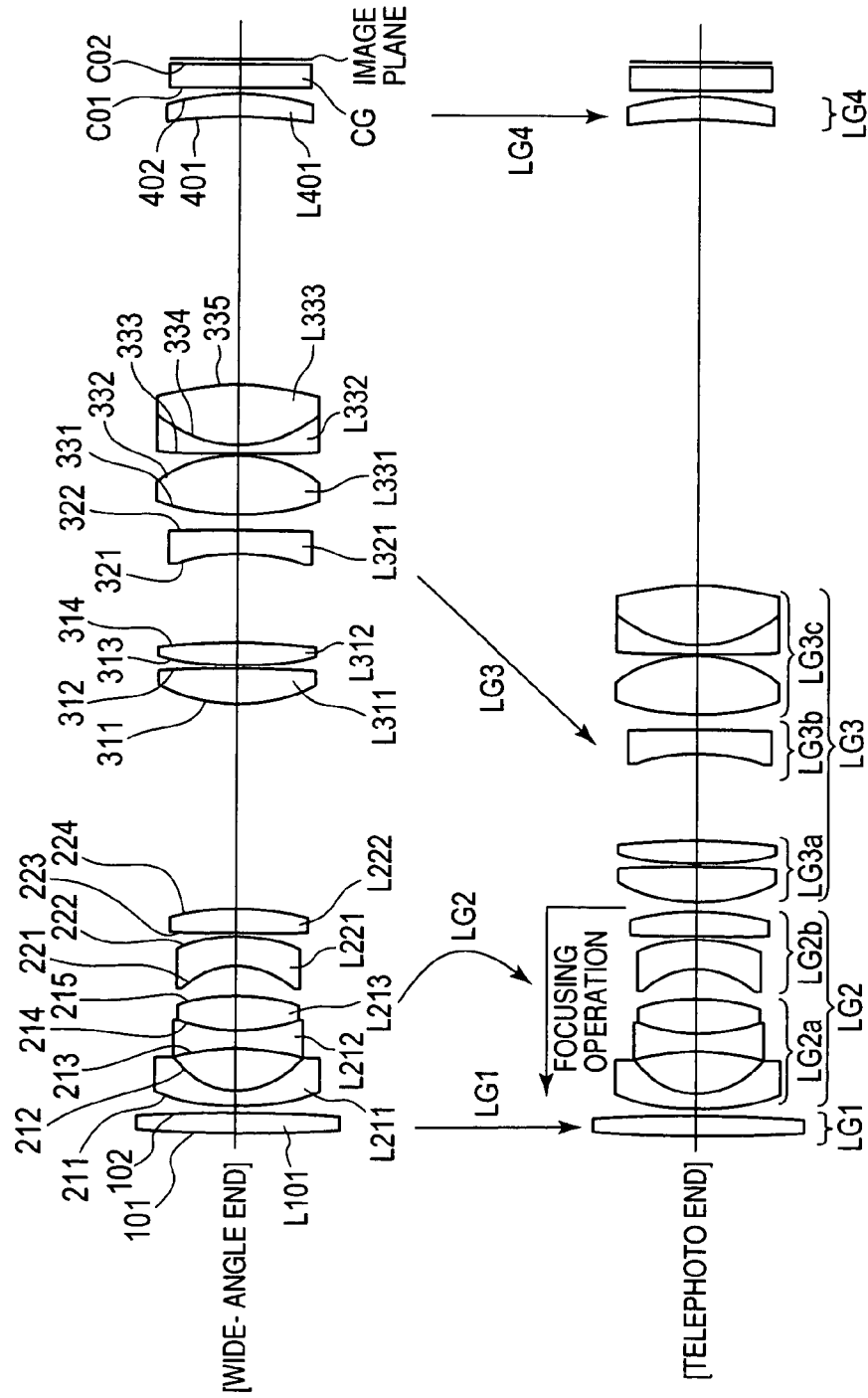
FIG. 23 is a drawing showing a lens configuration of a twelfth embodiment of a zoom lens according to the invention.

A numerical example for Embodiment 12 of a zoom lens of the invention is shown in Table 12. In addition, FIG. 23 is a drawing showing a lens configuration of Embodiment 12 and FIG. 24 shows drawings illustrating aberrations thereof.

TABLE 12

| | Wide angle end | Intermediate area | Telephoto end |
|---|---|---|---|
| f | 15.92 | 23.93 | 30.85 |
| $F_{no}$ | 2.29 | 2.81 | 3.32 |
| 2ω | 66.04 | 46.26 | 36.85 |
| Hereinafter, airspaces which change by variable power | | | |
| D2 | 1.03 | 5.08 | 1.05 |
| D11 | 26.20 | 9.47 | 1.07 |
| D22 | 34.00 | 46.68 | 59.12 |

| Serial numbers | Surface numbers | r | d | $n_d$ | $\nu_d$ |
|---|---|---|---|---|---|
| 1 | 101 | 171.137 | 2.50 | 1.48749 | 70.45 |
| 2 | 102 | −303.824 | [D2] | — | — |
| 3 | 211 | 71.367 | 2.00 | 1.81474 | 37.03 |
| 4 | 212 | 13.263 | 5.36 | — | — |
| 5 | 213 | −45.719 | 2.28 | 1.69680 | 55.48 |
| 6 | 214 | 28.898 | 4.50 | 1.69895 | 30.05 |
| 7 | 215 | −40.744 | 3.74 | — | — |
| 8 | 221 | −14.108 | 3.75 | 1.80610 | 40.73 |
| 9 | 222 | −30.381 | 0.33 | — | — |
| 10 | 223 | 959.421 | 3.20 | 1.80610 | 33.27 |
| 11 | 224 | −48.769 | [D11] | — | — |
| 12 | 311 | 30.546 | 4.60 | 1.49700 | 81.61 |
| 13 | 312 | −239.684 | 0.20 | — | — |
| 14 | 313 | 81.600 | 2.77 | 1.51680 | 64.20 |
| 15 | 314 | −405.896 | 11.64 | — | — |
| 16 | 321 | −28.442 | 2.86 | 1.81474 | 37.03 |
| 17 | 322 | −107.758 | 2.07 | — | — |
| 18 | 331 | 44.660 | 7.13 | 1.49700 | 81.61 |
| 19 | 332 | −23.616 | 0.20 | — | — |
| 20 | 333 | 124.975 | 1.20 | 1.80420 | 46.49 |
| 21 | 334 | 18.594 | 7.72 | 1.48749 | 70.45 |
| 22 | 335 | −60.456 | [D22] | — | — |
| 23 | 401 | −100.000 | 3.00 | 1.77250 | 49.62 |
| 24 | 402 | −44.000 | 0.63 | — | — |
| 25 | C01 | ∞ | 3.00 | 1.48745 | 64.84 |
| 26 | C02 | ∞ | — | — | — |

Aspherical coefficient

| 211th surface | | 322th surface | |
|---|---|---|---|
| K = | −2.68838E+01 | K = | −5.44543E+01 |
| A = | 4.21150E−05 | A = | 1.68637E−05 |
| B = | −8.26982E−08 | B = | 2.92463E−08 |
| C = | 3.19858E−10 | C = | 3.29212E−11 |
| D = | −3.19278E−13 | | |
| E = | 1.29491E−17 | | |

Embodiment 13

Figure 25:
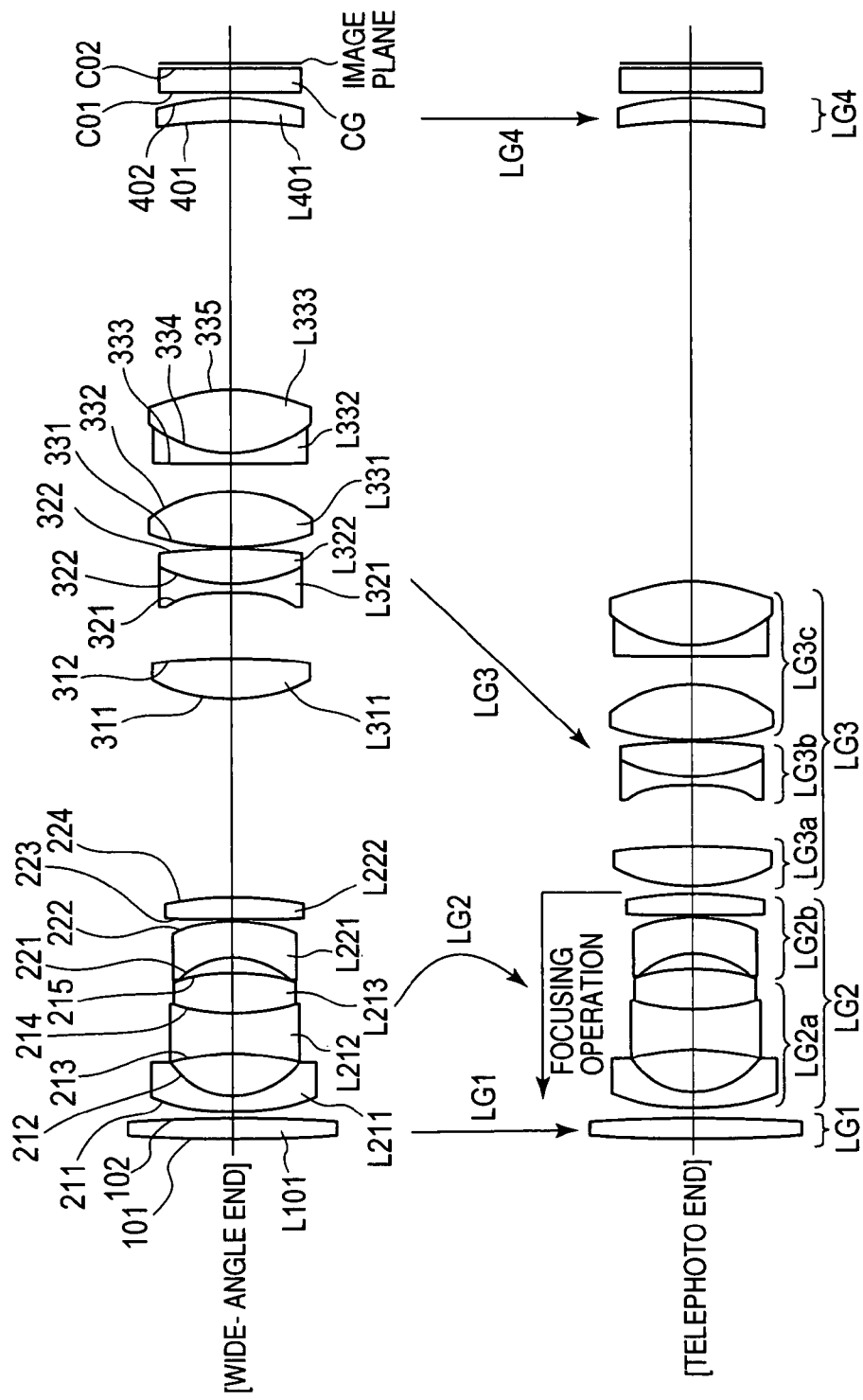
FIG. 25 is a drawing showing a lens configuration of a thirteenth embodiment of a zoom lens according to the invention.

A numerical example for Embodiment 13 of a zoom lens of the invention is shown in Table 13. In addition, FIG. 25 is a drawing showing a lens configuration of Embodiment 13 and FIG. 26 shows drawings illustrating aberrations thereof.

TABLE 13

| | Wide angle end | Intermediate area | Telephoto end |
|---|---|---|---|
| f | 15.92 | 23.91 | 30.85 |
| $F_{no}$ | 2.29 | 2.80 | 3.30 |
| 2ω | 66.04 | 46.28 | 36.82 |
| Hereinafter, airspaces which change by variable power | | | |
| D2 | 1.28 | 5.11 | 1.04 |
| D11 | 25.65 | 9.27 | 1.07 |
| D21 | 34.00 | 46.55 | 58.82 |

| Serial numbers | Surface numbers | r | d | $n_d$ | $\nu_d$ |
|---|---|---|---|---|---|
| 1 | 101 | 217.308 | 2.50 | 1.48749 | 70.45 |
| 2 | 102 | −247.782 | [D2] | — | — |
| 3 | 211 | 66.694 | 2.00 | 1.80610 | 40.71 |
| 4 | 212 | 13.492 | 5.11 | — | — |
| 5 | 213 | −58.379 | 5.02 | 1.69680 | 55.48 |
| 6 | 214 | 44.696 | 4.80 | 1.69895 | 30.05 |
| 7 | 215 | −44.202 | 2.07 | — | — |
| 8 | 221 | −14.497 | 4.61 | 1.80420 | 46.49 |
| 9 | 222 | −33.946 | 0.20 | — | — |
| 10 | 223 | 375.183 | 2.67 | 1.80610 | 33.27 |
| 11 | 224 | −60.404 | [D11] | — | — |
| 12 | 311 | 30.076 | 5.11 | 1.64000 | 60.21 |
| 13 | 312 | −79.689 | 8.36 | — | — |
| 14 | 321 | −26.874 | 1.00 | 1.74400 | 44.90 |
| 15 | 322 | 26.703 | 4.31 | 1.51633 | 64.06 |
| 16 | 323 | −72.169 | 0.20 | — | — |
| 17 | 331 | 40.171 | 7.04 | 1.49700 | 81.61 |
| 18 | 332 | −23.330 | 3.83 | — | — |
| 19 | 333 | −469.497 | 1.21 | 1.80420 | 46.49 |
| 20 | 334 | 21.489 | 8.12 | 1.48749 | 70.45 |
| 21 | 335 | −30.814 | [D21] | — | — |
| 22 | 401 | −100.000 | 3.00 | 1.77250 | 49.62 |
| 23 | 402 | −44.000 | 0.63 | — | — |
| 24 | C01 | ∞ | 3.00 | 1.48745 | 64.84 |
| 25 | C02 | ∞ | — | — | — |

| Aspherical coefficient | | | |
|---|---|---|---|
| 211th surface | | 323rd surface | |
| K = | −2.50855E+01 | K = | −4.71663E+01 |
| A = | 4.26023E−05 | A = | 1.63948E−05 |
| B = | −8.71624E−08 | B = | 7.99297E−08 |
| C = | 4.27111E−10 | C = | −1.11084E−10 |
| D = | −1.00034E−12 | | |
| E = | 1.88512E−15 | | |

Embodiment 14

Figure 27:
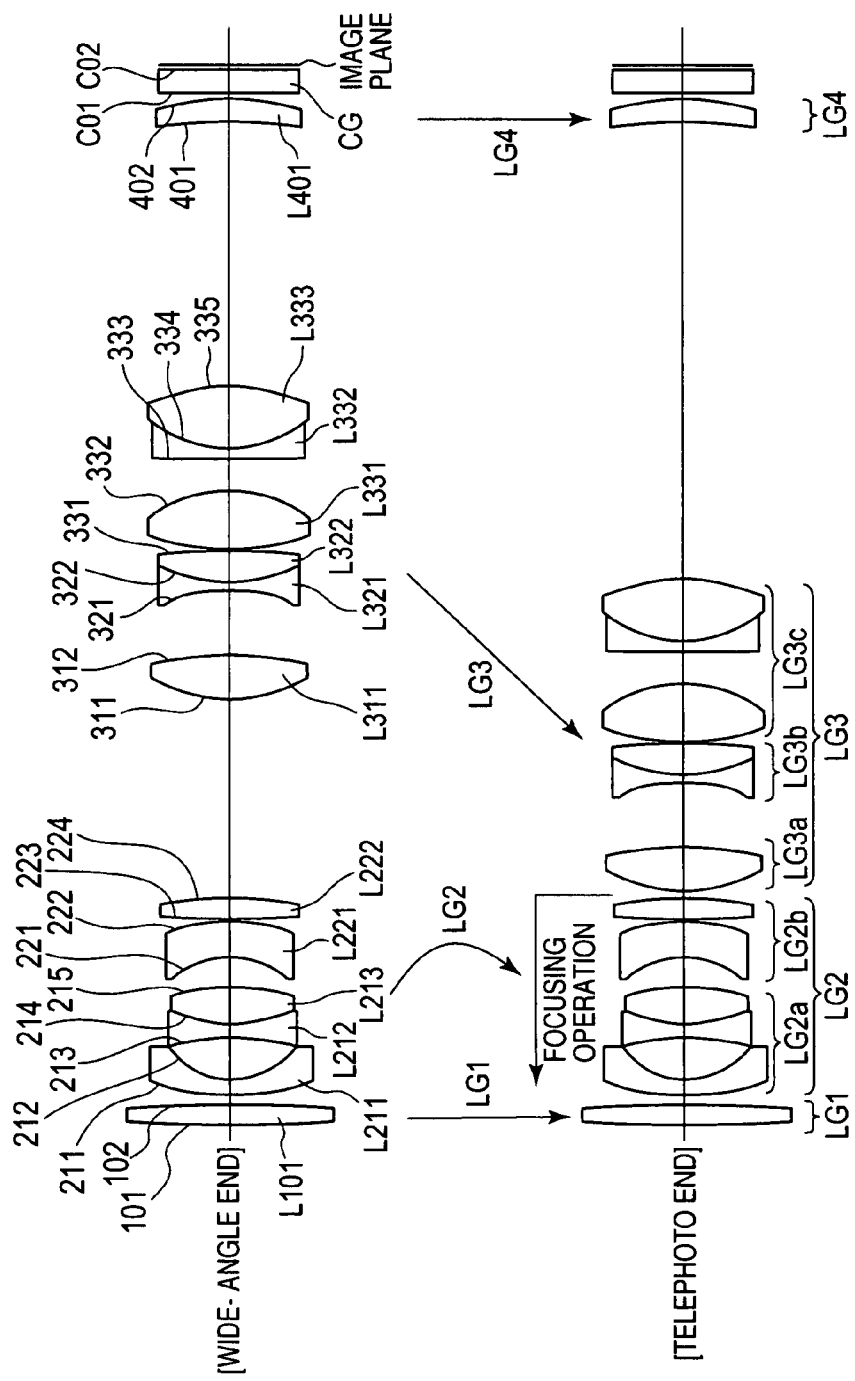
FIG. 27 is a drawing showing a lens configuration of a fourteenth embodiment of a zoom lens according to the invention.

A numerical example for Embodiment 14 of a zoom lens of the invention is shown in Table 14. In addition, FIG. 27 is a drawing showing a lens configuration of Embodiment 14 and FIG. 28 shows drawings illustrating aberrations thereof.

TABLE 14

| | Wide angle end | Intermediate area | Telephoto end |
|---|---|---|---|
| f | 15.91 | 23.92 | 30.86 |
| $F_{no}$ | 2.29 | 2.80 | 3.30 |
| 2ω | 66.04 | 46.30 | 36.84 |
| Hereinafter, airspaces which change by variable power | | | |
| D2 | 1.32 | 5.13 | 1.06 |
| D11 | 25.60 | 9.23 | 1.07 |
| D21 | 34.03 | 46.60 | 58.83 |

| Serial numbers | Surface numbers | r | d | $n_d$ | $\nu_d$ |
|---|---|---|---|---|---|
| 1 | 101 | 200.403 | 2.50 | 1.48749 | 70.45 |
| 2 | 102 | −276.620 | [D2] | — | — |
| 3 | 211 | 72.176 | 2.00 | 1.81474 | 37.03 |
| 4 | 212 | 13.620 | 5.07 | — | — |
| 5 | 213 | −62.119 | 1.83 | 1.78590 | 43.93 |
| 6 | 214 | 24.295 | 4.85 | 1.78472 | 25.72 |
| 7 | 215 | −45.651 | 3.92 | — | — |
| 8 | 221 | −14.095 | 4.88 | 1.80420 | 46.49 |
| 9 | 222 | −32.213 | 0.20 | — | — |
| 10 | 223 | 412.742 | 2.69 | 1.80420 | 46.49 |
| 11 | 224 | −59.136 | [D11] | — | — |
| 12 | 311 | 26.966 | 5.71 | 1.49700 | 81.61 |
| 13 | 312 | −57.924 | 8.64 | — | — |
| 14 | 321 | −24.335 | 1.01 | 1.74330 | 49.23 |
| 15 | 322 | 38.108 | 3.75 | 1.60970 | 57.80 |
| 16 | 323 | −76.282 | 0.20 | — | — |
| 17 | 331 | 43.109 | 7.76 | 1.49700 | 81.61 |
| 18 | 332 | −22.646 | 4.10 | — | — |
| 19 | 333 | 499.661 | 1.21 | 1.80420 | 46.49 |
| 20 | 334 | 20.561 | 7.91 | 1.48749 | 70.45 |
| 21 | 335 | −37.626 | [D21] | — | — |
| 22 | 401 | −100.000 | 3.00 | 1.77250 | 49.62 |
| 23 | 402 | −44.000 | 0.63 | — | — |
| 24 | C01 | ∞ | 3.00 | 1.48745 | 64.84 |
| 25 | C02 | ∞ | — | — | — |

| Aspherical coefficient | | | |
|---|---|---|---|
| 211th surface | | 323rd surface | |
| K = | −2.82344E+01 | K = | −4.99934E+01 |
| A = | 4.15530E−05 | A = | 1.55112E−05 |
| B = | −7.75455E−08 | B = | 7.76853E−08 |
| C = | 2.93961E−10 | C = | −9.69929E−11 |
| D = | −1.58232E−13 | | |
| E = | −3.18804E−16 | | |

Embodiment 15

Figure 29:
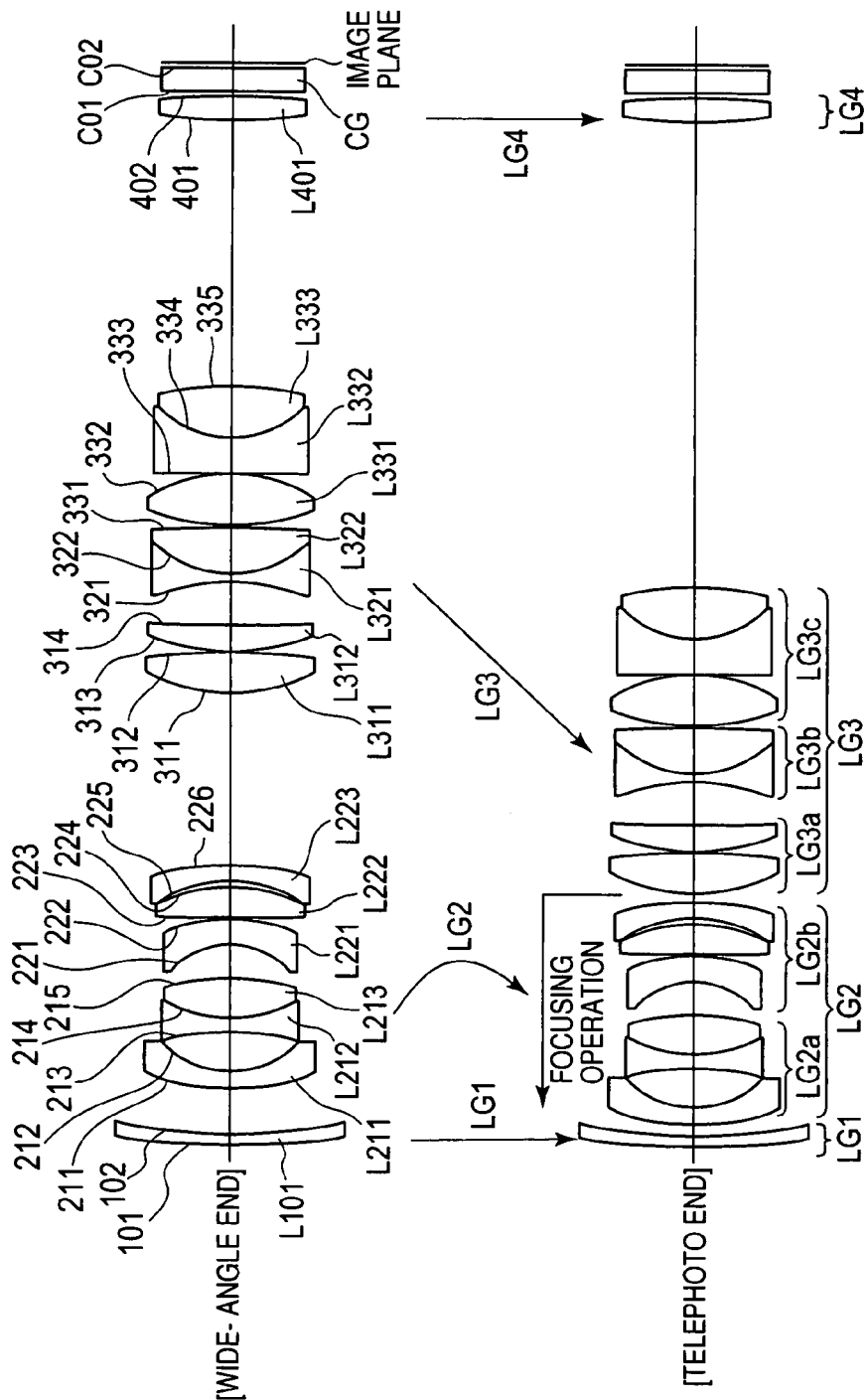
FIG. 29 is a drawing showing a lens configuration of a fifteenth embodiment of a zoom lens according to the invention.

A numerical example for Embodiment 15 of a zoom lens of the invention is shown in Table 15. In addition, FIG. 29 is a drawing showing a lens configuration of Embodiment 15 and FIG. 30 shows drawings illustrating aberrations thereof.

TABLE 15

| | Wide angle end | Intermediate area | Telephoto end |
|---|---|---|---|
| f | 15.95 | 23.95 | 30.96 |
| $F_{no}$ | 2.29 | 2.79 | 3.21 |
| 2ω | 65.96 | 46.14 | 36.25 |
| Hereinafter, airspaces which change by variable power | | | |
| D2 | 5.58 | 6.55 | 1.48 |
| D13 | 22.22 | 7.36 | 1.05 |
| D25 | 34.00 | 47.89 | 59.27 |

| Serial numbers | Surface numbers | r | d | $n_d$ | $\nu_d$ |
|---|---|---|---|---|---|
| 1 | 101 | 125.911 | 1.40 | 1.69680 | 55.48 |
| 2 | 102 | 83.333 | [D2] | — | — |
| 3 | 211 | 69.378 | 2.25 | 1.80139 | 45.45 |
| 4 | 212 | 15.110 | 4.94 | — | — |
| 5 | 213 | −49.116 | 1.80 | 1.80100 | 34.97 |
| 6 | 214 | 22.600 | 5.09 | 1.74077 | 27.75 |
| 7 | 215 | −40.327 | 4.32 | — | — |
| 8 | 221 | −12.563 | 3.26 | 1.69680 | 55.48 |
| 9 | 222 | −27.112 | 0.20 | — | — |
| 10 | 223 | 573.647 | 3.93 | 1.80420 | 46.49 |
| 11 | 224 | −26.603 | 0.72 | — | — |

TABLE 15-continued

| | | | | | |
|---|---|---|---|---|---|
| 12 | 225 | −21.407 | 2.00 | 1.48749 | 70.45 |
| 13 | 226 | −57.392 | [D13] | — | — |
| 14 | 311 | 27.415 | 5.35 | 1.49700 | 81.61 |
| 15 | 312 | −118.196 | 0.03 | — | — |
| 16 | 313 | 37.269 | 3.42 | 1.48749 | 70.45 |
| 17 | 314 | 248.659 | 5.50 | — | — |
| 18 | 321 | −34.573 | 1.06 | 1.80420 | 46.49 |
| 19 | 322 | 17.779 | 5.97 | 1.58313 | 59.46 |
| 20 | 323 | −92.701 | 0.20 | — | — |
| 21 | 331 | 35.109 | 6.50 | 1.58913 | 61.25 |
| 22 | 332 | −27.366 | 0.20 | — | — |
| 23 | 333 | −841.004 | 4.46 | 1.80420 | 46.49 |
| 24 | 334 | 16.832 | 6.51 | 1.48749 | 70.45 |
| 25 | 335 | −57.402 | [D25] | — | — |
| 26 | 401 | 77.807 | 3.00 | 1.80420 | 46.49 |
| 27 | 402 | −219.463 | 0.63 | — | — |
| 28 | C01 | ∞ | 3.00 | 1.48745 | 64.84 |
| 29 | C02 | ∞ | — | — | — |

Aspherical coefficient

| 211th surface | | 323rd surface | |
|---|---|---|---|
| K = | −7.42197E+01 | K = | −7.08880E+01 |
| A = | 5.98954E−5 | A = | 9.74075E−06 |
| B = | −2.52692E−07 | B = | 4.70139E−08 |
| C = | 2.01273E−09 | C = | −9.24242E−11 |
| D = | −9.38895E−12 | | |
| E = | 2.55254E−14 | | |

Next, values of Embodiments 1 to 15 which correspond to Conditional expressions (1) to (25) are shown altogether in Table 16.

TABLE 16

| | | Embodiment | | | | | | | |
|---|---|---|---|---|---|---|---|---|---|
| | | 1 | 2 | 3 | 4 | 5 | 6 | 7 | 8 |
| Conditional expression | (1) | −0.78 | −0.78 | −0.78 | −0.79 | −0.78 | −0.77 | −0.78 | −0.78 |
| | (2) | 0.14 | 0.43 | 0.44 | 0.44 | 0.43 | 0.43 | 0.44 | 0.45 |
| | (3) | 2.14 | 2.14 | 2.14 | 2.14 | 2.14 | 2.14 | 2.14 | 2.14 |
| | (4) | 0.07 | 0.08 | 0.08 | 0.09 | 0.08 | 0.07 | 0.07 | 0.07 |
| | (5) | −0.60 | −0.69 | −0.72 | −0.64 | −0.63 | −0.70 | −0.22 | −0.22 |
| | (6) | −0.16 | −0.09 | −0.08 | −0.13 | −0.15 | −0.12 | −0.36 | −0.35 |
| | (7) | 1.76 | 1.72 | 1.67 | 1.78 | 1.73 | 1.63 | 1.83 | 1.85 |
| | (8) | 1.09 | 1.12 | 1.17 | 1.10 | 1.16 | 1.22 | 1.37 | 1.35 |
| | (9) | 1.77 | 1.75 | 1.78 | 1.80 | 1.72 | 1.80 | 1.79 | 1.78 |
| | (10) | −13.67 | −16.75 | −14.64 | −14.45 | −23.47 | −17.90 | −23.46 | −27.21 |
| | (11) | −1.22 | −1.21 | −1.24 | −1.19 | −1.25 | −1.19 | −1.11 | −1.09 |
| | (12) | −0.72 | −0.71 | −0.73 | −0.69 | −0.76 | −0.78 | −0.66 | −0.68 |
| | (13) | −0.34 | −0.48 | −0.50 | −0.49 | −0.62 | −0.19 | −0.55 | −0.53 |
| | (14) | 0.62 | 0.60 | 0.61 | 0.51 | 0.50 | 0.50 | 0.51 | 0.51 |
| | (15) | −0.48 | −0.54 | −0.65 | −0.45 | −0.42 | −0.50 | −0.47 | −0.50 |
| | (16) | 0.45 | 0.51 | 0.48 | 0.44 | 0.42 | 0.47 | 0.46 | 0.47 |
| | (17) | 1.54 | 1.57 | 1.64 | 1.55 | 1.52 | 1.63 | 1.51 | 1.52 |
| | (18) | 0.62 | 0.57 | 0.43 | 0.59 | 0.64 | 0.58 | 0.58 | 0.59 |
| | (19) | 81.61 | 70.03 | 81.61 | 81.61 | 81.61 | 81.61 | 81.61 | 81.61 |
| | (20) | −0.54 | −0.55 | −0.31 | −0.59 | −0.53 | −0.50 | −0.48 | −0.48 |
| | (21) | −0.58 | −0.57 | −0.64 | −0.56 | −0.58 | −0.55 | −0.54 | −0.55 |
| | (22) | 19.36 | 15.40 | 18.85 | 15.85 | 26.52 | 12.72 | 23.96 | 15.92 |
| | (23) | 0.32 | 0.35 | 0.35 | 0.35 | 0.30 | 0.30 | 0.32 | 0.32 |
| | (24) | 23.96 | 33.10 | 27.47 | 27.47 | 26.52 | 26.52 | 23.96 | 29.72 |
| | (25) | 0.16 | 0.16 | 0.16 | 0.16 | 0.16 | 0.15 | 0.16 | 0.16 |
| | | Embodiment | | | | | | | |
| | | 9 | 10 | 11 | 12 | 13 | 14 | 15 | |
| Conditional expression | (1) | −0.78 | −0.78 | −0.76 | −0.78 | −0.78 | −0.78 | −0.69 | |
| | (2) | 0.43 | 0.44 | 0.43 | 0.43 | 0.44 | 0.44 | 0.46 | |
| | (3) | 2.14 | 2.14 | 2.14 | 2.14 | 2.14 | 2.44 | 2.13 | |
| | (4) | 0.07 | 0.07 | 0.07 | 0.07 | 0.07 | 0.07 | 0.04 | |
| | (5) | −0.61 | −0.59 | −0.70 | −0.67 | −0.58 | −0.61 | −0.59 | |
| | (6) | −0.15 | −0.16 | −0.07 | −0.11 | −0.16 | −0.15 | −0.10 | |
| | (7) | 1.82 | 1.80 | 1.43 | 1.58 | 1.66 | 1.60 | 1.76 | |
| | (8) | 1.20 | 1.21 | 1.20 | 1.20 | 1.18 | 1.17 | 1.06 | |
| | (9) | 1.79 | 1.79 | 1.75 | 1.74 | 1.73 | 1.80 | 1.78 | |
| | (10) | −19.73 | −19.73 | −20.60 | −16.21 | −18.05 | −14.76 | −12.46 | |
| | (11) | −1.08 | −1.06 | −1.15 | −1.13 | −1.10 | −1.13 | −1.27 | |
| | (12) | −0.70 | −0.71 | −0.82 | −0.79 | −0.76 | −0.76 | −0.65 | |
| | (13) | −0.32 | −0.37 | −0.62 | −0.35 | −0.27 | −0.26 | −0.32 | |
| | (14) | 0.05 | 0.62 | 0.42 | 0.41 | 0.46 | 0.42 | 0.52 | |
| | (15) | −0.39 | −0.34 | −0.38 | −0.33 | −0.45 | −0.41 | −0.46 | |

TABLE 16-continued

| | | | | | | | |
|---|---|---|---|---|---|---|---|
| (16) | 0.26 | 0.26 | 0.47 | 0.45 | 0.48 | 0.48 | 0.42 |
| (17) | 1.50 | 1.50 | 1.49 | 1.50 | 1.54 | 1.52 | 1.53 |
| (18) | 0.70 | 0.72 | 0.50 | 0.52 | 0.53 | 0.59 | 0.58 |
| (19) | 76.03 | 76.03 | 70.03 | 72.91 | 60.21 | 81.61 | 76.03 |
| (20) | −0.39 | −0.38 | −0.62 | −0.56 | −0.59 | −0.65 | −0.46 |
| (21) | −0.54 | −0.53 | −0.37 | −0.25 | −0.52 | −0.42 | −0.28 |
| (22) | 29.54 | 35.30 | 28.10 | 29.54 | 29.54 | 29.54 | 19.36 |
| (23) | 0.32 | 0.32 | 0.31 | 0.32 | 0.32 | 0.32 | 0.32 |
| (24) | 23.96 | 29.72 | 28.10 | 23.96 | 23.96 | 23.96 | 23.96 |
| (25) | 0.15 | 0.16 | 0.16 | 0.16 | 0.16 | 0.16 | 0.22 |

As is obvious from Table 16, the numerical values of Embodiments 1 to 15 satisfy the conditional expressions (1) to (25), and as is obvious from the aberration drawings in each embodiment, all the aberrations are corrected properly.

What is claimed is:

1. A zoom lens comprising:
a first lens group having a positive or negative refractive power as a whole, a second lens group having a negative refractive power as a whole, a third lens group having a positive refractive power as a whole, and a fourth lens group having a positive refractive power, wherein a variable power as a whole lens system of the zoom lens is established by configuring such that the first lens group and the fourth lens group are left fixed while a variable power is effected, the second lens group is made to move on an optical axis in such a manner as to move in a direction from a magnifying side to a contracting side over a range from a wide angle end to an intermediate area and in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end, and wherein the following conditional expression (1) is satisfied with respect to a power set at the second lens group, the following conditional expression (2) is satisfied with respect to a power set at the third lens group, and the following conditional expression (3) is satisfied with respect to a positional relationship between the third lens group and the fourth lens group at the wide angle end:

$$-1.1 < f_w/f_{II} < -0.5 \quad (1)$$

$$0.35 < f_w/f_{III} < 0.55 \quad (2)$$

$$1.7 < d_{wIII}/f_w \quad (3)$$

where
$f_w$: composite focal length of the whole lens system at the wide angle end
(focused at a magnifying side object distance of 1700 mm from a lens surface of the first lens group which is situated closest to the magnifying side);
$f_{II}$: composite focal length of the second lens group;
$f_{III}$: composite focal length of the third lens group;
$d_{wIII}$: airspace between the third lens group and the fourth lens group at the wide angle end.

2. A zoom lens as set forth in claim 1, wherein the first lens group is made up by disposing only a lens element having a positive refractive power (hereinafter, referred to as a positive lens element) or a lens element having a negative refractive power (hereinafter, referred to as a negative lens element), and wherein the following conditional expression (4) is satisfied with respect to a power set at the first lens group:

$$|f_w/f_I| < 0.3 \quad (4)$$

where, $f_I$: composite focal length of the first lens group.

3. A zoom lens as set forth in claim 1, wherein the second lens group is made up by disposing, in order from the magnifying side, a $2^{nd}$-a lens group and a $2^{nd}$-b lens group, and the $2^{nd}$-a lens group is made up by disposing, in order from the magnifying side, a meniscus negative lens which is made convex to the magnifying side, a negative lens element and a positive lens element, while the $2^{nd}$-b lens group has a heavily concaved surface which is made concave towards the contracting side as a refracting surface which is situated closest to the magnifying side and a convex surface which is made convex towards the contracting side as a refracting surface which is situated closest to the contracting side and is made up by disposing one to three lens elements, and wherein the following conditional expression (5) is satisfied with respect to a power set at the $2^{nd}$-a lens group, the following conditional expression (6) is satisfied with respect to a power set at the $2^{nd}$-b lens group, and the following conditional expression (7) is satisfied with respect to a dimension of the second lens group on the optical axis:

$$-1.0 < f_w/f_{IIa} < -0.1 \quad (5)$$

$$-0.5 < f_w/f_{IIb} < 0.1 \quad (6)$$

$$1.0 < T_{II}/f_w < 2.2 \quad (7)$$

where,
$f_{IIa}$: composite focal length of the $2^{nd}$-a lens group which makes up the second lens group;
$f_{IIb}$: composite focal length of the $2^{nd}$-b lens group which makes up the second lens group;
$T_{II}$: a distance on the optical axis between a magnifying side surface of a lens element of the second lens group which is disposed closest to the magnifying side and a contracting side surface of a lens element of the second lens group which is disposed closest to the contracting side.

4. A zoom lens as set forth in claim 3, wherein the following conditional expression (8) is satisfied with respect to a configuration of a contracting side surface of a lens element of the $2^{nd}$-a lens group which is disposed closest to the magnifying side, the following conditional expression (9) is satisfied with respect to the characteristics of a refractive index of a glass material which is used for each lens element which makes up the $2^{nd}$-a lens group, the following conditional expression (10) is satisfied with respect to the dispersing characteristics of the glass material used for each lens element which makes up the $2^{nd}$-a lens group, and the following conditional expression (11) is satisfied with respect to a configuration of a lens element of the $2^{nd}$-b lens group which is disposed closets to the magnifying side:

$0.85 < f_w/r_{IIa2} < 1.7$ (8)

$1.65 < N_{IIa}$ (9)

$V_{IIaP} - V_{IIaN} < -10$ (10)

$-1.8 < f_w/r_{IIb1} < -0.85$ (11)

where,
- $r_{IIa2}$: radius of curvature of the contracting side surface of the lens element of the $2^{nd}$-a lens group which is disposed closest to the magnifying side;
- $r_{IIb1}$: radius of curvature of the magnifying side surface of the lens element of the $2^{nd}$-b lens group which is disposed closest to the magnifying side;
- $N_{IIa}$: mean value of the refractive index of each lens element which makes up the $2^{nd}$-a lens group relative to the d line;
- $V_{IIaP}$: mean value of Abbe number of each positive lens element which makes up the $2^{nd}$-a lens group;
- $V_{IIaN}$: mean value of Abbe number of each negative lens element which makes up the $2^{nd}$-a lens group.

5. A zoom lens as set forth in claim 3, wherein at least a magnifying side surface of the lens element of the $2^{nd}$-a lens group which is disposed closest to the magnifying side is aspheric, and wherein the following conditional expression (12) is satisfied with respect to a power to be set and the following conditional expression (13) is satisfied with respect to a configuration of a magnifying side surface of a lens element of the $2^{nd}$-a lens group which is disposed second closest to the magnifying side:

$-1.0 < f_w/f_{IIa1} < -0.5$ (12)

$-0.8 < f_w/r_{IIa3} < -0.1$ (13)

where,
- $f_{IIa1}$: focal length of the lens element making up the $2^{nd}$-a lens group which is disposed closest to the magnifying side;
- $r_{IIa3}$: radius of curvature of the lens element making up the $2^{nd}$-a lens group which is disposed second closest to the magnifying side.

6. A zoom lens as set forth in claim 1, wherein the third lens group is made up by disposing, in order from the magnifying side, a $3^{rd}$-a lens group, a $3^{rd}$-b lens group and a $3^{rd}$-c lens group, the $3^{rd}$-a lens group having a positive refractive power as a whole and being made up by disposing one or two positive lens elements, the $3^{rd}$-b lens group having a negative refractive power as a whole and being made up of a negative lens element or by disposing a negative lens element and a positive lens element, the $3^{rd}$-c lens group having a positive refractive power as a whole and being made up by disposing two positive lens elements and a negative lens element, and wherein the following conditional expression (14), conditional expression (15) and conditional expression (16) are satisfied with respect to powers set at the $3^{rd}$-a lens group, $3^{rd}$-b lens group and $3^{rd}$-c lens group, respectively, and the following conditional expression (17) is satisfied with respect to the characteristics of refractive index of a glass material used for each lens element which makes up the third lens group:

$0.32 < f_w/f_{IIIa} < 0.8$ (14)

$-0.8 < f_w/f_{IIIb} < -0.25$ (15)

$0.2 < f_w/f_{IIIc} < 0.6$ (16)

$N_{IIIP} < 1.65$ (17)

where,
- $f_{IIIa}$: composite focal length of the $3^{rd}$-a lens group which makes up the third lens group;
- $f_{IIIb}$: composite focal length of the $3^{rd}$-b lens group which makes up the third lens group;
- $f_{IIIc}$: composite focal length of the $3^{rd}$-c lens group which makes up the third lens group;
- $N_{IIIP}$: mean value of refractive index of each lens element which makes up the third lens group relative to the line d.

7. A zoom lens as set forth in claim 6, wherein the following conditional expression (18) is satisfied with respect to a configuration of a magnifying side surface of a lens element of the $3^{rd}$-a lens group which is disposed closest to the magnifying side, and the following conditional expression (19) is satisfied with respect to the dispersion characteristics of a glass material which is used for each lens element which makes up the $3^{rd}$-a lens element:

$0.35 < f_w/r_{IIIa1} < 0.9$ (18)

$50 < V_{IIIa}$ (19)

where,
- $r_{IIIa1}$: radius of curvature of the magnifying side surface of the lens element of the $3^{rd}$-a lens group which is disposed closest to the magnifying side;
- $V_{IIIa}$: mean value of Abbe number of each lens element which makes up the $3^{rd}$-a lens group.

8. A zoom lens as set forth in claim 6, wherein the following conditional expression (20) is satisfied with respect to a configuration of a magnifying side surface of a lens element of the $3^{rd}$-b lens group which is disposed closest to the magnifying side:

$-0.8 < f_w/r_{IIIb1} < -0.25$ (20)

where,
- $r_{IIIb1}$: radius of curvature of the magnifying side surface of the lens element of the $3^{rd}$-b lens group which is disposed closest to the magnifying side.

9. A zoom lens as set forth in claim 6, wherein the following expression (21) is satisfied with respect to a configuration of a contracting side surface of a lens element of the $3^{rd}$-c lens element which is disposed closest to a contracting side, and the following conditional expression (22) is satisfied with respect to the dispersion characteristics of a glass material which is used for each lens element which makes up the $3^{rd}$-c lens group:

$-0.75 < f_w/r_{IIIc5} < -0.2$ (21)

$10 < V_{IIIcP} - V_{IIIcN}$ (22)

where,
- $r_{IIIc5}$: radius of curvature of the contracting side surface of the lens element of the $3^{rd}$-c lens group which is disposed closest to the contracting side;
- $V_{IIIcP}$: mean value of Abbe number of each positive lens element which makes up the $3^{rd}$-c lens group;
- $V_{IIIcN}$: mean value of Abbe number of each negative lens element which makes up the $3^{rd}$-c lens group.

10. A zoom lens as set forth in claim 6, wherein the $3^{rd}$-c lens group includes a partial system constituent element which is made up of at least two lens elements, one negative lens element and one positive lens element which are cemented together, and the following conditional expression (23) is satisfied with respect to a refractive index of a glass material used for each of the lenses which are cemented together, and the following conditional expression (24) is satisfied similarly with respect to the dispersion characteristics of the glass material used for each of the lens elements which are cemented together:

$$0.25 < N_{III\,c\,CN} - N_{III\,c\,CP} \quad (23)$$

$$20 < V_{III\,c\,CP} - V_{III\,c\,CN} \quad (24)$$

where, $N_{III\,c\,CP}$: mean value of the refractive index of the positive lens element of the $3^{rd}$-c lens group which is disposed in the cemented partial system thereof relative to the line d;

$N_{III\,c\,CN}$: mean value of the refractive index of the negative lens element of the $3^{rd}$-c lens group which is disposed in the cemented partial system thereof relative to the line d;

$V_{III\,c\,CP}$: mean value of Abbe number of the positive lens element of the $3^{rd}$-c lens group which is disposed in the cemented partial system thereof;

$V_{III\,c\,CN}$: mean value of Abbe number of the negative lens element of the $3^{rd}$-c lens group which is disposed in the cemented partial system thereof.

11. A zoom lens as set forth in claim 1, wherein the fourth lens group is made up by disposing a positive lens element, and the following conditional expression (25) is satisfied with respect to a power set at the fourth lens group:

$$f_w/f_{IV} < 0.3 \quad (25)$$

where, $f_{IV}$: composite focal length of the fourth lens group.

12. A zoom lens as set forth in claim 1, wherein the first lens group is a single lens element having a positive refractive power, and wherein the following conditional expression (26) is satisfied with respect to a power set at the second lens group, the following conditional expression (27) is satisfied with respect to a power set at the third lens group, and the following conditional expression (28) is satisfied with respect to a positional relationship between the third lens group and the fourth lens group at the wide angle end:

$$-0.9 < f_w/f_{II} < -0.55 \quad (26)$$

$$0.4 < f_w/f_{III} < 0.5 \quad (27)$$

$$2.0 < d_{wIII}/f_w < 2.2 \quad (28)$$

13. A zoom lens as set forth in claim 12, wherein the following conditional expression (29) is satisfied with respect to a power set the first lens group which is fixed during the variable power is effected:

$$f_w/f_I < 0.2 \quad (29).$$

14. A zoom lens as set forth in claim 12, wherein the second lens group is made up by disposing, in order from the magnifying side, a second lens element which has a negative refractive power and which is formed into a meniscus configuration which is made convex on a magnifying side, a third lens element which is a negative lens element, a fourth lens element which is a positive lens element and is cemented to the third lens element, a fifth lens element which is a negative lens element and is formed into a meniscus configuration which is made convex on a contracting side, a sixth lens element which is a positive lens element, and a seventh lens element which is a negative lens element, is formed into a meniscus configuration which is made convex on a contracting side and is provided in such a manner as to define an airspace between the sixth lens element and itself or is cemented to the sixth lens element together, wherein at least a magnifying side surface of the second lens element is aspherical, and wherein the following conditional expression (30) is satisfied with respect to a power set at the second lens group, the following conditional expressions (31) and (32) are satisfied with respect to configurations of a contracting side surface of the second lens and a magnifying side surface of the third lens, respectively, the following conditional expression (33) is satisfied with respect to the dispersion characteristics of a glass material used for each of the second, third and fourth lens element, and the following conditional expression (34) is satisfied with respect to a relative characteristic of concaved configurations of the magnifying side surfaces of the fifth and seventh lens elements:

$$-1.0 < f_w/f_2 < -0.6 \quad (30)$$

$$1.0 < f_w/r_4 < 1.4 \quad (31)$$

$$-0.75 < f_w/r_5 < -0.25 \quad (32)$$

$$10.0 < (v_2 + v_3)/2 - v_4 \quad (33)$$

$$1.3 < r_{12}/r_8 < 1.9 \quad (34)$$

where, $f_2$: focal length of the second lens element making up the second lens group;

$r_4$: radius of curvature of the contracting side surface of the second lens element making up the second lens group;

$r_5$: radius of curvature of the magnifying side surface of the third lens element making up the second lens group;

$r_8$: radius of curvature of the magnifying side surface of the fifth lens element making up the second lens group;

$r_{12}$: radius of curvature of the magnifying side surface of the seventh lens element making up the second lens group;

$v_2$: Abbe number of the second lens element making up the second lens group;

$v_3$: Abbe number of the third lens element making up the second lens group;

$v_4$: Abbe number of the fourth lens element making up the second lens group.

15. A projector installing thereon the zoom lens of claim 1.
16. A projector installing thereon the zoom lens of claim 2.
17. A projector installing thereon the zoom lens of claim 3.
18. A projector installing thereon the zoom lens of claim 4.
19. A projector installing thereon the zoom lens of claim 5.
20. A projector installing thereon the zoom lens of claim 6.
21. A projector installing thereon the zoom lens of claim 12.
22. A projector installing thereon the zoom lens of claim 13.
23. A projector installing thereon the zoom lens of claim 14.

* * * * *

UNITED STATES PATENT AND TRADEMARK OFFICE
CERTIFICATE OF CORRECTION

| | |
|---|---|
| PATENT NO. | : 7,394,599 B2 |
| APPLICATION NO. | : 11/796702 |
| DATED | : July 1, 2008 |
| INVENTOR(S) | : Etsuro Kawakami |

It is certified that error appears in the above-identified patent and that said Letters Patent is hereby corrected as shown below:

On the title page:

item (75) Inventors;

"Yasuyuki Tejima, Tokorozawa (JP)" should be --Yasuyuki Tejima, Itabashi-ku, (JP)--.

Signed and Sealed this

Sixteenth Day of December, 2008

JON W. DUDAS
*Director of the United States Patent and Trademark Office*